(12) United States Patent
Olsson et al.

(10) Patent No.: US 10,983,239 B1
(45) Date of Patent: Apr. 20, 2021

(54) MULTI-FREQUENCY LOCATING SYSTEMS AND METHODS

(71) Applicant: SeeScan, Inc., San Diego, CA (US)

(72) Inventors: Mark S. Olsson, La Jolla, CA (US); David A. Cox, San Diego, CA (US); Stephanie M. Bench, Carlsbad, CA (US); Jan Soukup, San Diego, CA (US); Timothy M. Turner, El Cajon, CA (US); Ryan B. Levin, San Diego, CA (US); Ray Merewether, La Jolla, CA (US)

(73) Assignee: SEESCAN, INC., San Diego, CA (US)

( * ) Notice: Subject to any disclaimer, the term of this patent is extended or adjusted under 35 U.S.C. 154(b) by 0 days.

(21) Appl. No.: 15/925,671

(22) Filed: Mar. 19, 2018

Related U.S. Application Data

(63) Continuation of application No. 13/677,223, filed on Nov. 14, 2012, now Pat. No. 9,927,545, which is a continuation-in-part of application No. 13/676,989, filed on Nov. 14, 2012, now Pat. No. 9,638,824.

(60) Provisional application No. 61/561,809, filed on Nov. 18, 2011, provisional application No. 61/559,696, filed on Nov. 14, 2011, provisional application No. 61/614,829, filed on Mar. 23, 2012.

(51) Int. Cl.
*G01V 3/10* (2006.01)
*G01V 3/08* (2006.01)
*G01V 3/15* (2006.01)

(52) U.S. Cl.
CPC ............... *G01V 3/10* (2013.01); *G01V 3/08* (2013.01); *G01V 3/15* (2013.01)

(58) Field of Classification Search
CPC . G01V 3/10; G01V 3/104; G01V 3/17; G01V 3/165; G01V 3/15; G01V 3/081; G01V 3/08
See application file for complete search history.

(56) References Cited

U.S. PATENT DOCUMENTS

| | | | |
|---|---|---|---|
| 5,231,355 A | 7/1993 | Rider et al. | |
| 5,264,795 A | 11/1993 | Rider | |
| 5,361,029 A | 11/1994 | Rider et al. | |
| 5,473,244 A * | 12/1995 | Libove | G01R 1/22 324/126 |

(Continued)

OTHER PUBLICATIONS

3M, "Cable and Pipe Locating Techniques for use with 3M Dynatel Cable and Pipe Locators," Instruction Manual, Aug. 1998, 3M Telecom Systems Division, Austin, TX.

(Continued)

*Primary Examiner* — Son T Le
*Assistant Examiner* — Dustin R Dickinson
(74) *Attorney, Agent, or Firm* — Steven C. Tietsworth, Esq.; Michael J. Pennington, Esq.

(57) ABSTRACT

Multi-frequency buried object location system transmitters and locators are disclosed. A transmitter may generate and provide output signals to a buried object at a plurality of frequencies, which may be selected based on a connection type. Corresponding locators may simultaneously receive a plurality of magnetic field signals emitted from the buried object and generate visual and/or audible output information based at least in part on the plurality of received magnetic field signals. The visual and/or audible output may be further based on signals received from a quad-gradient antenna array.

10 Claims, 41 Drawing Sheets

(56) References Cited

U.S. PATENT DOCUMENTS

| | | | |
|---|---|---|---|
| 5,541,516 A | 7/1996 | Rider et al. | |
| 6,617,856 B1 | 9/2003 | Royle et al. | |
| 7,336,078 B1* | 2/2008 | Merewether | G01V 3/15 |
| | | | 324/326 |
| 7,741,848 B1* | 6/2010 | Olsson | G01V 3/15 |
| | | | 324/326 |
| 2002/0047709 A1* | 4/2002 | Fling | G01V 3/104 |
| | | | 324/326 |
| 2004/0061075 A1* | 4/2004 | Pruszenski, Jr. | G21K 1/00 |
| | | | 250/492.1 |

OTHER PUBLICATIONS

3M Dynatel, "Advanced Pipe/Cable Locator 2220M," Operator Manual, Dec. 2007, 3M Track and Trace Solutions, Austin, TX.

3M Dynatel, "Cable/Pipe/Fault Advanced Locator 2250ME/2273ME Series," Operator Manual, Feb. 2009, 3M Track and Trace Solutions, Austin, TX.

3M Dynatel, "Locators: 2200 Series," Specification, 2011, 3M Track and Trace Solutions, Austin, TX.

Buchsbaum, Steve and Dan Cress, "A Program to Counter Underground Facilities," National Security Archive Electronic Briefing Book No. 372, 2002, Document 24, The National Security Archive http://nsarchive.gwu.edu/NSAEBB/NSAEBB372/.

Heath Consultants, "Sure-Lock," User's Manual, Heath Consultants Incorporated, Houston, TX.

Heath Consultants, "Sure-Lock All Pro: Multi-Frequency Locator," Specification, Sep. 2006, Heath Consultants Incorporated, Houston, TX.

\* cited by examiner

*Example Multi-Frequency Buried Object Locator*

Example Buried Object Locator Configuration

Example Transmitter Output Signal Spectrum with Multi-Frequency Signaling

Example Received Locator Signal Spectrum for Capacitively Coupled Buried Pipe Sections (e.g., Ductile Iron Pipe with Insulator Couplings) Showing Relative Attenuation as a Function of Frequency

*Example Locator Signal Spectrum with High Conductivity Soil and Continuously Electrically Connected Buried Object (Higher Freqs Capacitively Bleed Off) Showing Relative Attenuation as a Function of Frequency*

*Example Locator Signal Spectrum with Mid-Frequency Signals Dominant*

Example Locator Display Embodiment With Multi-Frequency Simultaneously
Received Signals with Minimal Conductor Cross-Coupling Example Locator Display Embodiment With Multi-Frequency Simultaneously
Received Signals with Neighboring Conductor Cross-Coupling Example Locator Display Embodiment With Multi-Frequency Simultaneously Received Signals with Neighboring Conductor Cross-Coupling with Directionality Indicated Example Locator Display Embodiment With Multi-Frequency Simultaneously Received Signals with Minimal Conductor Cross-Coupling

*Example Locator Display Embodiment With Multi-Frequency Simultaneously Received Signals with Neighboring Conductor Cross-Coupling*

*Example Locator Display Embodiment With Multi-Frequency Simultaneously Received Signals with Minimal Conductor Cross-Coupling*

Example Process Embodiment for Generating Multi-Frequency
Signaling for Coupling to One or More Buried Objects Example Process Embodiment for Receiving Multi-Frequency Signals
From One or More Buried Objects and Providing Integrated Display Example Process Embodiment for Generating Audio Output Based on Received Multi-Frequency Signals Top View of Example Embodiment of Quad Gradient Antenna Node
Configuration Top View of Example Embodiment of Quad Gradient Antenna Node Configuration Top View of Example Embodiment of Quad
Gradient Antenna Array Configuration Using
Optional Dummy Coils Top View of Alternate Example Embodiment of
Quad Gradient Antenna Array Configuration
Using Optional Dummy Coils

MULTI-FREQUENCY LOCATING SYSTEMS AND METHODS

CROSS-REFERENCE TO RELATED APPLICATIONS

This application is a continuation of and claims priority to co-pending U.S. Utility patent application Ser. No. 13/677,223, filed Nov. 14, 2012, entitled MULTI-FREQUENCY LOCATING SYSTEMS AND METHODS, which claims priority under 35 U.S.C. § 119(e) to U.S. Provisional Patent Application Ser. No. 61/561,809, filed Nov. 18, 2011, entitled MULTI-FREQUENCY LOCATING SYSTEMS & METHODS, to U.S. Provisional Patent Application Ser. No. 61/559,696, filed Nov. 14, 2011, entitled QUAD-GRADIENT COILS FOR USE IN LOCATING SYSTEMS, to U.S. Provisional Patent Application Ser. No. 61/614,829, entitled QUAD-GRADIENT COILS FOR USE IN LOCATING SYSTEMS, filed Mar. 23, 2012, and to commonly filed U.S. Utility patent application Ser. No. 13/676,989, entitled QUAD-GRADIENT COILS FOR USE IN LOCATING SYSTEMS, filed Nov. 14, 2012 The content of each of these applications is hereby incorporated by reference herein in its entirety for all purposes.

FIELD

This disclosure relates generally to apparatus, systems, and methods for locating hidden or buried objects. More specifically, but not exclusively, the disclosure relates to buried object locating transmitters for generating and transmitting a plurality of output signals at predefined frequencies onto buried or hidden objects, as well as buried object locators for receiving the transmitted signals and determining information associated with the buried or hidden objects.

BACKGROUND

There are many situations where is it desirable to locate buried utilities such as pipes and cables. For example, before starting any new construction that involves excavation, worker safety and project economic concerns require the precise location and identification of existing underground utilities such as underground power lines, gas lines, phone lines, fiber optic cable conduits, cable television (CATV) cables, sprinkler control wiring, water pipes, sewer pipes, etc., collectively and individually herein referred to as "buried objects."

Locating transmitters and receivers used in buried object locating systems, as well as locating methods using such systems, are known in the art. For example, some locating transmitters generate and transmit a current output signal to a buried object, and a corresponding locating receiver detects a resulting signal radiated from the buried object to determine location. However, conventional locating transmitters and receivers typically operate on a single frequency for signal transmission and detection. Depending on the nature of the operation, restriction to a single frequency may provide unsatisfactory results. For example, in systems which transmit and detect only a single frequency, it is difficult for an operator to determine if the current signal is the signal of interest, or a jamming or interfering signal. Additionally, certain output frequencies may be better suited than others in a given locating operation.

Thus, various multi-frequency transmitters have been developed to overcome problems arising from this constraint. However, while existing multi-frequency transmitters are capable of generating multiple current signals at different frequencies, such transmitters are not optimized for the current output to be sensed, processed, and displayed by a receiver on multiple frequencies at the same time. Thus, the operator is responsible for selecting the appropriate frequency signal for the specified locating operation and the information obtained is a function of only a single frequency at a particular time. Accordingly, there is a need in the art to address the above-described, as well as other problems.

SUMMARY

This disclosure relates generally to apparatus, systems, and methods for locating hidden or buried objects. More specifically, but not exclusively, the disclosure relates to buried object locating transmitters for generating and transmitting a plurality of output signals at multiple frequencies onto buried or hidden objects and buried object locators for receiving and simultaneously processing a plurality of signals emitted from the buried objects to generate information about the buried objects.

Various additional aspects, features, and functionality are further described below in conjunction with the appended Drawings.

BRIEF DESCRIPTION OF THE DRAWINGS

The present disclosure may be more fully appreciated in connection with the following detailed description taken in conjunction with the accompanying drawings, wherein.

DETAILED DESCRIPTION OF EMBODIMENTS

Figure 1:
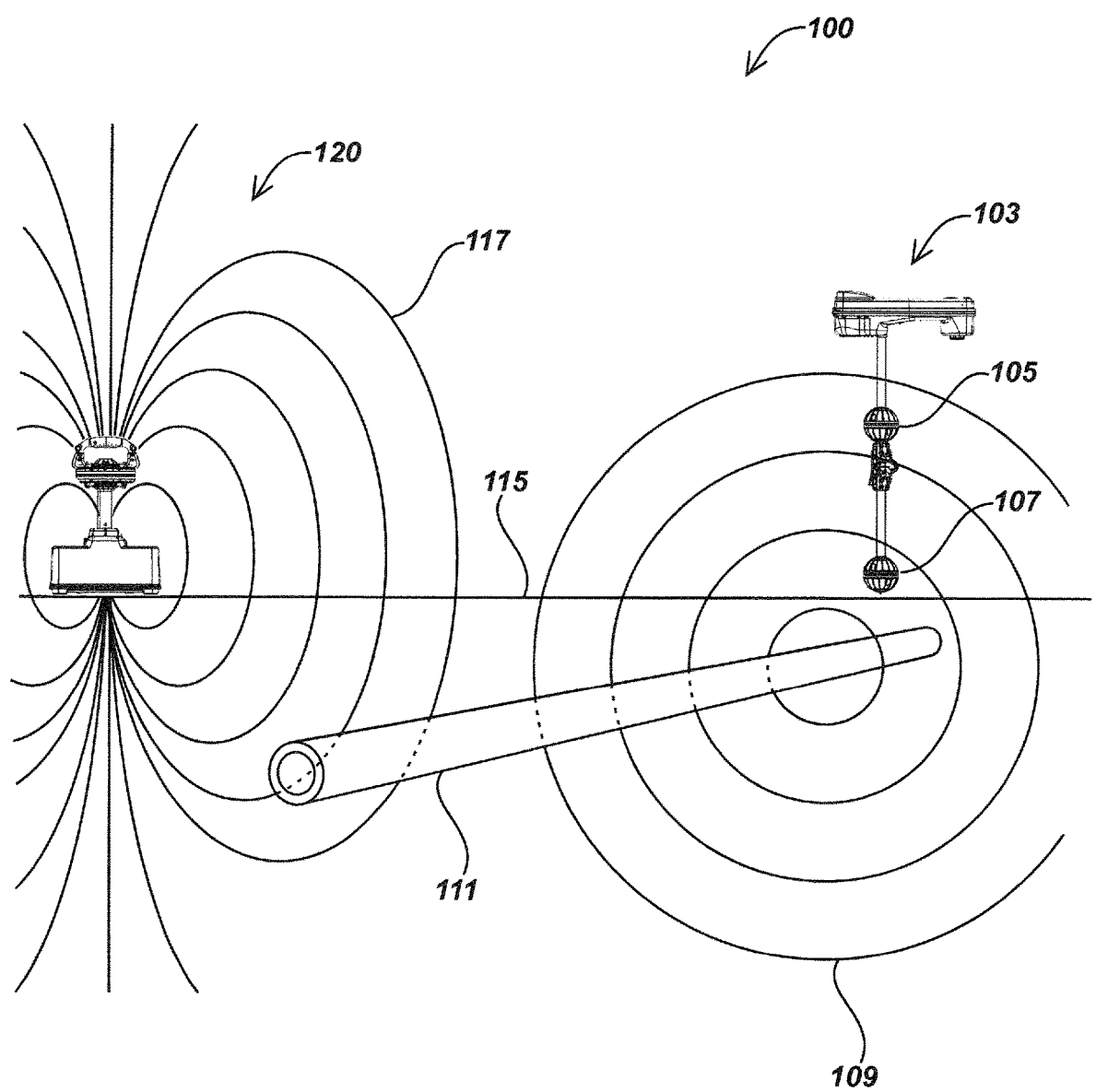
FIG. 1 illustrates details of an embodiment of a buried object locating system.

The present disclosure relates generally to apparatus, systems, and methods for locating buried objects. More specifically, but not exclusively, the disclosure relates to buried object locating transmitters for generating and simultaneously transmitting a plurality of current signals across buried or hidden objects, as well as corresponding receivers and processing devices for simultaneously receiving multi-frequency signals generated from the buried or hidden objects and processing the signals to generate information for user display, output and/or storage. In addition, in some embodiments, quad-gradient information may be further used to generate information for user display, output, and/or storage.

Various details of additional components, methods, and configurations that may be used in conjunction with the embodiments described subsequently herein are disclosed in co-assigned U.S. Pat. No. 7,009,399, entitled OMNIDIRECTIONAL SONDE AND LINE LOCATOR, issued Mar. 7, 2006, U.S. Pat. No. 7,443,154, entitled MULTI-SENSOR MAPPING OMNIDIRECTIONAL SONDE AND LINE LOCATOR, issued Oct. 28, 2008, U.S. Pat. No. 7,518,374, entitled RECONFIGURABLE PORTABLE LOCATOR EMPLOYING MULTIPLE SENSOR ARRAY HAVING FLEXIBLE NESTED ORTHOGONAL ANTENNAS, issued Apr. 14, 2009, U.S. Pat. No. 7,619,516, entitled SINGLE AND MULTI-TRACE OMNIDIRECTIONAL SONDE AND LINE LOCATORS AND TRANSMITTERS USED THEREWITH, issued Nov. 17, 2009, U.S. Provisional Patent Application Ser. No. 61/485,078, entitled LOCATOR ANTENNA CONFIGURATION, filed on May 11, 2011, U.S. Pat. No. 7,009,399, entitled OMNIDIRECTIONAL SONDE AND LINE LOCATOR, issued Mar. 7, 2006, U.S. Pat. No. 7,443,154, entitled MULTI-SENSOR MAPPING OMNIDIRECTIONAL SONDE AND LINE LOCATOR, issued Oct. 28, 2008, U.S. Pat. No. 7,518,374, entitled RECONFIGURABLE PORTABLE LOCATOR EMPLOYING MULTIPLE SENSOR ARRAY HAVING FLEXIBLE NESTED ORTHOGONAL ANTENNAS, issued Apr. 14, 2009, U.S. Pat. No. 7,619,516, entitled SINGLE AND MULTI-TRACE OMNIDIRECTIONAL SONDE AND LINE LOCATORS AND TRANSMITTERS USED THEREWITH, issued Nov. 17, 2009, U.S.

Utility patent application Ser. No. 13/469,024, BURIED OBJECT LOCATOR APPARATUS & SYSTEMS, filed May 10, 2012, U.S. Utility patent application Ser. No. 13/570,084, HAPTIC DIRECTIONAL FEEDBACK HANDLES FOR LOCATION DEVICES, Filed Aug. 8, 2012, U.S. Provisional Patent Application Ser. No. 61/619,327, entitled OPTICAL GROUND TRACKING APPARATUS, SYSTEMS, & METHODS, filed Apr. 2, 2012, and U.S. Provisional Patent Application Ser. No. 61/485,078, entitled LOCATOR ANTENNA CONFIGURATION, filed on May 11, 2011. The content of each of these patent and applications is hereby incorporated by reference herein in its entirety.

In one aspect, the disclosure relates to a buried object locator. The locator may include, for example, a mast, a housing coupled to the mast, a display element disposed on or within the housing, and a processing element disposed in the housing. The processing element may be configured to simultaneously receive and process a plurality of magnetic field signals emitted from a buried object at different frequencies. The processing element may be further configured to generate, based on two or more of the plurality of magnetic field signals, display information associated with the buried object for rendering on the display element. The display information may further be based on signals received from a quad gradient antenna array.

The display information may include, for example, a plurality of lines representing positions of the utility determined based on the plurality of magnetic field signals emitted from the buried object at different frequencies. The display information may include distortion information associated with estimates of the position of the buried object based on two or more of the plurality of magnetic field signals. The estimate of the position of the buried object may be displayed as object. The object may be blurred, fuzzed, colored, dashed, or otherwise modulated as a function of a determined distortion of the position estimate. The object may be a line, circle, rectangle, icon, or other graphic object.

A first of the plurality of magnetic field signals may, for example, be received at a predefined unique frequency associated with a connection type. The first of the plurality of magnetic field signals may be processed to determine the display information associated with the buried object based on the connection type. A second of the plurality of magnetic field signals may be received at a second predefined unique frequency associated with a second connection type. The second of the plurality of magnetic field signals may be processed to determine the display information associated with the buried object based on the second connection type.

A first of the plurality of magnetic field signals may, for example, be received at a first predefined unique frequency associated with a connection type. A second of the plurality of magnetic field signals may be simultaneously received at a second predefined unique frequency associated with the connection type. The display information associated with the buried object may be based on both the first of the plurality of magnetic field signals and the second of the plurality of magnetic field signals.

A first of the plurality of magnetic field signals may, for example, be received at a first predefined unique frequency associated with a first connection type. A second of the plurality of magnetic field signals may be simultaneously received at a second predefined unique frequency associated with a second connection type. The display information associated with the buried object may be based on both the first of the plurality of magnetic field signals and the second of the plurality of magnetic field signals.

In another aspect, the disclosure relates to a method of providing an output display on a buried object locator. The method may include, fore example, simultaneously receiving, at the buried object locator, a plurality of magnetic field signals at different frequencies, simultaneously processing the received plurality of magnetic field signals to generate information associated with the buried object, wherein the information is generated based on two or more of the plurality of magnetic field signals, and providing an output of the generated information associated with the buried object on an output device.

The output device may, for example, be a visual display element. The output device may be audio output device, such as a speaker or headphone.

The plurality of signals may, for example, be emitted substantially entirely from the buried object, and the display information indicates substantially no magnetic field distortion. Alternately, a first of the plurality of signals may be emitted from the buried object, and a second of the plurality of signals are emitted from an adjacent conductor. The second of the plurality of signals may be emitted from the adjacent conductor as a result of currents coupled to the adjacent conductor from the buried object. The display information may indicate magnetic field distortion due to the adjacent conductor.

In another aspect, the disclosure relates to a a method for use in a buried object locator system. The method may include, for example, simultaneously generating, at a buried object transmitter, a plurality of output signal components at ones of a plurality of different output frequencies, coupling the output signal components from the transmitter to a buried object in the ground to generate a buried object current corresponding to the output signal components, receiving, at a buried object locator, radiated magnetic field signals associated with the buried object current at a plurality of the different output frequencies, and determining, at the buried object locator, information associated with the buried object based on two or more of the radiated magnetic field signal components. The plurality of output signal components may be of the same connection type. Two or more of the plurality of output signal components may be of different connection types.

In another aspect, the disclosure relates to a buried object locator system. The locator system may include, for example, a buried object transmitter. The buried object transmitter may be configured to simultaneously generate, at a buried object transmitter, a plurality of output signal components at ones of a plurality of different output frequencies. The system may further include a a coupling apparatus for coupling the one or more output signal components from the transmitter to a buried object in the ground to generate a buried object current. The system may further include a buried object receiver. The buried object receiver may be configured to receive radiated signal components associated with the buried object current at a plurality of the different output frequencies, and determine, at the buried object locator, information associated with the buried object based on two or more of the radiated signal components.

In another aspect, the disclosure relates to a method for use in a buried object locating system. The method may include, for example, generating a plurality of current output signals, phase locked to one another, at predefined frequencies (e.g,—at integer multiples of a base signal frequency) and providing a simultaneous transmission of such current output signals from a locating transmitter to a buried object. Traditionally locators have been configured to receive and process signals at different frequencies, however, these were typically set at the transmitter at a single frequency at a time and received and processed at the locator at that single frequency. In a multi-frequency system such as described herein, transmitters can send signals at multiple frequencies simultaneously and locators can similar receive and process the multi-frequency signals simultaneously to generate output visual and/or audible and/or haptic information based on the multi-frequency signals. The method may further include, for example, transmitting a plurality of current output signals to a buried object via a direct coupling element. The method may further include, for example, inducing current in a buried object via an inductive coupling element. The method may further include, for example, sensing a plurality of current signals, emitted from a buried object, at predefined frequencies simultaneously at a locating receiver, and comparing each signal frequency to one another in signal strength, such that the strongest frequency relative to the plurality of predefined signal frequencies transmitted may be selected manually or automatically at the receiver.

In another aspect, the disclosure relates to a method for use in a buried object locator system. The method may include, for example, generating, at a buried object transmitter, one or more output signals including a plurality of signal components at ones of a plurality of different output frequencies and coupling the one or more output signals from the transmitter to a buried object in the ground to generate a buried object current. The method may further include receiving, at a buried object locator, radiated signal components associated with the buried object current at a plurality of the different output frequencies, and determining, at the buried object locator, information associated with the buried object based on two or more of the radiated signal components.

In another aspect, the disclosure relates to a method for use in a buried object locator system. The method may include, for example, generating, at a buried object transmitter, one or more output signals including a plurality of signal components at ones of a plurality of different output frequencies and coupling the one or more output signals from the transmitter to a buried object in the ground to generate a buried object current. The method may further include receiving, at a buried object locator, radiated signal components associated with the buried object current at a plurality of the different output frequencies, and determining, at the buried object locator, information associated with the buried object based on two or more of the radiated signal components.

In another aspect, the disclosure relates to a buried object locator system. The system may include, for example, a buried object transmitter. The buried object transmitter may be configured to generate one or more output signals including a plurality of signal components at ones of a plurality of different output frequencies. The system may further include a coupling apparatus configured to couple the one or more output signals from the transmitter to a buried object in the ground to generate a buried object current. The system may further include a buried object receiver. The buried object receiver may be configured to receive radiated signal components associated with the buried object current at a plurality of the different output frequencies, and determine, at the buried object locator, information associated with the buried object based on two or more of the radiated signal components.

In another aspect, the disclosure relates to a buried object transmitter. The transmitter may, for example, be configured to generate one or more output signals including a plurality of signal components at ones of a plurality of different output frequencies, wherein the plurality of different output frequencies are phase-synchronized, and provide the output signals to a plurality of coupling elements for generating currents in the buried object.

In another aspect, the disclosure relates to a buried object receiver. The receiver may, for example, be configured to receive radiated signal components associated with the buried object current at a plurality of the different output frequencies. The buried object current may be generated from an output signal provided from a buried object transmitter. The receiver may be further configured to determine information associated with the buried object based on two or more of the radiated signal components.

In another aspect, the disclosure relates to a method for use in a buried object locator system transmitter. The method may include, for example, receiving a transmitted signal, including timing information, at the transmitter, generating a timing reference from the timing information at the transmitter, generating a phase synchronized output signal including a plurality of signal components at ones of a plurality of frequencies, wherein the plurality of signal components have a phase determined at least in part by the timing reference at the transmitter, and sending the output signal from the transmitter to a coupling device.

In another aspect, the disclosure relates to a method for use in a buried object locator. The method may include, for example, receiving radiated signal components associated with buried object currents at a plurality of different output frequencies coupled from a buried object transmitter, and determining information associated with the buried object based on two or more of the radiated signal components.

In another aspect, the disclosure relates to a buried object transmitter. The transmitter may include, for example, a timing synchronization module including a timing receiver module configured to receive a first transmitted signal that includes timing information and a timing reference module to determine a timing reference from the timing information. The transmitter may further include an output signal generation module configured to generate a plurality of phase-synchronized output signals having a phase determined at least in part by the timing reference.

In another aspect, the disclosure relates to a buried object locator. The buried object locator may include, for example, a locator receiver module for receiving a plurality of radiated signals at different frequencies from a buried object, wherein the radiated signals are generated from buried object currents generated from a buried object transmitter, wherein the currents have a synchronized phase. The receiver may further include a a processing module configured to determine information related to the current in the buried object based on the received magnetic signal and the second timing reference.

In another aspect, the disclosure relates to a transmitter for use in a buried utility locating system. The transmitter may include, for example, a timing synchronization module including a timing receiver module configured to receive a first transmitted signal that includes timing information and a timing reference module to determine a timing reference from the timing information. The transmitter may further include an output signal generation module configured to generate a plurality of output signals phase-locked to another, which may be determined at least in part by the timing reference.

In another aspect, the disclosure relates to a transmitting device for use in a buried utility locator system. The transmitting device may further include, for example, a transmitter housing. The transmitting device may further include, an antenna housing including a high quality factor "Q" dipole antenna, which may be vertically oriented relative to the center-line of the transmitter housing. The dipole antenna may be positioned apart from a battery and/or transmitter electronic modules to, for example, increase the quality factor ("Q") to provide higher output power for a given input power.

The transmitter housing may include, for example a molded hollow case including one or more receptacles for stowage of electrical cords, and the like. The transmitter housing may further include, for example, a coupling apparatus, including one or more electrical cords and direct connection lead clips for directly coupling the current output signal of the transmitter to the buried object. The transmitter housing may be configured with a coupling apparatus or antenna for inducing current in the buried object. The transmitter housing may include a connection mechanism, such as a jack, for connection of an inductive clamp. The transmitter housing may further include, for example, electronic circuitry including a power supply and various processing modules configured to control various operations. The transmitter housing may further include, for example, a battery shoe module for receiving a rechargeable battery pack.

The transmitter housing may include, for example, an electrically conductive stowage point for the direct connection lead clips such that the transmitter may detect and indicate if the clips are in a stowed position. The electrically conductive stowage point may be connected to sensing circuitry to sensing circuitry that would allow the processing logic within the transmitter to determine if the clip lead was stowed or not. The electrically conductive stowage point may be constructed of conductive plastic or conductive metal, or other similar materials.

The transmitter housing may include, for example, conductive rubber feet, which may be disposed on the base of the transmitter housing to provide an alternate grounding connection in locations where soil grounding points or other grounding points are otherwise not available. A grounding stake may be used. If a grounding stake is used, processing circuitry disposed inside the transmitter housing may determine how the grounding connection of the lead connected grounding point compares to the surface contact of the conductive rubber feet.

In another aspect, the disclosure relates to the vertical dipole antenna. The vertical dipole antenna may include, for example, a series of visual indicators for emitting a warning signal (ie—blinking red light) disposed on the antenna housing. The vertical dipole antenna may further include, for example, a series of antenna coils arranged orthogonally and disposed in the center region of the antenna housing. The vertical dipole antenna may further include one or more GPS receiver antennas for receiving timing information, and one or more ISM radio antennas capable of transmitting and receiving information. The vertical dipole antenna may include, for example, a handle disposed on the antenna housing to provide improved portability.

In another aspect, the disclosure relates to a locator for use in a buried object locating system. The locator may include, for example, a receiver for detecting a plurality of current signals emitted from a buried object at predefined frequencies simultaneously, and comparing each signal frequency to one another in signal strength, such that the strongest frequency relative to the plurality of predefined signal frequencies transmitted may be selected manually or automatically at the receiver.

In another aspect, the disclosure relates to a method for comparing the measured position and depth of a given utility at two or more frequencies (high and low) simultaneously. The method may include, for example, measuring the position of the unknown buried utility at two or more frequencies, and comparing such measurements to determine the degree of accuracy of the measured position. For example, if two frequencies yield a similar measured position and depth, the displayed utility may indicate a low level of distortion. In an exemplary embodiment, the distortion may be displayed graphically, such as, for example, by providing a blurred and/or moving image indicating the position of the utility line.

In another aspect, the disclosure relates to a method for indicating current direction along a utility line. The method may include, for example, indicating the current direction may by showing motion on the graphics display.

In another aspect, the disclosure relates to a method of communicating an accurate current for each of the transmitted frequencies via the ISM radio, or alternately storing data for later processing. As long as time remains synchronized between the data recorded at the receiver and the transmitter, the data may be later processed and stored in a utility position database. How the amount of current flow changes as a function of frequency may indicate characteristics of how the signal may be coupling into other buried utilities and to the nature of the utilities that are carrying the transmitted current.

In another aspect, the disclosure relates to a buried object/utility locator. The locator may include, for example, a mast, a housing or case coupled to the mast, a processing element disposed in the housing or case, and a display element disposed on or within the housing or case. The locator may further include an antenna node. The antenna node may be mounted on or within or coupled to the mast. The antenna node may include an antenna array support structure, an interior omnidirectional antenna array disposed on the antenna array support structure, and a quad gradient antenna array disposed about the omnidirectional antenna array. A centerline of one or more pairs of antenna elements of the quad gradient antenna array, which may coils with the centerline passing through a center of the coil, may substantially intersect a centerpoint of the omnidirectional antenna array. The omnidirectional array may include three orthogonal antenna coils in a substantially spheroid configuration.

The centerlines of two or more pairs of antenna elements of the quad gradient antenna array may, for example, substantially intersect a centerpoint of the omnidirectional antenna array. The omnidirectional antenna array and the quad gradient antenna array may be disposed or housed within a single antenna node housing. The antenna array support structure may include a central support assembly configured to position a plurality of coils of the interior omnidirectional antenna array in orthogonal directions. The antenna array support structure may be further configured to position a plurality of coils of the gradient antenna array circumferentially about the omnidirectional antenna array.

The interior omnidirectional antenna array may, for example, comprise three orthogonally oriented antenna coils. The orthogonally oriented antenna coils may be in a spheroid arrangement or other orthogonal antenna element arrangement. The gradient antenna array may include one or more diametrically opposed pairs of antenna coils. The gradient antenna array may include two or more gradient antenna coils and two or more dummy coils. The two gradient antenna coils may be orthogonally oriented. The two antenna coils may be co-axially oriented.

The locator may further include, for example, a switching circuit. The switching circuit may be configured to selectively switch two or more signals provided from antenna coils of the gradient antenna array. The selectively switched signals may be selectively provided to a common analog to digital (A/D) converter. The antenna coils of the gradient antenna array may be selectively coupled in an anti-series configuration to perform signal differencing of provided antenna signals.

The processing element may, for example, be configured to generate display information associated with a buried object or utility for rendering on the display element. The display information may be generated from magnetic field signals received at both the omnidirectional antenna array and the gradient antenna array. Output antenna signals from both the omnidirectional antenna array and the gradient antenna array may be provided to the processing element for generation of the display information. The display information may include a first set of display information generated from signals received at a distance from the buried utility based primarily on the gradient antenna array signals. A second set of display information may be generated from signals received in close proximity to the buried utility based primarily on the omnidirectional antenna array.

The display information may include, for example, a line representing the buried object or utility. The line may be generated based on magnetic field signals received at both the omnidirectional antenna array and the gradient antenna array. The display information may include information representing a position or location of the buried utility. The information representing a position or location of the buried utility may be generated based on magnetic field signals received at both the omnidirectional antenna array and the gradient antenna array. The position or location information may be further based on position or location information provided from a GPS, cellular, or other wireless location or positioning device. The display information may be based in part on a difference in position determined based on magnetic field signals received at both the omnidirectional antenna array and the gradient antenna array. The display information may be based in part on a distortion of a magnetic field signal received at the omnidirectional antenna array, the gradient antenna array, or both. The representation of a position or location of the buried utility may include a blurred, distorted, or "fuzzed" object provided on the display element. The blurred, distorted, or "fuzzed" object may be a line or line segment. The representation of a position of the buried object may include a distinct color or shading of a line or other object. The distinct color or shading of the line or other object may be selected based on an amount of distortion of the received magnetic field signal or estimated error of the determined position or location. The representation of a position of the buried object may include an icon on the display element. The distortion of the received magnetic field signal or estimated error of the determined position or location may be represented by an icon on the display element.

The locator may further include, for example, an equatorial antenna coil. The equatorial antenna coil may be positioned about the omnidirectional antenna array and the gradient antenna array. The equatorial antenna coil may be positioned outside the omnidirectional antenna array but at least partially inside the gradient antenna array. The equatorial antenna coil, gradient antenna array, and omnidirectional antenna array may be enclosed within a single case or housing in the antenna node.

The locator may be further configured to generate magnetic field signals from the omnidirectional antenna array, quad gradient antenna array, and/or equatorial antenna coil at multiple frequencies, such as described in, for example, co-assigned United States Provisional Patent Application Ser. No. 61/561,809, filed Nov. 18, 2011, entitled MULTI-FREQUENCY LOCATING SYSTEMS & METHODS, and commonly filed U.S. Utility patent application Ser. No. 13/676,989, entitled MULTI-FREQUENCY LOCATING SYSTEMS AND METHODS, filed Nov. 14, 2012, which are incorporated by reference herein. The processing element may be further configured to generate the display information further based on the multi-frequency signals provided from the antenna arrays. The displayed information associated with the buried object/utility may be based on magnetic signals provided and processed simultaneously at two or more frequencies from both the omnidirectional antenna array and the quad gradient antenna array.

In another aspect, the disclosure relates to an antenna assembly. The antenna assembly may include, for example, an antenna array support structure, an interior omnidirectional antenna array disposed on the antenna array support structure, and a gradient antenna array disposed about the omnidirectional antenna array.

The antenna array support structure may include, for example, a central support assembly. The support structure assembly may be configured to position a plurality of coils of the interior omnidirectional antenna array in orthogonal directions. The antenna array support structure may be further configured to position a plurality of coils of the gradient antenna array circumferentially about the omnidirectional antenna array.

The interior omnidirectional antenna array may include, for example, three orthogonally oriented antenna coils. The interior omnidirectional antenna array may include two orthogonally oriented antenna coils. The interior omnidirectional antenna array may include four or more antenna coils configured to sense magnetic signals in two or more orthogonal directions.

The gradient antenna array may include, for example, one or more gradient antenna coils. The one or more gradient antenna coils may be configured in diametrically opposed pairs. The one or more gradient antenna coils may include two diametrically opposed pairs of antenna coils. The gradient antenna coils may be positioned outside the interior omnidirectional antenna array. The gradient antenna coils may include four or more antenna coils. The gradient antenna coils may be coupled to a switching circuit configured to selectively switch ones or pairs of the gradient antenna coils. A switched output from the switching circuit may be provided to a processing element.

In another aspect, the disclosure relates to an antenna assembly. The antenna assembly may include, for example, a central support assembly, seven antenna coils disposed about the central support assembly, wherein three of the seven coils are configured orthogonally in an omnidirectional ball assembly and four of the seven coils are positioned in diametrically opposed pairs around the omnidirectional ball assembly. Alternately, the antenna assembly may include three coils configured orthogonally in an omnidirectional ball assembly and two additional coils of four positions disposed around the enclosure. The two coils may be opposed pairs or may be orthogonal single antennas. In this configuration, the field strength in the direction of any of the four (or more) coils may be determined from the centrally determined magnetic field vector, and then gradients can be calculated from the center point of the array to any coil placed around the perimeter. This may be done to reduce the total number of processing channels (e.g., in common implementations where analog-to-digital converters are packaged in fours, a pair of four channel A/Ds (e.g., 8 channels) can be configured so that 3 channels are used for an upper orthogonal antenna array, three channels for a lower orthogonal antenna array, and two more channels may be used for gradient antenna coil processing (assuming that no switching is done). Dummy coils may also be added to this configuration to balance mutual inductance In another aspect, the disclosure relates to an antenna node. The antenna node may include, for example, a node housing. The antenna node may further include an antenna assembly. The antenna assembly may include an antenna array support structure, an interior omnidirectional antenna array disposed on the antenna array support structure, and a gradient antenna array disposed about the omnidirectional antenna array.

The antenna array support structure may include, for example, a central support assembly configured to position a plurality of coils of the interior omnidirectional antenna array in orthogonal directions. The antenna array support structure may be further configured to position a plurality of coils of the gradient antenna array circumferentially about the omnidirectional antenna array. The interior omnidirectional antenna array may include three orthogonally oriented antenna coils. The gradient antenna array may include two diametrically opposed pairs of gradient antenna coils. The gradient antenna array includes five or more gradient antenna coils. The gradient antenna coils may be selectively switched.

The antenna node may further include a printed circuit board (PCB). The PCB may include a processing element configured to process signals generated from the omnidirectional antenna array and/or the gradient antenna array. The PCB may further include a switching circuit. The switching circuit may be configured to selectively switch pairs of signals provided from the gradient antenna array. The gradient antenna coils of the gradient antenna array may be coupled in an anti-series configuration to facilitate signal differencing. The gradient antenna coils may be selectively coupled in anti-series. Outputs from the gradient antenna coils may be time-division multiplexed In another aspect, the disclosure relates to an antenna node. The antenna node may include, for example, a node housing, and an antenna assembly. The antenna assembly may include a central support assembly and seven antenna coils disposed about the central support assembly. Three of the seven coils may be configured in an omnidirectional ball assembly and four of the seven coils may be positioned diametrically opposed around the omnidirectional ball assembly.

In another aspect, the disclosure relates to a buried object locator. The buried object locator may include, for example, a processing and display module, a locator mast, and an antenna node coupled to the locator mast. The antenna node may include a node housing and an antenna assembly. The antenna assembly may include an antenna array support structure, an interior omnidirectional antenna array disposed on the antenna array support structure, and a gradient antenna array disposed about the omnidirectional antenna array.

The processing and display module may be configured, for example, to generate a display associated with a buried utility. The display may be generated by using signals and information provided from both the omnidirectional antenna array and the gradient antenna array. The display may include information includes a line representing the utility. The line may be generated based on signals received at both the omnidirectional antenna array and the gradient antenna array. The display may include information representing a position and/or orientation of the buried utility. The position and/or orientation of the buried utility may be based on signals received at both the omnidirectional antenna array and the gradient antenna array. The signals received at both the omnidirectional antenna array and the gradient antenna array may be combined to generate the position and/or orientation information. The display may be based in part on a difference in position determined based on signals received at the omnidirectional antenna array and the gradient antenna array. The display may be based in part on a distortion of a signal received at the omnidirectional antenna array, the gradient antenna array, or both.

In another aspect, the disclosure relates to a buried object locator. The buried object locator may include, for example, a processing and display module, a locator mast, and an antenna node coupled to the locator mast. The antenna node may include a node housing and an antenna assembly. The antenna assembly may include a central support assembly and seven antenna coils disposed about the central support assembly. Three of the seven coils may be configured in an omnidirectional ball assembly and four of the seven coils may be positioned diametrically opposed around the omnidirectional ball assembly.

The processing and display module may be configured, for example, to generate a display associated with a buried utility. The display may be generated by using signals and information provided from both the omnidirectional antenna array and the gradient antenna array. The display may include information includes a line representing the utility. The line may be generated based on signals received at both the omnidirectional antenna array and the gradient antenna array. The display may include information representing a position and/or orientation of the buried utility. The position and/or orientation of the buried utility may be based on signals received at both the omnidirectional antenna array and the gradient antenna array. The signals received at both the omnidirectional antenna array and the gradient antenna array may be combined to generate the position and/or orientation information. The display may be based in part on a difference in position determined based on signals received at the omnidirectional antenna array and the gradient antenna array. The display may be based in part on a distortion of a signal received at the omnidirectional antenna array, the gradient antenna array, or both.

In another aspect, the disclosure relates to an antenna assembly for use in locator devices, including a central omnidirectional antenna ball, and a plurality of gradient coils positioned about the central omnidirectional antenna ball.

The diametric pairs of gradient antenna coils may be wired in anti-series to connect negative terminals of each of diametric pair of gradient antenna coils together to perform a signal differencing process. The gradient coils may be arranged in diametrically opposed pairs. The antenna assembly may further include a switching circuit configured to selectively switch signals from the gradient antenna coil pairs. The signals may be switched based on a least common multiple of the periods of ones of a plurality of frequencies of received signals.

In another aspect, the disclosure relates to an antenna array for a locator apparatus. The locator apparatus may include a body, a quad-gradient antenna array or arrays, circuitry configured to receive and process signals, and a display circuit or display module configured to generate and/or control output information, which may include visual displays. The locator may further include an output module, which may be configured to provide audible and/or visual output information in conjunction with the display circuit and/or other circuits or modules. The quad-gradient antenna array may include a spherical omnidirectional antenna array and at least two pairs of gradient antenna coils. The spherical omnidirectional antenna array may further be composed of three antenna coils positioned orthogonally to one another. Each gradient antenna coil of the diametric gradient antenna coil pairs may be positioned closely around the central spherical antenna array such that they are diametrically located from its paired gradient antenna coil. In some instances, a different number of diametric pairs of gradient antenna coils may be used, for instance, three or four pairs.

The gradient antenna coils may, for example, be wired in anti-series such that a differencing or canceling of signals between diametrically positioned gradient antenna coil pairs may be communicated along one channel per diametric antenna coil pairing.

The gradient antenna coils may, for example, be wired whereby switching between each diametric pair of gradient antenna coils may occur. In these embodiments, differencing of signals may occur in hardware and/or in software.

The circuitry and output modules may be configured, for example, to generate a display associated with a buried utility. The display may be generated by using signals and information provided from both the omnidirectional antenna array and the gradient antenna array. The display may include information includes a line representing the utility. The line may be generated based on signals received at both the omnidirectional antenna array and the gradient antenna array. The display may include information representing a position and/or orientation of the buried utility. The position and/or orientation of the buried utility may be based on signals received at both the omnidirectional antenna array and the gradient antenna array. The signals received at both the omnidirectional antenna array and the gradient antenna array may be combined to generate the position and/or orientation information. The display may be based in part on a difference in position determined based on signals received at the omnidirectional antenna array and the gradient antenna array. The display may be based in part on a distortion of a signal received at the omnidirectional antenna array, the gradient antenna array, or both.

In another aspect, the disclosure relates to a module for use in a buried utility locator. The module may include, for example, a processing element. The module may further include a display element. The processing element may be configured to receive information from signals from a buried utility received at an omnidirectional antenna array and a gradient antenna array, and generate, based on both the signals received at the omnidirectional antenna array and the gradient antenna array, output information. The display module may be configured to render, as display information, the output information.

The display information may include, for example, a line or other shape representing the position, location, and/or orientation of the buried utility. Alternately, or in addition, the display information may include a representation of a position of the buried utility, such as a text or graphical representation. The representation of a position of the buried utility may include a blurred, distorted, or "fuzzed" object. The blurred, distored, or "fuzzed" object may be a line or line segment. Alternately, or in addition, the representation of a position of the buried object may include a distinct color or shading of a line or other object. The representation of a position of the buried object may include one or more icons.

The display information may be based, for example, on a difference in position determined based on signals received at the omnidirectional antenna array and the gradient antenna array. Alternately, or in addition, the display information may be based on a distortion of a signal received at the omnidirectional antenna array, the gradient antenna array, or both.

In another aspect, a time multiplexing method may, for example, be used to interpret signals from a quad-gradient antenna array when the gradient antenna coils may be wired allowing switching between each diametric pair of gradient antenna coils.

In another aspect, a least common multiple method may, for example, be used to determine the period at which the switching between gradient antenna coils occurs. In some embodiments, the locating device may be enabled to sense the frequency of the signal, for instance, 50 Hz or 60 Hz. Such embodiments may be further enabled to sync the switching of the gradient antenna coils at the zero crossing of one of the phases of the sensed 50/60 Hz grid.

In another aspect, the disclosure relates to one or more computer readable media including non-transitory instructions for causing a computer to perform the above-described methods, in whole or in part.

In another aspect, the disclosure relates to apparatus and systems for implementing the above-described methods, in whole or in part.

In another aspect, the disclosure relates to means for implementing the above-described methods, in whole or in part.

Various details of aspect of embodiments of buried object locator systems and related elements, such as may be used in embodiments of the present invention in conjunction with the disclosure provided herein, are described in co-assigned U.S. Pat. No. 7,741,846 (for example in FIG. 6), U.S. Pat. Nos. 7,948,236, 7,990,151, and U.S. Patent Application Ser. No. 61/521,362. The content of each of these patent and patent applications is incorporated by reference herein in its entirety.

Ina typical application, a buried or hidden object maybe a wire, pipe, or other conductor under the ground or in a wall, floor, etc that is coupled directly or indirectly to a current source from a buried object locator system transmitter. Alternately, in some applications, a magnetic signal source, such as a vertical dipole antenna, may be introduced into a buried object such as a water or sewer pipe to generate a magnetic field to be sensed.

An exemplary embodiment of a buried object locating system includes a buried object transmitter (also denoted herein as a "transmitter" for brevity) including one or more modules for outputting (transmitting) a plurality of current signals simultaneously, a corresponding buried object locator (also denoted herein as a "buried object locator" "buried utility locator," or just "locator" for brevity), including one or more modules for detecting or sensing (receiving) a plurality of magnetic field signals (from the current signals) simultaneously, as well as one or more processing and output modules for processing the received signals to generate user information, such as, for example, data or information to be provided on a visual display device such as an LCD panel, an audible output, such as may be provided on speakers, a headphone, a buzzer, or other audio output device, and/or data or information to be stored in memory for later processing or use, such as on a separate computing device or system.

The transmitter and corresponding locator may each further include one or more modules for receiving timing and/or location/position information. Such a transmitter is typically configured to generate and send a plurality of current output signals at predefined frequencies simultaneously and flow through the buried object to determine the location, or "trace" or map of the buried object, typically over an area of ground or other surface, such as through a lawn, field, yard, road, or other area. The transmitter may further be configured to induce current in a buried object with a magnetic field output via a vertical dipole antenna and/or an inductive clamp. In some embodiments, sonde devices, which are another form of transmitter and antenna that can be deployed directly within the buried object, may be used. The buried object may be located by measuring magnetic fields emitted from the buried object and, selecting the strongest or most suitable transmission out of a plurality of transmissions at predefined frequencies sensed at the locating receiver, and determining underground location information of the buried object based on the received information. In particular, output information in the form of a visual display and/or audible indication may be generated based on a plurality of received signals and provided to the user as an output based on the plurality of received signals, rather than on a single signal received at a particular frequency. In addition, a distortion metric may be generated based on the multiple received signals, such as a distortion metric based on different estimates of position, depth, and/or angle of the buried object as determined at multiple frequencies.

In an exemplary embodiment, the distortion may be displayed graphically, such as, for example, by providing an image with a distorted feature, such as blurring, dotting, hashing, different colors or shapes, or other distortions, to indicate the position of the buried object and/or any cross-coupled adjacent objects, on a display element or device, such as an LCD panel or other display, and/or on an audio output device such as headphones or speakers.

For example, in one embodiment current direction along a utility line may be indicated by showing distortion as a motion on the graphics display, such as a "crawling ants"—type display or other motion display.

The plurality of predefined frequencies output at the buried object transmitter may include, for example, a base signal frequency wherein additional frequencies are integer multiples of the base frequency to provide current signals at higher frequencies. Such frequencies may be generated and phase locked via multi-input phase locked loop. For example, in an exemplary embodiment, a base frequency of 710 Hz may be used, as well as integer multiples of the base frequency, such as [7,810 Hz (710×11)], [85,910 Hz (for an HF direct connection) (710×121)], and [93,720 Hz (for an HF induction connection) (710×132)]. Other frequencies may alternately be used in various embodiments. Unique and distinct frequency sets may be allocated to different type of connections from the transmitter, such as a first set for directly connected signal outputs, a second set for inductively coupled signal outputs, and a third set for sonde signals. A corresponding locator may also have the unique frequency information, and/or may communicate it to the transmitter and/or may receive it from the transmitter, and may then process the received signals based in part on knowledge of the corresponding connection type (e.g., processing direct, inductively coupled, and/or sonde signals based on a particular magnetic field model associated with each connection type).

Information associated with the buried object may be determined if the timing or phase of the current signal in the buried object can be controlled, such that the transmitter and locator can be synchronized with respect to phase information of the current in the buried object. In an exemplary embodiment, the transmitter and locator may each include independent timing synchronization modules for receiving timing information from a timing reference, such as from a satellite system such as GPS or GLONASS, from a terrestrial system, such as from WWV or other terrestrial timing systems, from cellular systems, such as CDMA systems, LTE systems, or other cellular systems, and/or from a local timing system, such as a reference timing transmitter coupled to a time reference such as a rubidium clock, which may be located in a truck or other field test vehicle. Phase shifts or differences between the current coupled to the buried object (which may be synchronized with timing information received at a transmitter) may then be measured and compared with a second timing reference signal (which may be independently synchronized with second timing information received at a locator) to determine information related to current flow, such as directional information relative to the locator orientation. By independently synchronizing the transmitter and locator, current directional information, as well as other information associated with the buried object, may be determined, displayed, and/or stored on the locator.

In an exemplary embodiment, the buried object locating system may include a communications link, such as an Instrumentation, Scientific, Medical band (ISM) radio module for connecting a locating transmitter with a locating receiver. In an exemplary embodiment, the transmitter may provide timing information including a timing reference to the locating receiver via the ISM radio module. The locating transmitter may further provide information associated with a selected utility to a mapping database for generating data viewable on a graphical user interface (GUI).

The buried object locating system may include method for synchronizing the phase of the transmitter with the phase of the receiver (locator). In an exemplary embodiment, GPS may be used as a synchronization source. For example, the output (1 pulse per second (pps)) of the GPS may be used by the time base module in both the transmitter and the receiver (locator) to coordinate or establish a phase relationship. In an alternate embodiment, radio (hard or soft) may be used as a synchronization source to coordinate the transmitter phase and the receiver (locator) phase reference. In both examples, the time base at the transmitter may be synchronized to receiver (locator) phase reference, and the time base in the receiver may utilize information associated with the phase relationship to provide information including the direction of current flow.

In an exemplary embodiment, the locating transmitter may include, for example, transmitter housing. The transmitter may further include one or more inducing elements, such as for example, a vertical dipole inducing element, and an integrated inductive element, such as, for example, an air or ferrite core or other ferromagnetic core to provide an induction facility which may be used in addition to, or separate from, the vertical dipole inducing element. Both inducing elements may be operated simultaneously and at different frequencies when the integrated inductive element is oriented substantially orthogonal to the vertical dipole inducing element. The transmitter may further include, an antenna housing including a high "Q" dipole antenna which may be vertically oriented relative to the center-line of the transmitter housing. The transmitter housing may include, for example a molded hollow case including one or more receptacles for stowage of electrical cords, and the like. The transmitter housing may be configured with a coupling apparatus for directly or inductively coupling the current output signal of the transmitter to the buried object. Clips and/or inductive clamps may be disposed at each end of the electrical cords to directly couple current from the transmitter into the buried object. Alternatively, the transmitter may be configured with an inductive clamp to inductively couple current from the transmitter into the buried object. The transmitter housing may further include, for example, electronic circuitry including a power supply and various processing modules configured to control various operations. The transmitter housing may further include, for example, a battery shoe module for receiving a rechargeable battery pack.

The antenna housing may include, for example, a series of visual indicators for emitting a warning signal (i.e., a blinking red light or other warning signal). The antenna housing may include, for example a series of antenna coils arranged orthogonally and disposed in the center region of the antenna housing. The antenna housing may further include one or more GPS receiver antennas for receiving timing information from a GPS, and one or more ISM radio antennas capable of receiving and transmitting information, such as timing information, to a corresponding locator.

The following exemplary embodiments are provided for the purpose of illustrating examples of various aspects, details, and functions of apparatus, methods, and systems for locating buried or hidden objects; however, the described embodiments are not intended to be in any way limiting. It will be apparent to one of ordinary skill in the art that various aspects may be implemented in other embodiments within the spirit and scope of the present disclosure.

It is noted that as used herein, the term, "exemplary" means "serving as an example, instance, or illustration." Any aspect, detail, function, implementation, and/or embodiment described herein as "exemplary" is not necessarily to be construed as preferred or advantageous over other aspects and/or embodiments.

Various additional aspects, features, and functions are described below in conjunction with FIGS. 1 through 40 of the appended Drawings.

Referring to FIG. 1, a buried object locating system 100 on which embodiments of the present disclosure may be implemented is shown. In an exemplary embodiment, a transmitter 120, which may include a vertical dipole antenna, may provide an inductive magnetic field output 117 for inducing alternating current (AC) in a buried object 111, buried under ground 115 (such as under a street, soil or grass, concrete, or other surface). Transmitter 120 may include one or more antennas (not shown) and associated receiver modules (not shown) to receive a signal, which may include timing information. The received timing information may then be used to generate timing reference signals which may be further used to determine current flow information as described subsequently herein. In an exemplary embodiment, a global positioning satellite system (GPS) antenna may be coupled to a GPS receiver module (not shown) in transmitter 120. The GPS receiver module may provide an output timing signal, such as a pulse output at 1 pulse per second (pps), 10 pps, or at another predefined frequency. Other configurations of timing synchronization modules may include a terrestrial radio timing system, a local timing system (i.e., a system where a local timing reference is generated and transmitted to both the transmitter and locator), or other devices capable of receiving a signal including timing information.

Still referring to FIG. 1, a corresponding locator 103 may be used for detecting a series of electromagnetic signals 109 radiated or emitted from the buried object 111, such as by using one or more locator antenna nodes or coils, such as antenna nodes 105 and 107. One or more of the strongest or most suitable transmission may then be selected (manually or automatically) out of a plurality of predefined frequencies. Locator 103 may include one or more antennas (not shown) which may be similar to the antennas of transmitter 120, and may likewise include a receiver module (not shown) coupled to the antennas to detect and process signals including timing information. For example, locator 120 may similarly receive GPS or other signals with timing information and may independently generate reference signals based on the received timing information. In an exemplary embodiment, the transmitter 120 may be connected to the locator 103 via an ISM link (not shown) to provide information including timing information. The transmitter may additionally transmit a signal associated with a selected utility to a mapping database via ISM.

Figure 2:
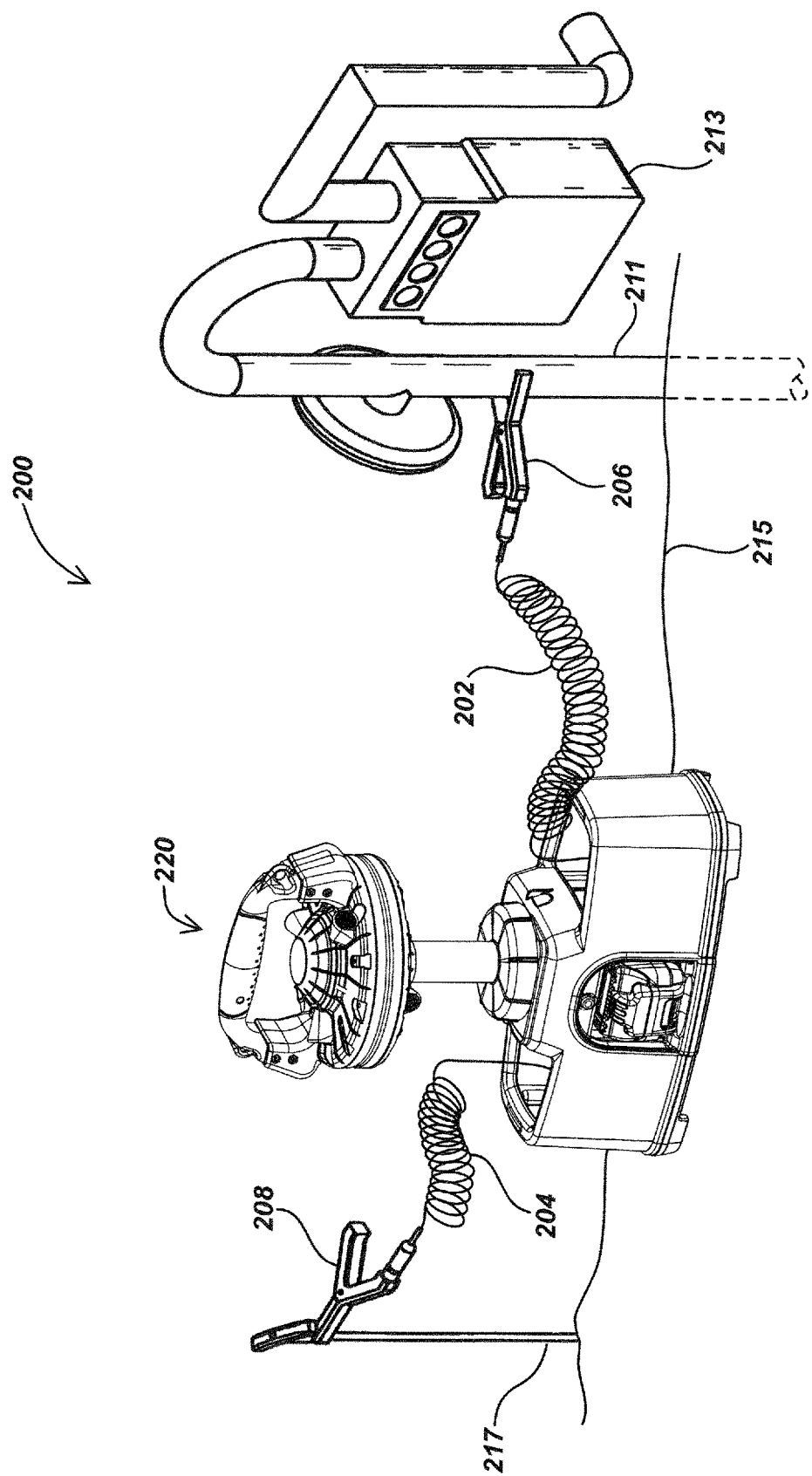
FIG. 2 illustrates details of a direct connection transmitter embodiment.

FIG. 2 illustrates details of a direct connection transmitter system embodiment 200. In an exemplary embodiment, current may be coupled from a transmitter 220 to a utility line, such as an above-ground gas line 211 joined with gas meter 213. A direct connection mechanism or device, such as an alligator clip 206, may be used to physically attach a cord 202 extending from a connection of the transmitter 220 to the gas line 211. Additionally, a ground connection mechanism or device, such as alligator clip 208 may be used to physically attach a cord 204 extending from a connection at the transmitter 220, to a ground element 217, which may be a metal stake pounded into the ground, such as, for example, ground 215. In this configuration, current flows from the connection of transmitter 220 through the gas line 211, and returns to the ground element 217. The return path may be governed by various characteristics of the ground, such as soil conductivity. An inductive clamp (not shown) may optionally be used to couple an electromagnetic signal to the buried object or utility, and induce a predefined current in such buried object or utility (not shown).

In an alternate embodiment, the transmitter housing may include, for example, an electrically conductive stowage element for detecting and indicating the stowage position status of clips 206 and 208. For example, the electrically conductive stowage point may be electrically connected to sensing circuitry that would allow the processing logic within the transmitter to provide information associated with the stowage position status of clips 206 and 208. The electrically conductive stowage element may be constructed of conductive plastic or conductive metal, or other similar materials.

Figure 3:
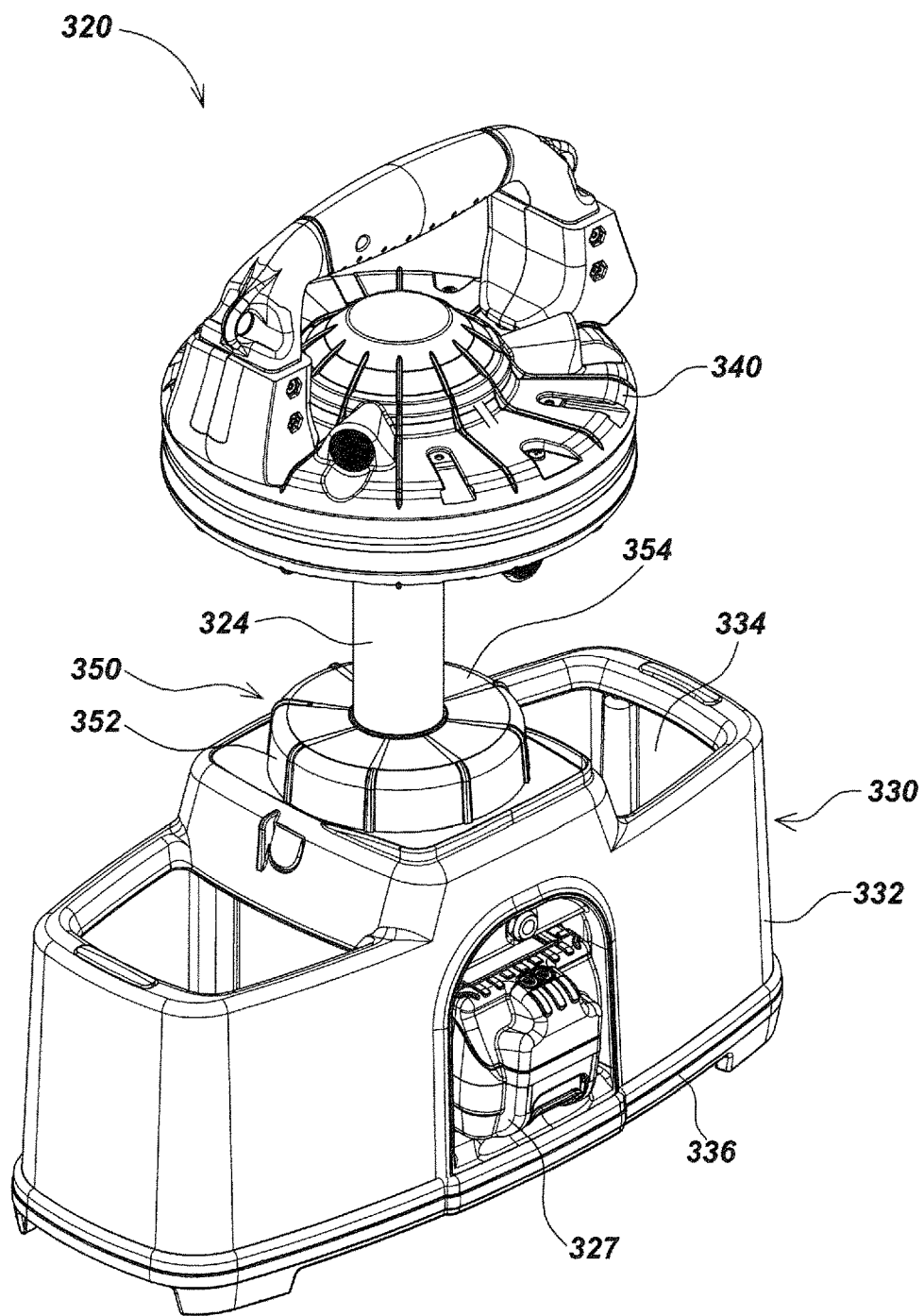
FIG. 3 is an isometric view of an embodiment of a vertical dipole transmitter.

FIG. 3 illustrates details of an embodiment of a vertical dipole transmitter 320. In an exemplary embodiment, an antenna housing 340 may be oriented vertically relative to the center-line of transmitter housing 330 with a mast 324. A rechargeable battery, such as a lucid battery 327, may be disposed in the transmitter housing 330. Lucid battery 327 and a corresponding receiver and/or shoe module (not shown in FIG. 3) may be constructed in accordance with embodiments described in U.S. Patent Application Ser. No. 61/501,172, filed Jun. 24, 2011, entitled MODULAR BATTERY PACK APPARATUS, SYSTEMS, AND METHODS; and U.S. Patent Application Ser. No. 61/521,262, filed Aug. 8, 2011, entitled MODULAR BATTERY PACK APPARATUS, SYSTEMS, AND METHODS, the entire contents of which are incorporated by reference herein. The transmitter housing 330 may include a hollow molded case 332 including receptacles 334, and may be coupled to a base element 336. The transmitter housing may include a selector assembly, which may include a selector dial 352. A color coded guide provided by a selector label 354, which may be disposed on the surface of selector dial 352, may be used for guiding the selection of a utility, such that information associated with the selected utility may be transmitted to a database, such as, for example, a mapping database, and/or may be recorded for later use.

Still referring to FIG. 3, transmitter 320 may be used to generate and output a phase synchronized current to a buried object, and a corresponding magnetic field may be sensed by a locator antenna. The output signal may be provided to a current direction processing module, where it may be further processed to determine a direction of the current flowing in the buried object (relative to an orientation of the locator antenna). For example, the output signal may include information associated with the buried object current, such as direction, amplitude, phase information, and/or other information. This information may be used by a display module to generate displays of current flow and/or other information associated with the current and/or buried object.

Figure 4:
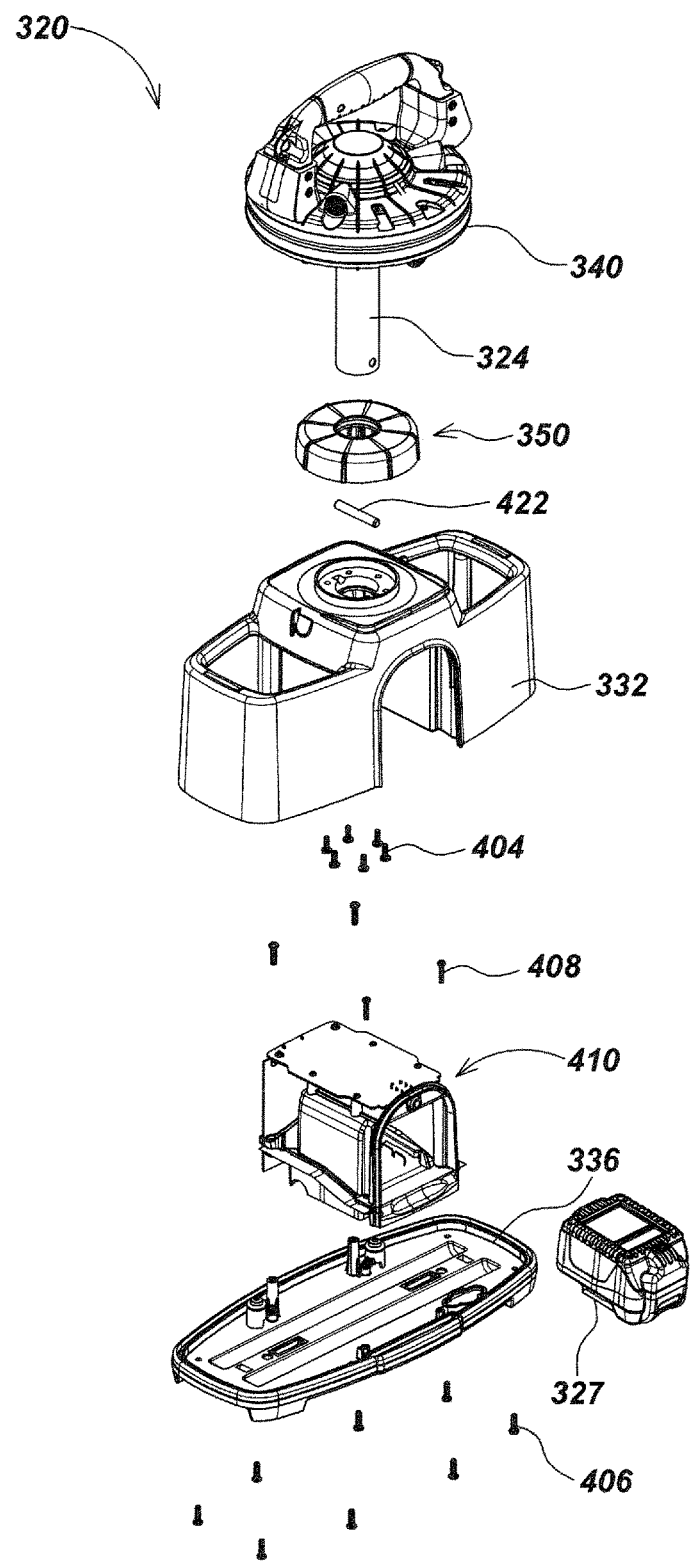
FIG. 4 is an exploded view of the transmitter embodiment of FIG. 3.

FIG. 4 illustrates additional details of the vertical dipole transmitter embodiment 320 of FIG. 3. For example, the antenna housing 340 including mast 324 may be secured into the hollow molded case 332, and through the selector assembly 350, with a fastener such as a pin 422 and a plurality of screws 404. A battery enclosure assembly 410 may be disposed in transmitter housing 330 (FIG. 3) and mounted to base 336 with a plurality of fasteners, such as screws 408. The hollow molded case 332 may be mounted the base 336 with a plurality of fasteners, such as screws 406.

Figure 5:
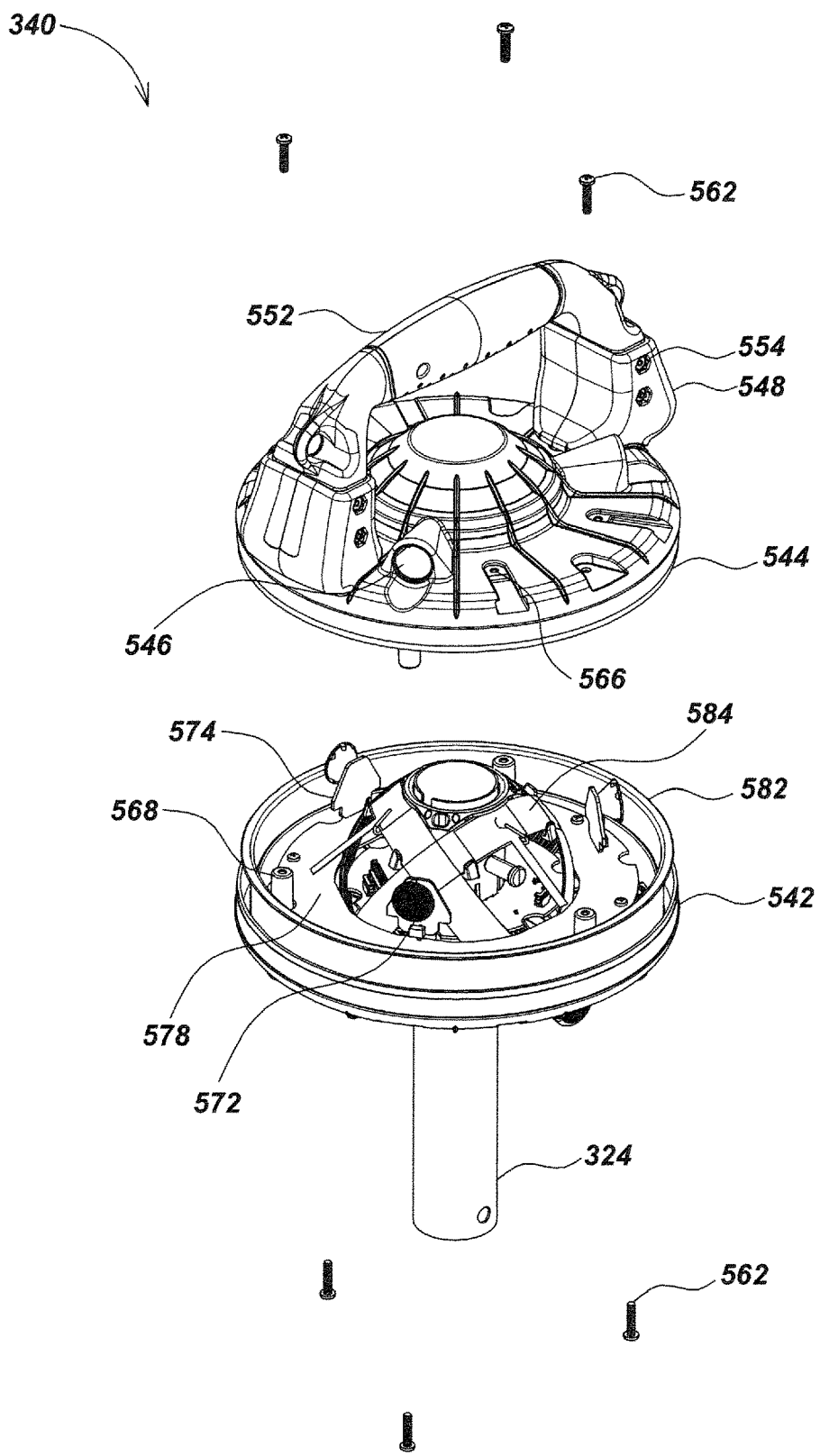
FIG. 5 illustrates details of an embodiment of a high-Q dipole antenna.

FIG. 5 illustrates details of an embodiment of antenna housing 340 which may include a high-Q dipole antenna, disposed at the end of mast 324. The antenna housing, and elements disposed therein, may be constructed in accordance with embodiments described in, for example, co-assigned U.S. Patent Application Ser. No. 61/485,078, filed May 11, 2011, entitled LOCATOR ANTENNA CONFIGURATION, and U.S. patent application Ser. No. 13/469,024, entitled BURIED OBJECT LOCATOR APPARATUS AND SYSTEMS, filed May 10, 2012, the entire contents of which are incorporated by reference herein. For example, in an exemplary embodiment, antenna housing may include an upper antenna housing 544 and a lower antenna housing 542 mated with one or more fasteners, such as screws 562, through one or more screw holes 566, which may be disposed on upper and lower antenna housing 544 and 542, and into one or more corresponding screw bosses 568. Antenna housing 340 may include one or more apertures 546, which may be disposed on upper antenna housing 544. A handle 552 may be disposed on the upper antenna housing 544, and may be coupled to the upper antenna housing 544 with handle adapters 548. Handle adapters 548 may be removably attached to the upper antenna housing and the handle may be secured to the adapters 548 with screws 554. One or more LED assemblies 572 may each be mounted to LED PCBs 574, which may each be electrically connected to LED PCB driver 578.

Still referring to FIG. 5, one or more coils, such as antenna node coils 584, which may be arranged orthogonally and disposed in the center region of housing 340, and an excitation coil 582, which may be disposed in along the equatorial region inside antenna housing 340. The excitation coil may be configured in accordance with certain details of embodiments described in co-assigned U.S. patent application Ser. No. 13/220,594, filed Aug. 29, 2011, entitled HIGH-Q SELF TUNING LOCATING TRANSMITTER, the entire content of which is incorporated by reference herein. In an exemplary embodiment, antenna housing may include high "Q" dipole antenna which may be vertically oriented relative to the center-line of the transmitter housing 330 (such as shown in FIGS. 1-4) which may be used to enclose various elements, such as circuitry for supporting the power and power supply (not shown in FIG. 5).

Figure 6:
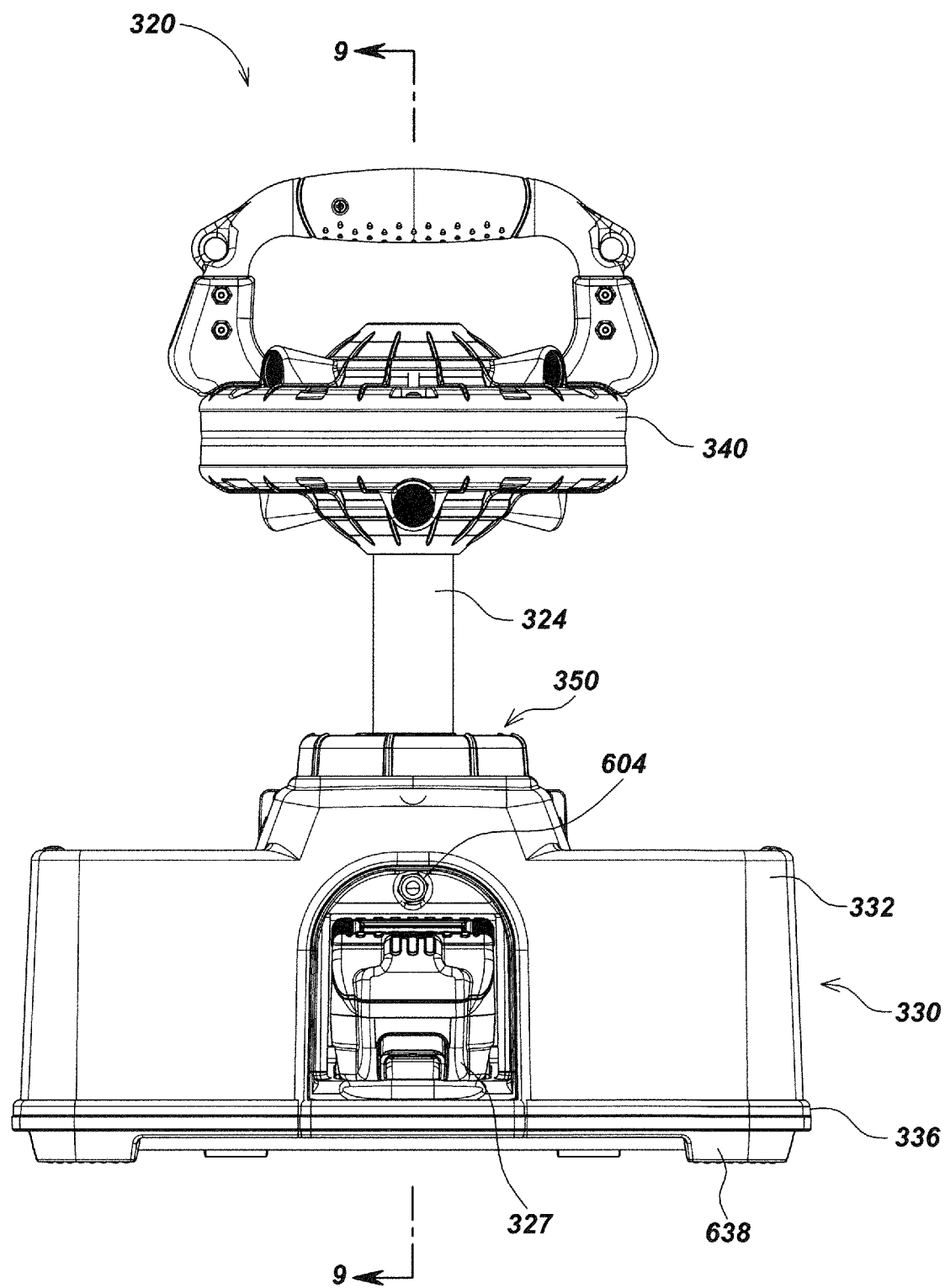
FIG. 6 is a front view of a vertical dipole transmitter embodiment of FIG. 3.

FIG. 6 illustrates additional details of the transmitter embodiment 320 as shown in FIGS. 2-4. A port or jack 604 may be used for connection with a coupling device, such as an inductive clamp, which may be used to induce current from transmitter 320 into the buried object (not shown). Jack 604 may be disposed between the surface of the printed circuit substrate (not shown in FIG. 6) and upper battery enclosure (not shown in FIG. 6), and accessible through an aperture (not shown in FIG. 6), which may be disposed on or inside the housing 330.

Still referring to FIG. 6, one or more pedestals or feet 638 may be disposed on the bottom surface of the transmitter housing 330 to provide elevation and facilitate heat transfer (away from the battery). Feet 638 may be disposed along the outer perimeter of the base element 336 of the transmitter housing 330. Feet 638 may be removably or permanently coupled to the base element 336 using known mechanical or chemical processes. Feet 638 may formed or coated with skid-resistant or shock absorbing materials, such as rubber or plastic to provide vibration dampening, improved grip, and/or other ergonomic considerations. Feet 638 may further be electrically conductive to provide an alternate grounding connection in locations where soil grounding points or other grounding points are otherwise not available. If a grounding stake is also used, the processing circuitry (not shown) disposed inside the transmitter housing may be used to compare the grounding connection of the lead connected grounding point with the surface contact of the conductive feet 638.

Figure 7:
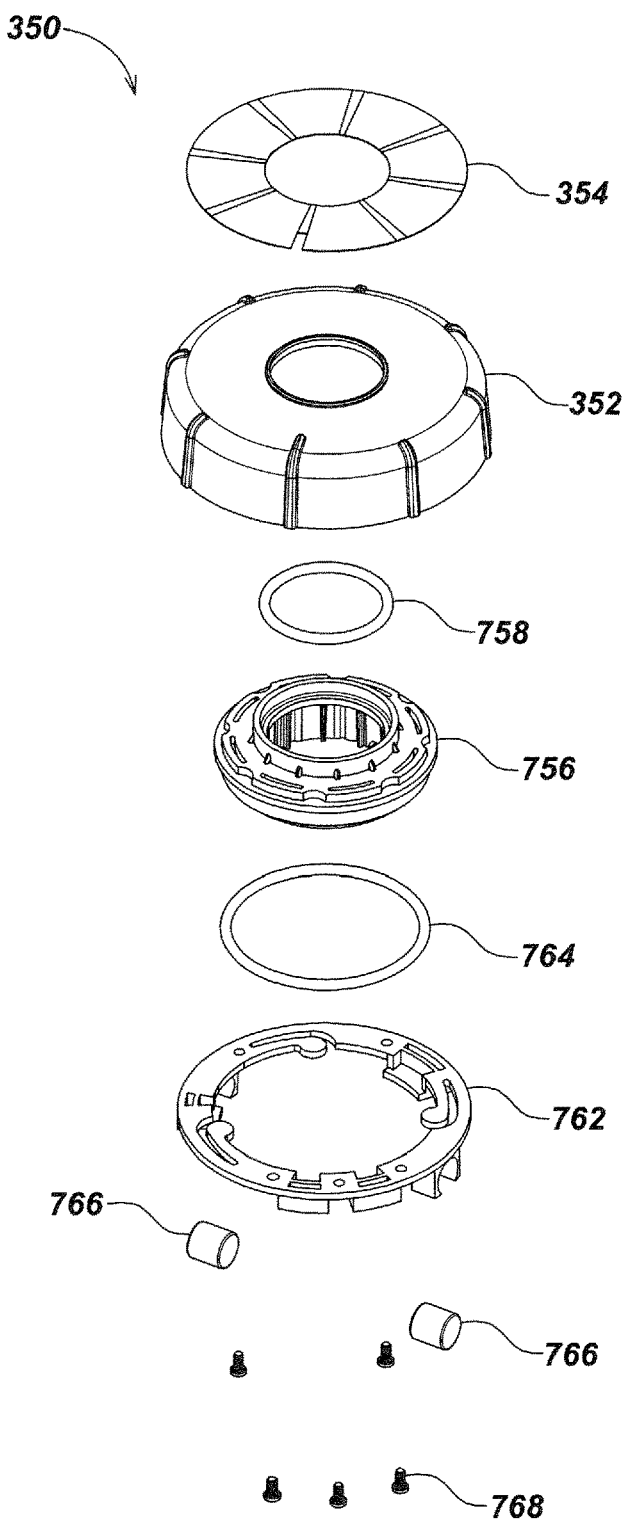
FIG. 7 is an exploded view of a selector assembly.

FIG. 7 is an exploded view illustrating details of the selector assembly 350. In an exemplary embodiment, selector assembly 350 (FIG. 3) may be configured with various elements. For example, selector dial 352 (FIG. 3), a keeper plate 756, and a magnet snap 762, may be secured with one or more screws 768. Magnet snap 762 may be coupled with magnets 766. A sealing element, such as O-ring 758 may be disposed between selector dial 350 and a keeper plate 756. A larger O-ring 764 may be disposed between keeper plate 756 and the hollow molded case (not shown in FIG. 7. Indicator label 354 (FIG. 3) may be disposed on the top surface of selector dial 352 to indicate the type of utility that the transmitter may be connected to.

In one aspect, an operator may turn the selector dial 352 to indicate the type of utility based on a color codes corresponding with various utilities which may include, water, gas, electricity, telecommunications, sewer, recycled water, and the like. For example, the indicator label 354 may include colors conventionally used for coding the type of utility and marking thereof, such as Blue (water), Red (power), Yellow (gas), Green (Sewer), Orange (Telecommunications), and Purple (Recycled Water). White (proposed dig area) and Pink (temporary survey marks) may optionally be included for various locating activities. Turning selector dial 352 may cause the transmitter 320 to change frequency settings, or may alternately cause the transmitter to transmit and/or record information associated with the selector settings using various methods which may be available and/or known in the art. For example, the transmitter 320 may transmit information associated with the selected utility to a mapping database, or may be recorded for later use.

Figure 8:
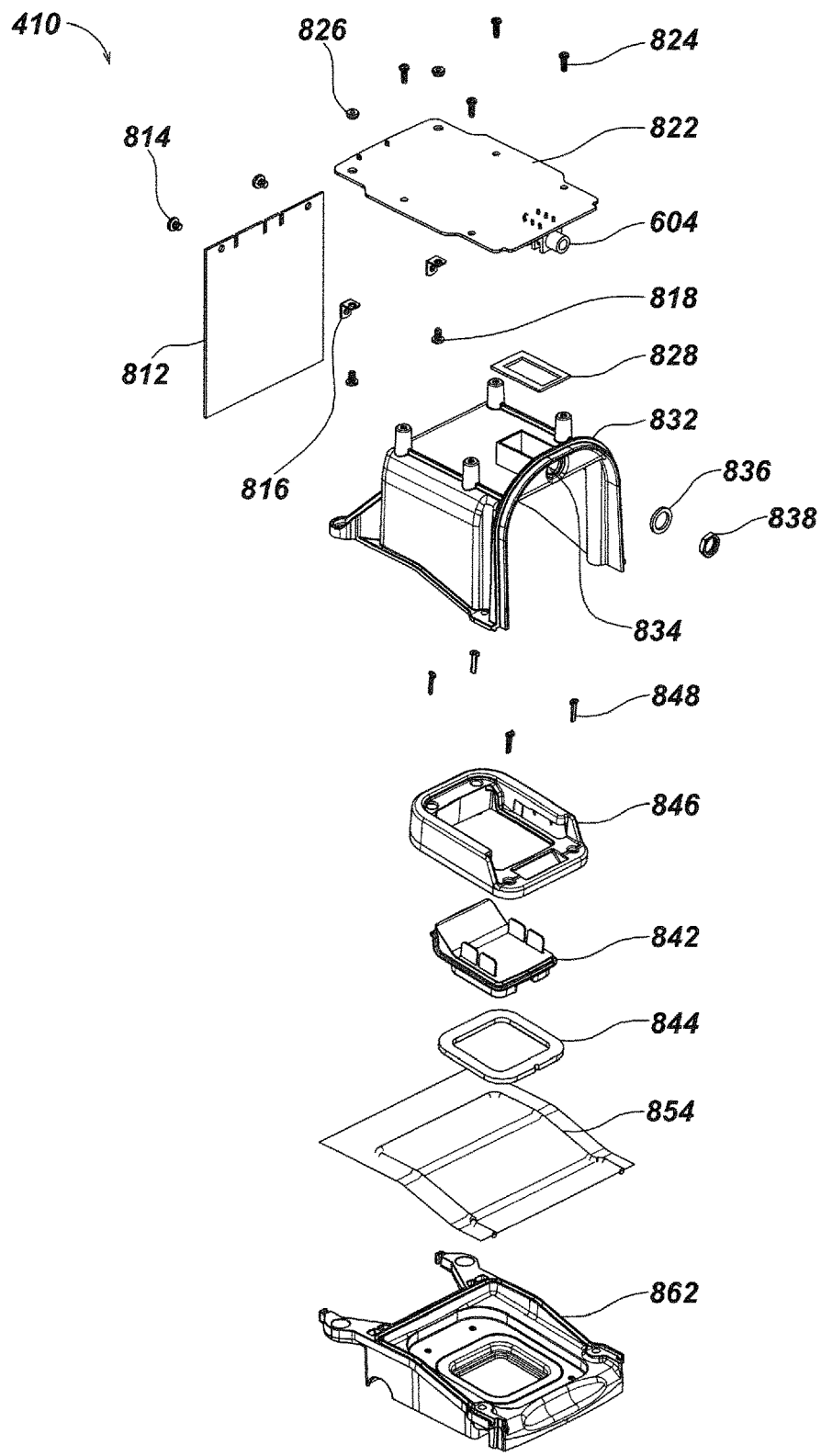
FIG. 8 is an exploded view of a battery enclosure assembly.

FIG. 8 illustrates additional details of the battery enclosure assembly 410 of FIG. 4. In an exemplary embodiment, an electronic circuit may be physically supported on one or more printed circuit boards, such as a power circuit board 812 and processing circuit board 822, which may be mounted inside the transmitter housing 330 (not shown in FIG. 8). Battery enclosure assembly 410 may include an upper battery enclosure element 832 coupled with a lower battery enclosure element 862. A sealing element 854 may be disposed between upper battery enclosure element 832 and a lower battery enclosure element 862. Power circuit board 812 may be disposed on the rear side of battery enclosure assembly 410 in a vertical orientation and connected to processing circuit board 822, with one or more pairs of screws, such as screws 814 and 818 and brackets 816. Processing circuit board 822 may be mounted to the top side of upper battery enclosure element 832 in a horizontal orientation, with one or more fasteners, such as screws 824 and nuts 826.

Still referring to FIG. 8, an aperture 832 may be disposed on upper battery enclosure element 832 which may be configured with jack 604. Jack 604 may be coupled to the processing circuit board 822, and secured through aperture 832 with a washer 836 and a bolt 838. A sealing element, such as foam layer 828, may be disposed between top battery enclosure element 832 and processing circuit board 822 for providing a waterproof seal for jack 604. A battery receiver, which may include elements such as a lucid battery shoe 842, which may be sealed to a mount 846 with a sealing element, such as foam 844, may be secured to lower battery enclosure element 862 with one or more fasteners, such as screws 848. The lucid battery shoe and receiver may be constructed in accordance with embodiments described in U.S. Patent Application Ser. No. 61/501,172, filed Jun. 24, 2011, entitled MODULAR BATTERY PACK APPARATUS, SYSTEMS, AND METHODS, and U.S. Patent Application Ser. No. 61/521,262, filed Aug. 8, 2011, entitled MODULAR BATTERY PACK APPARATUS, SYSTEMS, AND METHODS the entire contents of which are incorporated by reference herein.

Figure 9:
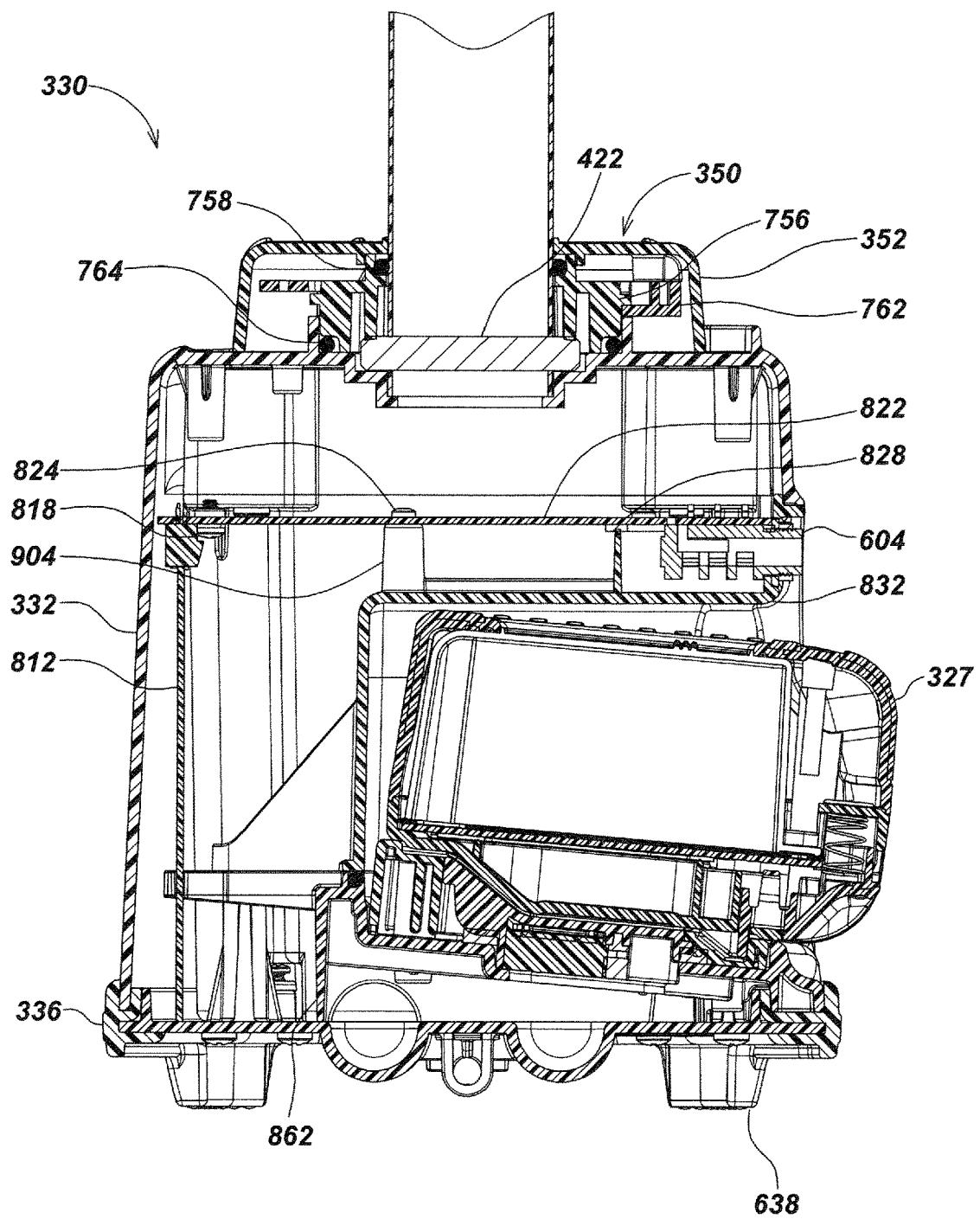
FIG. 9 is a cutaway section view of a transmitter housing embodiment of FIG. 3, taken along line 6-6.

FIG. 9 is a cutaway section view of a transmitter housing embodiment 330 of FIG. 3, taken along line 6-6 illustrating additional details. For example, processing circuit board 822 may be mounted to upper battery enclosure element 832 with one or more fasteners, such as screws 824 into screw bosses 904. Battery 327 as shown, may be a lucid battery, which may be constructed in accordance with embodiments described in U.S. Patent Application Ser. No. 61/501,172, filed Jun. 24, 2011, entitled MODULAR BATTERY PACK APPARATUS, SYSTEMS, AND METHODS, and U.S. Patent Application Ser. No. 61/521,262, filed Aug. 8, 2011, entitled MODULAR BATTERY PACK APPARATUS, SYSTEMS, AND METHODS the entire contents of which are incorporated by reference herein.

Figure 10:
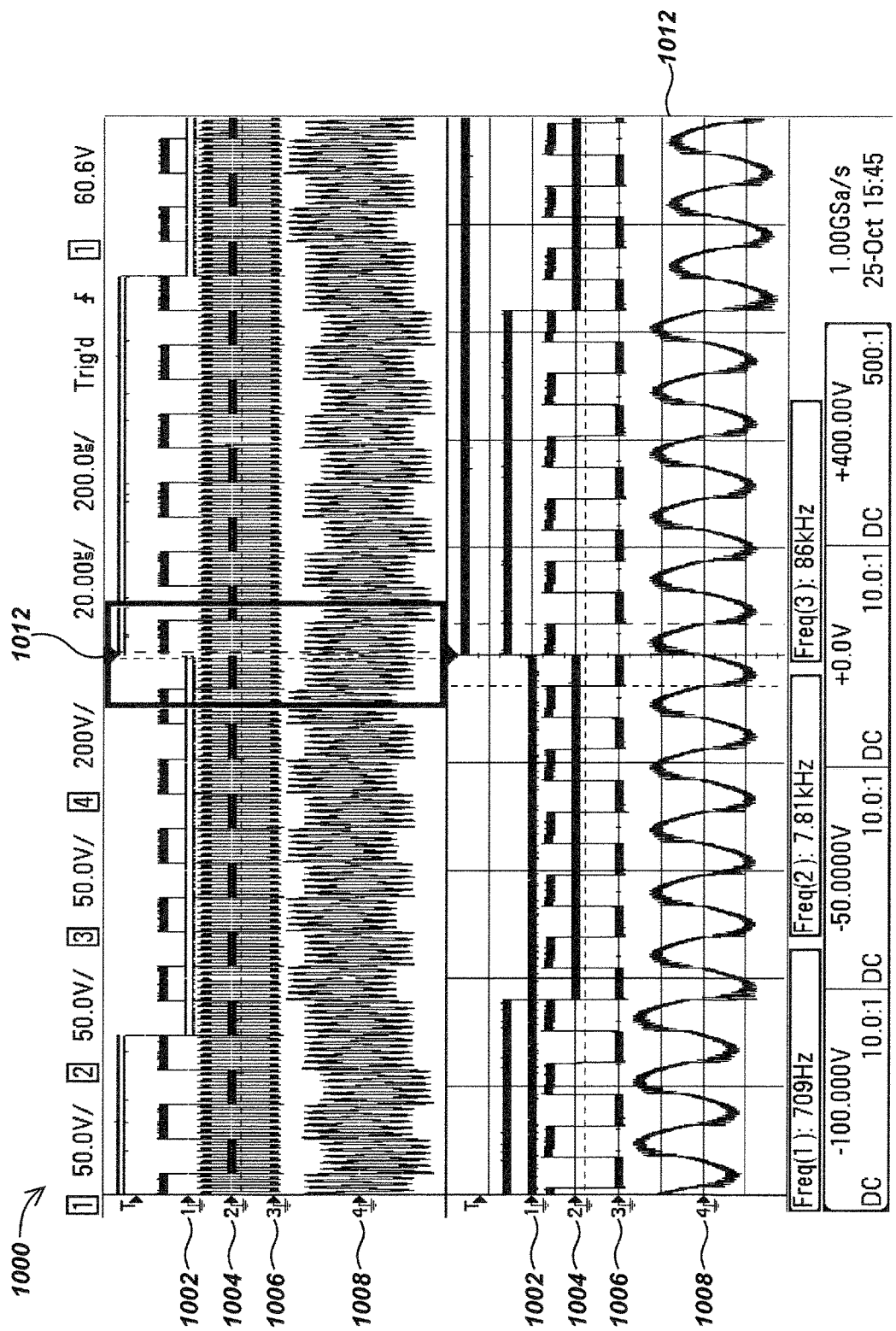
FIG. 10 is a display of an oscilloscope illustrating a plurality of phase-aligned waveforms.

FIG. 10 illustrates details of example waveforms as may be generated in a buried object locator system such as those described herein. As shown in oscilloscope display graph 1000, a plurality of phase aligned output waveforms 1002, 1004, and 1006 may be generated and provided from a buried object locator system transmitter, such as transmitter 200 as described previously herein. In graph 1000, waveforms 1002, 1004, and 1006 are displayed simultaneously in time, with the top half of graph 1000 showing the waveforms at zoomed-out scaling, while the lower half of the graph (denoted as 1012), showing a zoomed-in version of the same waveforms to better illustrate the phase relationships between the signals. In a locator transmitter, current output signals, such as signals 1002, 1004, and 1006 may be separately generated and combined by a signal combiner module (not shown) to provide a combined output signal, shown as waveform 1008. Enlarged graph section 1012 illustrates the relative phase alignment of waveforms 1002, 1004, 1006, and 1008.

In an exemplary embodiment, waveform 1002, which may have a base frequency such as 710 Hz (or other base frequencies such as 810 Hz, etc. in alternate embodiments), may be provided, as well as odd and even integer multiples thereof. In an exemplary embodiment, current signals provided via direct connection may be odd integer multiples of the base frequency. For example, waveform 1004 may correspond to an mid frequency output, such as 7,810 Hz (710×11), and waveform 1006 may correspond to a high frequency output (direct), such as 85,910 Hz (710×121), both of which may be phase locked to the base frequency and one another, and transmitted simultaneously to a buried object. In an exemplary embodiment, current signals induced in a buried object may be even integer multiples of the base frequency 710 Hz, such as for example, a high frequency output, such as at 93,720 Hz (710×132), which may be provided via induction, and may be phase-locked and transmitted simultaneously with one or more frequency outputs provided via direct connection.

In one aspect, high frequency output signals may be provided at high voltages, and low frequency output signals may be provided at low voltages. In an exemplary embodiment, low frequency (LF)-low voltage (LV) outputs and high frequency (HF)-high voltage (HV) outputs may be output simultaneously. In one aspect, HF-HV transmissions may flow over the surface of the body, which may provide improved operator safety. Additionally, higher voltages allow more current to flow in high resistance or high impedance circuits, which are often encountered in utility locating operations, such as in low-moisture soil conditions providing poor grounding and/or conductivity, or in water pipes with electrically insulating rubber couplings disposed between adjacent sections.

Figure 11:
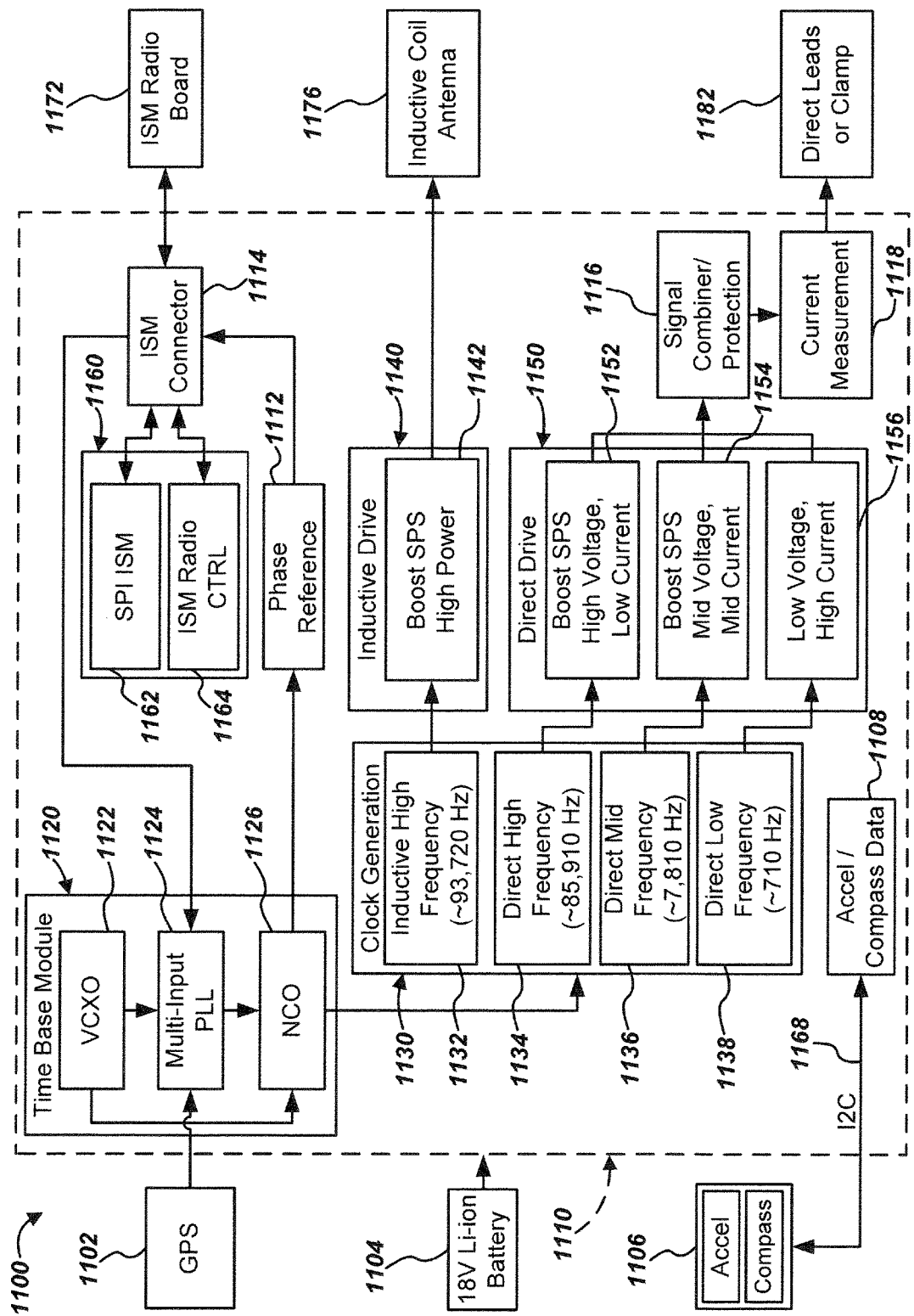
FIG. 11 is a flowchart illustrating details of an embodiment of a buried object locating transmitter system.

FIG. 11 is a block diagram illustrating details of an embodiment of a buried object locating transmitter system 1100. Transmitter module 1110 of the transmitter system 1100 may correspond with or be a component of a buried object transmitter such as transmitter 120 as shown in FIG. 1. Transmitter module 1110, which may be physically implemented on one or more printed circuit boards (PCBs) or other circuit elements, may include various processing modules, such as a time base (synchronization) module 1120, a clock generation module 1130, an inductive drive module 1140, a direct drive module 1150, and/or other modules used for receiving, processing, generating, and sending signals or data. In addition, transmitter system 1100 may include one or more processing elements (not shown), which may be used to control overall operation of the transmitter system and/or operation of individual modules such as modules 1120, 1130, 1140, 1150, and 1160, as well as related modules such as GPS module 1102, inertial sensor module 1106, battery module 1104, ISM radio module 1172 and/or other modules in system 1100.

In an exemplary embodiment, transmitter module 1110 and a receiver module (not shown, but which may correspond with locator 103 of FIG. 1) may each include a time base module 1120 for receiving timing information from a synchronization source, such as from a satellite system, such as a GPS module 1102. Various other time synchronization sources may be used in place of or in addition to a GPS module if the location or surrounding environment of the operation obstructs satellite reception. For example, an industrial, scientific and medical (ISM) radio module, such as ISM Module 1172, may be used as a synchronization source in areas not conducive for satellite reception. In an exemplary embodiment, a multi-input phase lock loop (PLL) module 1124 will look for a synchronization source, and may then prioritize synchronization signals from that of GPS module 1102 and ISM module 1172 (external synchronization sources) and/or other time synchronization sources (not shown). If the input reference frequency from an external synchronization source (GPS or ISM) is temporarily lost or of poor quality, then an internal synchronization source, such as a Voltage Controlled Crystal Oscillator (VCXO) module 1120 may be used. For example, VCXO module 1120 may be allowed to free run for a period of time, t, when other signals are not available and may be configured to remain close to phase when out of sync, such as by setting up appropriate open-loop parameters.

Still referring to FIG. 11, GPS module 1102 may provide an output (such as, for example, at a standard rate such as 1 pulse per second (pps)), which may be used by the time base module 1120 at both the transmitter and the receiver (locator) to coordinate or establish a phase relationship. A multi-input phase lock loop module (PLL) 1124 may slew the external synchronization source or local oscillator, such as the VCXO 1122, with a control voltage to provide a phase/frequency lock. The PLL 1124 may then output a constant time base, such as at a frequency of 10 MHz, to a Numerically Controlled Oscillator (NCO) 1126. In an exemplary embodiment, the NCO 1126 then takes the 10 MHz signal, and produces a frequency signal output to both the phase reference 1112 and the clock generation module 1130.

Still referring to FIG. 11, the clock generation module 1130 may provide an output clock frequency signal based on an input clock frequency signal. The input clock frequency signal may, for example, be generated directly by a crystal oscillator, such as a voltage-controlled crystal oscillator, such as for example, VCXO 1122, or a phase-locked loop (PLL), which may be locked to the frequency of the crystal oscillator. Output dividers (not shown) may be used to divide by odd or even integers to generate predefined output clock frequency signals which may include, for example, a direct low (or base) frequency (LF) output 1138, such as 710 Hz, as well as integer multiples of the low or base frequency output 1138, such as a direct mid-frequency (MF) output 1136, such as, for example, 7,810 Hz, a direct high frequency (HF) output 1134, such as for example, 85,910 Hz, and an inductive high frequency (HF) output 1132, such as, for example, 93,720 Hz.

In an exemplary embodiment, a power source 1104, such as a 18 V Li-ion battery or other power source, may provide a voltage signal to module 1110. Module 1110 may include one or more switched-mode power supplies (SMPS) or boost converters, for stepping up the input voltage to provide higher voltage output signals at predefined frequencies. Such higher voltage output signals may be used for driving signals across high-impedance barriers in a buried object, such as, for example, high impedance coupling elements in a gas pipe. For example, an inductive drive circuit 1140 may be coupled to a high voltage boost converter to generate a high power output signal 1142 suitable for inducing an alternating electrical current in a buried object via inductive coil or antenna 1176. A direct drive circuit 1150 may include one or more boost converters for stepping up the input voltage to provide a high voltage-low current output signal 1152 and mid voltage-mid current output signal 1154 to be directly coupled into a buried object. Output signals 1152, 1154, and low voltage-high current output signal 1156 may be combined via signal combiner module 1116, measured (current) 1118, and directly coupled into a buried object simultaneously via direct leads or clamps 1182.

A connector, such as an Instrumentation, Scientific, Medical band (ISM) connector 1114, may interface with an ISM radio module 1160, which may include a SPI data interface 1162, a control module 1164, and an ISM radio module 1172. Synchronization input from ISM radio module 1172 via ISM connector 1114 may provide a periodic synchronization signal at a fixed rate, such as, for example, 1 pps as from GPS module 1102, or at a specific clock frequency. A synchronization input from ISM radio module 1172 may further provide a software synchronization signal, which may specify a time that the synchronization event occurred. In an environment where GPS lock may be intermittent, or temporarily lost, the time base may be periodically set as GPS is available, and the synchronization event may be used to connect back to the free running clock, such as VCXO 1222. Synchronization output to ISM radio 1172 via phase reference 1112 and ISM connector 1114 may provide a periodic synchronization signal output, at a fixed rate, such as 1 pps, as from GPS 1102, or at a specific clock frequency, and may optionally provide a software synchronization signal with reference to GPS 1102, or internal time base, such as VCXO 1122.

Figure 12:
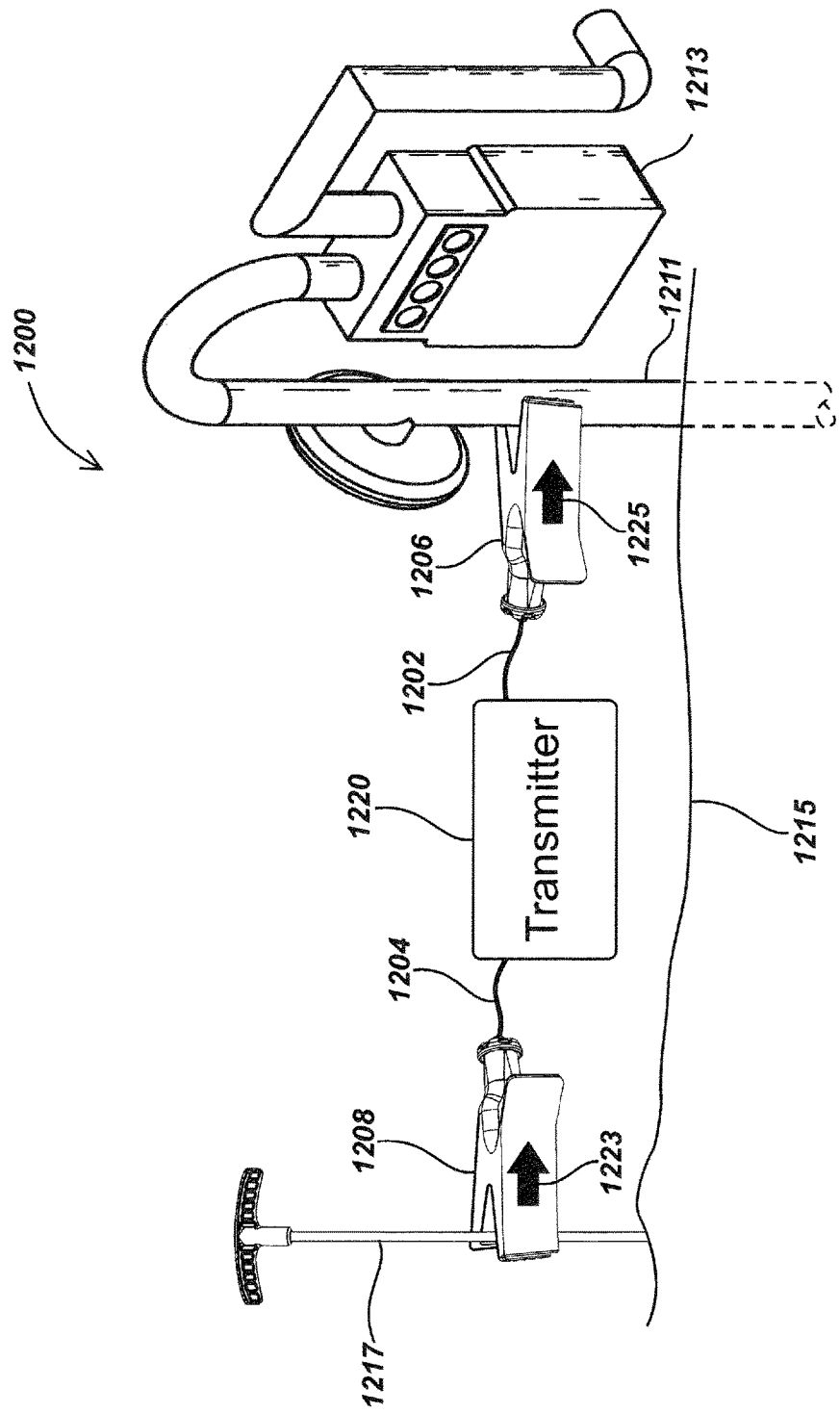
FIG. 12 illustrates details of a pair of direct leads used in a direct connection transmitter embodiment.

Referring to FIG. 12, a direct connection transmitter system embodiment 1200, which may correspond to direct connection transmitter system embodiment 200 as shown in FIG. 2, illustrates additional details. In an exemplary embodiment, current output from a transmitter 1220 may be directly coupled to a utility line, such as an above-ground gas line 1211 joined with a gas meter 1213. A direct connection mechanism or device, such as an alligator clip 1206, may be used to electrically couple a cord 1202 extending from a connection of the transmitter 1220 to the gas line 1211. A ground connection mechanism or device, such as alligator clip 1208, may be used to electrically couple a cord 1204, extending from a connection at the transmitter 1220, to a ground element 1217, which may be a metal stake or rod pounded into the ground 1215. One or more current direction indicators, such as current direction indicators 1223 and 1225, may each be disposed on alligator clips 1206 and 1208, for indicating how the orientation of the direct connection corresponds to the direction of the current flow displayed on a locator display (not shown). For example, current direction indicator 1225 indicates that the current flows from the transmitter 1220 through the gas line 1211, and current direction indicator 1223 indicates that the return current flows from the ground element 1217 and back to the transmitter 1220.

Figure 13:
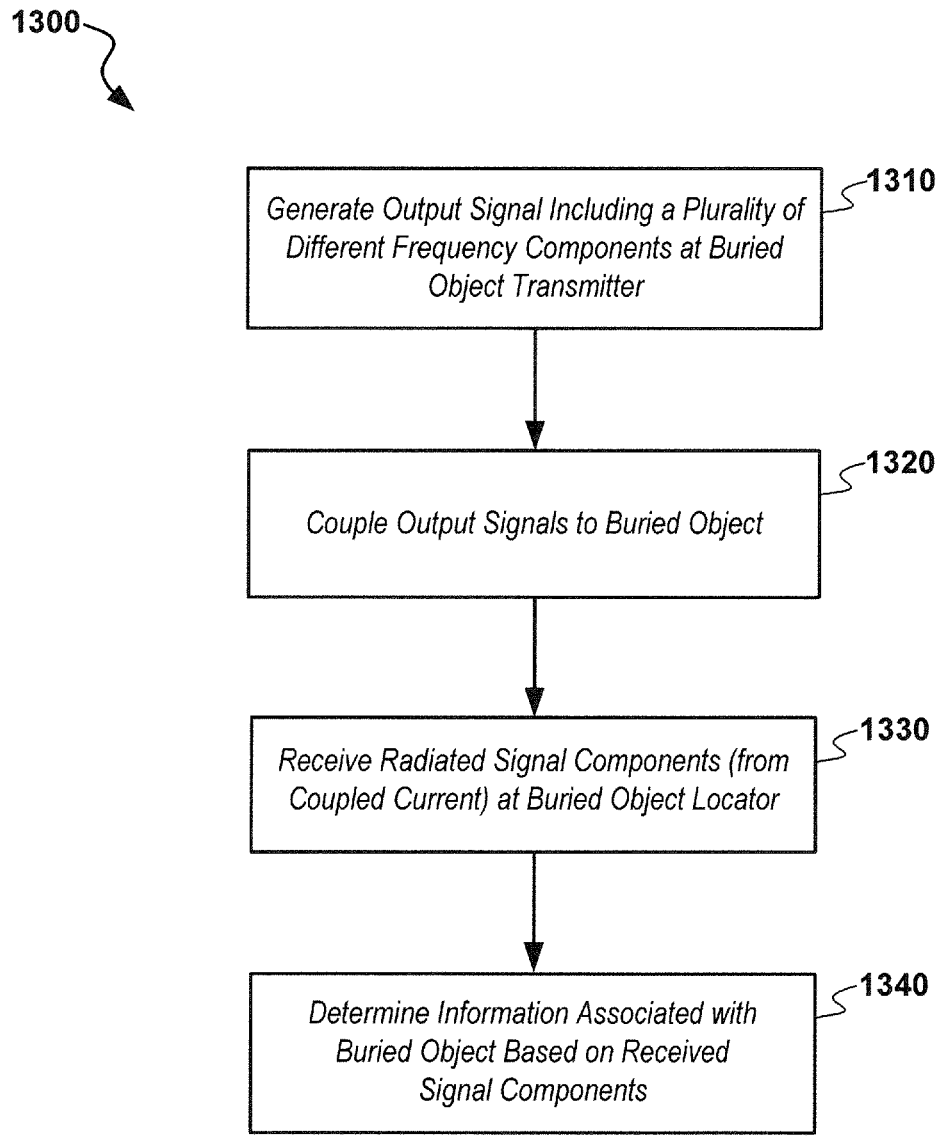
FIG. 13 illustrates details of an embodiment of a method which may be implemented on a buried object locator system such as the system and components illustrated in FIGS. 1-12.

FIG. 13 illustrates details of an embodiment of a process 1300 that may be implemented on a buried object locator system such as the locator system embodiments illustrated in FIGS. 1-12 or FIGS. 14 or 38. Process 1300 may begin at stage 1310, where one or more output signals, that may include a plurality of signal components at ones of a plurality of different output frequencies, may be generated at a buried object transmitter, such as transmitter 120 as shown in FIG. 1.

At stage 1320, the outputs may be coupled from the transmitter to a buried object, such as buried object 111 of FIG. 1. The coupling may be done by radiated/inductive coupling and/or direct or electrical coupling. The coupled output signals may then generate currents in the buried object at different frequencies, which may then radiate magnetic field signal components at the various different frequencies.

At stage 1330, the radiated signal components associated with the buried object current at a plurality of the different output frequencies may be received at a buried object locator. At stage 1340, processing of the received signals may be performed in a processing element of the locator to determine information associated with the buried object. The determined information may be based on two or more of the radiated signal components and/or on additional parameters, such as timing information, phase information, amplitudes of the various current components, and/or other parameters.

Process 1300 may further include, for example, receiving a transmitted signal, including timing information, at the buried object transmitter, generating a timing reference from the timing information at the transmitter, and generating the one or more output signals based in part on the timing reference. The transmitted signal may be a satellite-based transmission. The satellite-based transmission may be a Global Positioning Satellite (GPS) system signal. The satellite-based transmission may be a GLONASS system signal or other satellite system signal. Alternately, or in addition, the transmitted signal may be terrestrial signal. The terrestrial signal may be a cellular system signal. Alternately, or in addition, the transmitted signal may be a locally generated signal.

The plurality of signal components may, for example, have a phase determined at least in part by the timing reference. The plurality of signal may have a synchronized phase. The synchronized phase may be based on the timing reference.

The process 1300 may further include, for example, determining a second timing reference at the buried object locator. The information associated with the buried object may be based in part on the second timing reference. The determining a second timing reference may include receiving a second transmitted signal including second timing information, and determining the second timing reference based on the second timing information. The second transmitted signal may be a satellite-based transmission. The satellite-based transmission is a Global Positioning Satellite (GPS) system signal. The satellite-based transmission may be a GLONASS system signal or other satellite system signal. Alternately, or in addition, the second transmitted signal may be terrestrial signal. The terrestrial signal may be a cellular system signal. Alternately, or in addition, the second transmitted signal may be a locally generated signal.

The process 1300 may further include, for example, sending, from the buried object transmitter, transmitter information including timing information associated with the one or more output signals. The process 1300 may further include receiving, at the buried object locator, the timing information. The determining information associated with the buried object may be further based in part on the received timing information. The timing information may relate to clock information. The timing information may relate to a phase of the one or more output signals.

The process 1300 may further include, for example, measuring a plurality of amplitudes associated with ones of the one or more output signals. The transmitter information may further include amplitude information related to the measured plurality of amplitudes. The determining information associated with the buried object may be further based in part on the amplitude information. The amplitudes may be voltage and/or current amplitudes measured at the buried object transmitter. The amplitudes may be amplitudes of currents coupled from the transmitter into the buried object. The ones of amplitudes of the output signals may be separately and/or simultaneously measured.

The transmitter information may be sent, for example, from a wireless communication link. The wireless communication link may be a radio frequency (RF) communication link. The RF communication link is a radio transmission on an unlicensed frequency band, such as the instrumentation, scientific, and measurement (ISM) band. Alternately, or in addition, the transmitter information may be sent using a wired communication link. The wired communication link may be a serial communication link.

A first of the one or more output signals may, for example, be inductively coupled to the buried object through a dipole antenna. The dipole antenna may be a vertically-oriented dipole antenna. The dipole antenna may be mounted on a mast or other structure at a distance from the transmitter. Additional antennas, such as a GPS antenna, an ISM or other radio antenna, or other antennas may be positioned on the mast. A second of the one or more output signals may be inductively coupled to the buried object through a transmitter-integrated inductive element. The transmitter-integrated inductive element may be distinct from the dipole. The transmitter-integrated inductive element may be an air core element. The transmitter-integrated inductive element may be a ferrite or other ferromagnetic core element. The dipole antenna and the transmitter-integrated inductive element may be orthogonally oriented.

One or more of the one or more of the output signals may, for example, be electrically coupled to the buried object to generate the buried object current. The one or more output signals may be electrically coupled to the buried object using clip leads or other conductive contact elements. The clip leads or other conductive contact elements may include symbols indicating a direction of current flow. The symbols may be printed, attached, or formed on or in the contact elements. The symbols may be arrow symbols or other symbols indicating directions of current flow from the transmitter terminals. The direction of current flow may be synchronized with corresponding current flow or other buried object information displayed on the buried object locator.

The buried object transmitter may, for example, include an electrically conductive stowage point. The process 1300 may further include determining whether the clip elements are electrically connected to the stowage point. The stowage point may include a mechanical stowage apparatus and an electrical contact element. The electrical contact element may be a metallic contact element. The stowage point may include a conductive plastic or rubber contact element.

The buried object transmitter may include, for example, one or more integrated conductive ground contact elements. The output signals may be coupled through the ground contact elements to the ground or other surface in proximity to the buried object. The ground may be, for example, soil, grass, pavement, concrete, or other surfaces or materials. The ground contact elements may be conductive feet. The conductive feet may be conductive rubber or plastic feet. Alternately, or in addition, the ground contact elements may be integrated grounding points or grounding rods. The one or more output signals may be further coupled to a separate grounding stake. The process 1300 may further include comparing, at the buried object transmitter, electrical connections between the transmitter and ground at the integrated conductive ground element and the grounding stake, and selecting, based at least in part on the comparing, one of the ground stake and integrated conductive ground element for providing the coupling to the buried object. The ground connection with the lowest impedance may be selected for coupling the transmitter output to the buried object.

The determining may include, for example, processing a first of the radiated signal components to determine a first depth estimate calculation to the buried object, processing a processing a second of the radiated signal components to determine a second depth estimate calculation to the buried object, and generating an output related to the buried object based on the first and second depth estimate. The output may include providing a visual display of an estimated depth below the ground to the buried object on a display element of the buried object locator. The visual depth output may include a visual display of an estimated accuracy of the depth estimate. The estimated accuracy may be displayed as a numeric value on the display element. The estimated accuracy may be displayed as a graphical distortion indication on the display element. The output may further include providing a visual display of current flow in the buried object at one or more of the different output frequencies. The current flow information may be displayed as a motion or animation graphic. The animation may be a blurring animation. The animation may be a crawling ants motion animation. The blurring or motion amount may be based on the determined quality of the measurement. The determined quality of the measurement may be based on an accuracy metric determined from the first and second radiated signal components. The accuracy metric may be further based on additional signal components of the received radiated signals at additional frequencies.

The output signals may, for example, be electrically coupled to the buried object using clip leads. The clip leads may include symbols indicating a direction of current flow. The process 1300 may further include matching or synchronizing the current flow information with the current flow direction indicated by the clip leads.

One of the one or more output signals may, for example, be coupled to the buried object using a dipole antenna. The dipole may be positioned in a vertical configuration away from the transmitter to increase the antenna quality factor (Q). A second of the one or more outputs may be electrically coupled to the buried object.

A first output of the one or more outputs may, for example, be provided at a first frequency, and a second output of the one or more outputs is provided at a second frequency. The process 1300 may further include generating the second output at a higher voltage than the first output.

The process 1300 may further include, for example, determining, at the buried object transmitter, an impedance associated with a connection between the transmitter and the ground, and selecting, based in part on the determined impedance, one or more of the output frequencies. A first of the one or more output signals may be at a reference frequency or an odd multiple of a reference frequency. A second output signal may be at an even multiple of the reference frequency. The first output signal may be electrically coupled to the buried object, and the second output signal is inductively coupled to the buried object. The first and second signals may be phase locked.

A first output signal of the one or more output signals may, for example, be provided at a first power level at a first frequency, and a second output signal of the one or more output signals is provided at a second power level different from the first power level and a second frequency different from the first frequency. One or more of the first power level, the first frequency, the second power level, and the second frequency may be selected based on a type of buried object. One or more of the first power level, the first frequency, the second power level, and the second frequency may be selected based on an impedance of the ground as seen from the buried object transmitter. One or more of the first power level, first frequency, second power level, and second frequency may be automatically selected in the buried object transmitter. One or more of the power levels and/or frequencies may be selected based in part on a characteristic of the ground and/or the buried object. The characteristic may be an impedance associated with the ground and buried object. Data describing or defining the selected power levels and/or frequencies may be sent from the buried object transmitter to the buried object locator. The data describing the selected power levels and/or frequencies may be automatically sent or may sent in response to an operator input provided at the buried object transmitter and/or buried object locator. The data describing the selected power levels and/or frequencies may be sent using a wireless communication link. The wireless communication link may be an ISM link or other wireless communication link. The data describing the selected power levels and/or frequencies may be sent using a wired communication link. The wired communication link may be a serial communication link.

The information associated with the buried object may be based at least in part on the phases of ones of a plurality of radiated signal components. The information associated with the buried object current may include information about the direction of flow of the buried object current relative to an orientation of the buried object locator. The process 1300 may further including providing a display of the information about the buried object on a display of the locator. The display may be a graphical user interface (GUI) display.

The process 1300 may further include, for example, independently determining a second timing reference at the buried object locator. The information associated with the buried object may be based in part on the second timing reference. The determining a second timing reference may include receiving a second transmitted signal including second timing information, and determining the second timing reference based on the second timing information. The second transmitted signal may be a satellite-based transmission. The satellite-based transmission may be a Global Positioning Satellite (GPS) system signal. The satellite-based transmission may be a GLONASS system signal or other satellite system signal. Alternately, or in addition, the transmitted signal may be terrestrial signal. The terrestrial signal may be a cellular system signal. Alternately, or in addition, the second transmitted signal may be a locally generated signal.

Figure 14:
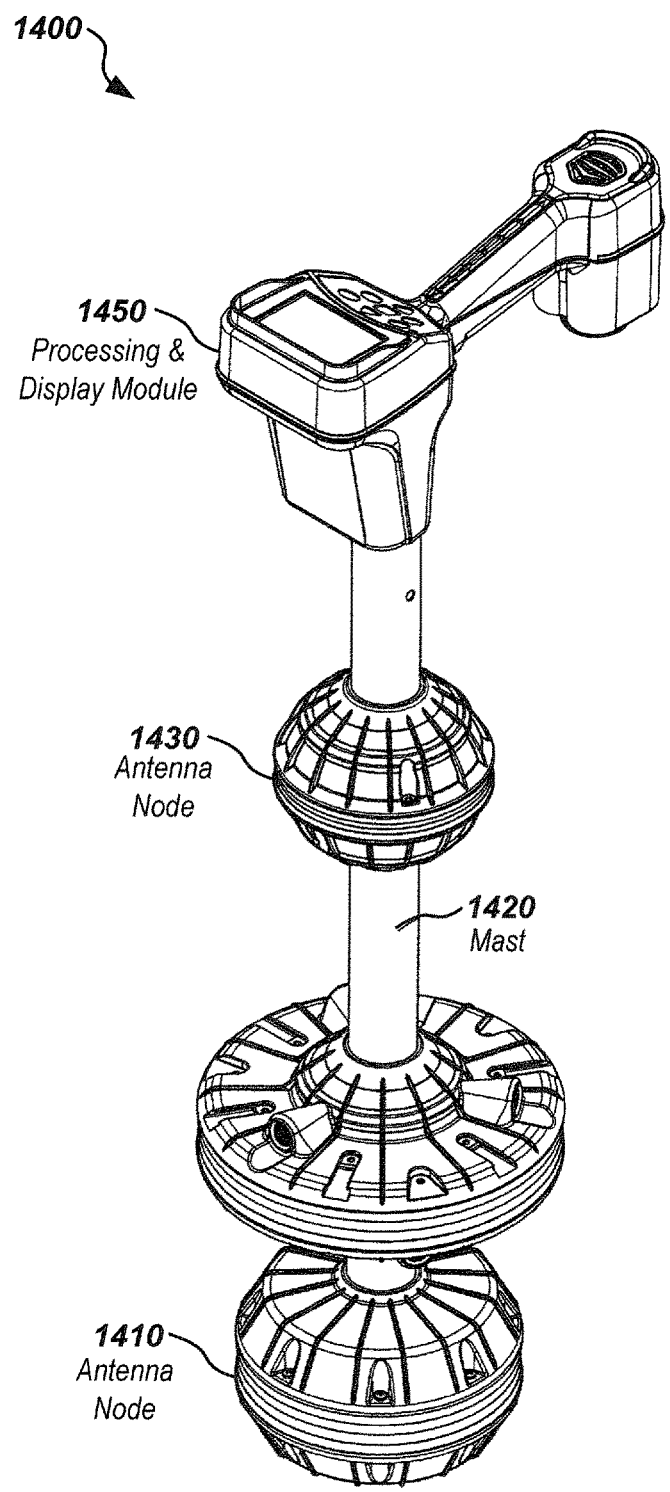
FIG. 14 illustrates details of an embodiment of a buried object locator.

FIG. 14 illustrates details of an embodiment 1400 of an example buried object locating device or "locator" on which various aspects may be implemented. Locator 1400 may correspond with locator 103 of FIG. 1. Locator 1400 includes one or more antenna nodes 1410 which may include multiple antenna components. These may include a housing and a plurality of antenna elements, such as in the form of multiple antenna coils positioned within the housing to form antenna arrays. The antenna nodes may include multiple antenna arrays, including an omnidirectional antenna array and a gradient antenna array, such as are described in U.S. Provisional Patent Application Ser. No. 61/559,696, entitled QUAD-GRADIENT COILS FOR USE IN LOCATING SYSTEMS, United States Provisional Patent Application Ser. No. 61/614,829, entitled QUAD-GRADIENT COILS FOR USE IN LOCATING SYSTEMS, and U.S. Utility patent application Ser. No. 13/676,989, also entitled QUAD-GRADIENT COILS FOR USE IN LOCATING SYSTEMS, which are incorporated by reference herein. Antenna node 1410 may be mounted or coupled at or near a distal end of a locator mast 1420 as shown, or, in some embodiments, may be positioned elsewhere on a locator or similar system.

A proximal end of the antenna mast may be coupled to a locator processing and display module 1450 which may include one or more elements configured to receive and process multi-frequency signals from the antenna node 1410 and/or other inputs, such as sensor elements such as position sensors (e.g., GPS, etc.), inertial sensors (e.g., accelerometers, compass sensors, etc.) as well as other sensors or related devices.

Module 1450 may further include user interface elements such as switches, pushbuttons, mice, or other input elements, as well as output elements such as one or more visual display elements such as one or more LCD panels, lights or other visual outputs, as well as audio output elements such as audio speakers or buzzers. Module 1450 may further include one or more processing elements for receiving and processing multi-frequency antenna signals, sensor signals, user inputs, and/or other input signals and generating outputs to be provided on the display elements and/or for storage in memory or on storage devices such as USB flash devices, disks, or other computer storage devices or systems. Processing of signals from the antenna node 1410 may be performed by one or more processing elements in the node and/or by processing elements in the processor and display module 1450 or in other modules (not shown) located elsewhere in the locator 1400. Module 1450 may further include one or more modules to perform video signal processing, audio signal processing, haptic signal processing, and/or combinations of these, along with output devices to provide visual, audible, and/or haptic user information or feedback based on signals received at two or more frequencies.

In traditional locator devices, common frequencies have been used for signaling in buried object since locators have traditionally been designed to process only one frequency at a time. This approach, however, limits the ability to determine information about the buried object and associated environment (e.g., ground conditions, presence of other buried objects or other conductors, cross-coupling to other conductors, directionality, etc.) by using multiple frequencies and coupling/transmission methods simultaneously. Accordingly, in another aspect, a locator system may be configured to simultaneously provide distinct signal frequencies for different types of connection and transmission mechanisms, where the distinct signal frequency information may be known by the locator and associated with the corresponding signal connection/transmission mechanism.

For example, connection of signals to buried objects is typically done either by direct connection or induction, such as is described in further detail in, for example, commonly assigned U.S. patent application Ser. No. 13/570,211 ("'211 application"), entitled PHASE SYNCHRONIZED BURIED OBJECT LOCATOR APPARATUS, SYSTEMS, AND METHODS, the content of which is incorporated by reference herein. Examples of direct and inductive coupling configurations are shown in the '211 application in FIGS. 2A-2C, as well as transmitter and locator device embodiments as may be used in conjunction with the disclosures herein various embodiments. In addition to coupling signals to a buried object, sonde devices, which are described in, for example, commonly assigned patent and patent applications U.S. Patent Application Ser. No. 61/701,565 ("'565 application"), entitled SONDE DEVICES INCLUDING A SECTIONAL FERRITE CORE STRUCTURE and U.S. patent application Ser. No. 10/886,856, entitled SONDES FOR LOCATING UNDERGROUND PIPES & CONDUITS (now U.S. Pat. No. 7,221,136 ('136 patent)), which are both incorporated by reference herein, may be inserted in a pipe or other cavity and then used to transmit signals from within the pipe or cavity. These three different mechanisms of signal coupling and transmission are denoted herein as "connection types" for brevity.

Unique and distinct sets of frequencies may be assigned to and used by each of these three connection types. These may be denoted as fDl for the set of l frequencies assigned to direct connection signal frequencies, fIm for the set of m frequencies assigned to inductively coupled signal frequencies, and $f_{Sn}$ for the set of n frequencies assigned to sondes, respectively. Example frequency sets for an exemplary embodiment are shown below (however, it is noted that various other frequency sets may be used in alternate embodiments depending on frequency standards for particular applications, ground or other propagation environment conditions, transmitter types, and/or other parameters). The frequencies in the series may be selected as integer multiples in order to simplify signal generation and processing, and may be selected as odd multiples to avoid interference with harmonics of other signals, such as 60 Hz power or other signals.

Figure 19:
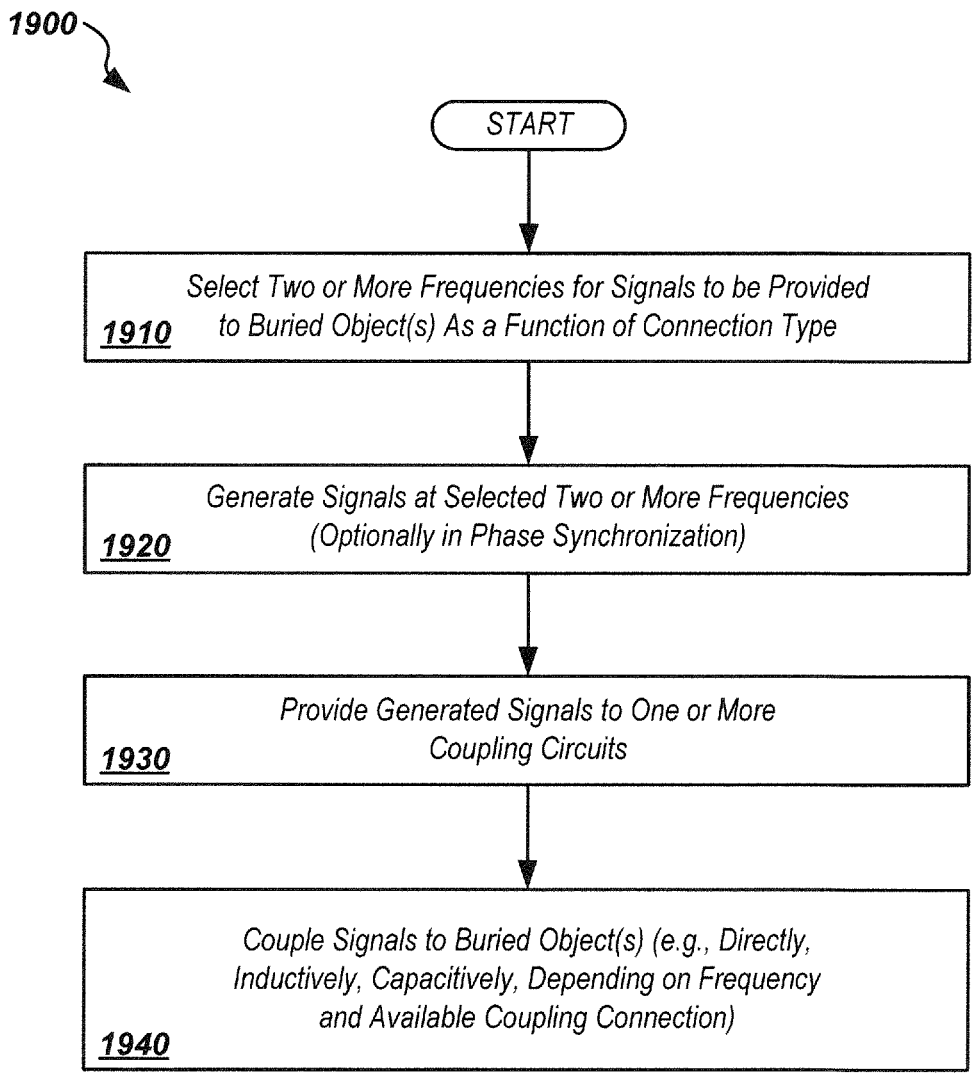
FIG. 19 illustrates an embodiment of a process for generating multi-frequency signaling for coupling to buried objects.

Direct Connect Frequency Set with I=5:
$f_{D1}$=32.4 Hz (i.e., 810/25), $f_{D2}$=810 Hz, $f_{D3}$=8910 Hz, $f_{D4}$=80,910 Hz, $f_{D5}$=404,550 Hz Inductive Connection Frequency Set with m=4:
$f_{I1}$=7290 Hz, $f_{I2}$=29 kHz, $f_{I3}$=127 kHz, $f_{I4}$=480 kHz Hz Sonde Frequency Set with n=7:
$f_{S1}$=16 Hz, $f_{S2}$=512 Hz, $f_{S3}$=8192 Hz, $f_{S4}$=32,768 Hz, $f_{S4}$=65,536 Hz,
$f_{S4}$=131,072 Hz, $f_{S4}$=262,144 Hz Signals of two or more connection types may be provided simultaneously to the buried object and may include one or more signal components of different frequencies for each connection type. These may be generated in one or more buried object transmitters such as described herein and may be coupled using direct connection, inductive connection, and/or via a deployed sonde. FIG. 19 illustrates an embodiment of a process for generating signals at multiple frequencies for coupling to a buried object.

At a corresponding locator, the locator antenna array or arrays may simultaneously receive signals of one or more connection types (e.g., a direct and inductively coupled signal at corresponding unique frequencies, a direct and sonde signal at corresponding unique frequencies, an inductive or sonde signal at corresponding unique frequencies, or direct, inductive, and sonde signals at corresponding unique frequencies) and process the signals to determine information associated with the buried object and/or adjacent objects based on the specific connection type or types, such as other underground pipes or utilities, metallic or other conductive structures, ground conductively and type conditions, and the like.

In the locator, signals of different connection types may be discriminated based on knowledge of the unique signal frequencies assigned to each type. In this way, the locator knows which type of connection is providing the corresponding received signal and can process the received signal accordingly (e.g., for a sonde frequency, the signal can be processed accordingly to a known electromagnetic field model, such as a 1/(r cubed) model, while direct or inductively coupled signals can be similarly processed based on known or expected signal propagation models.

Figure 15:
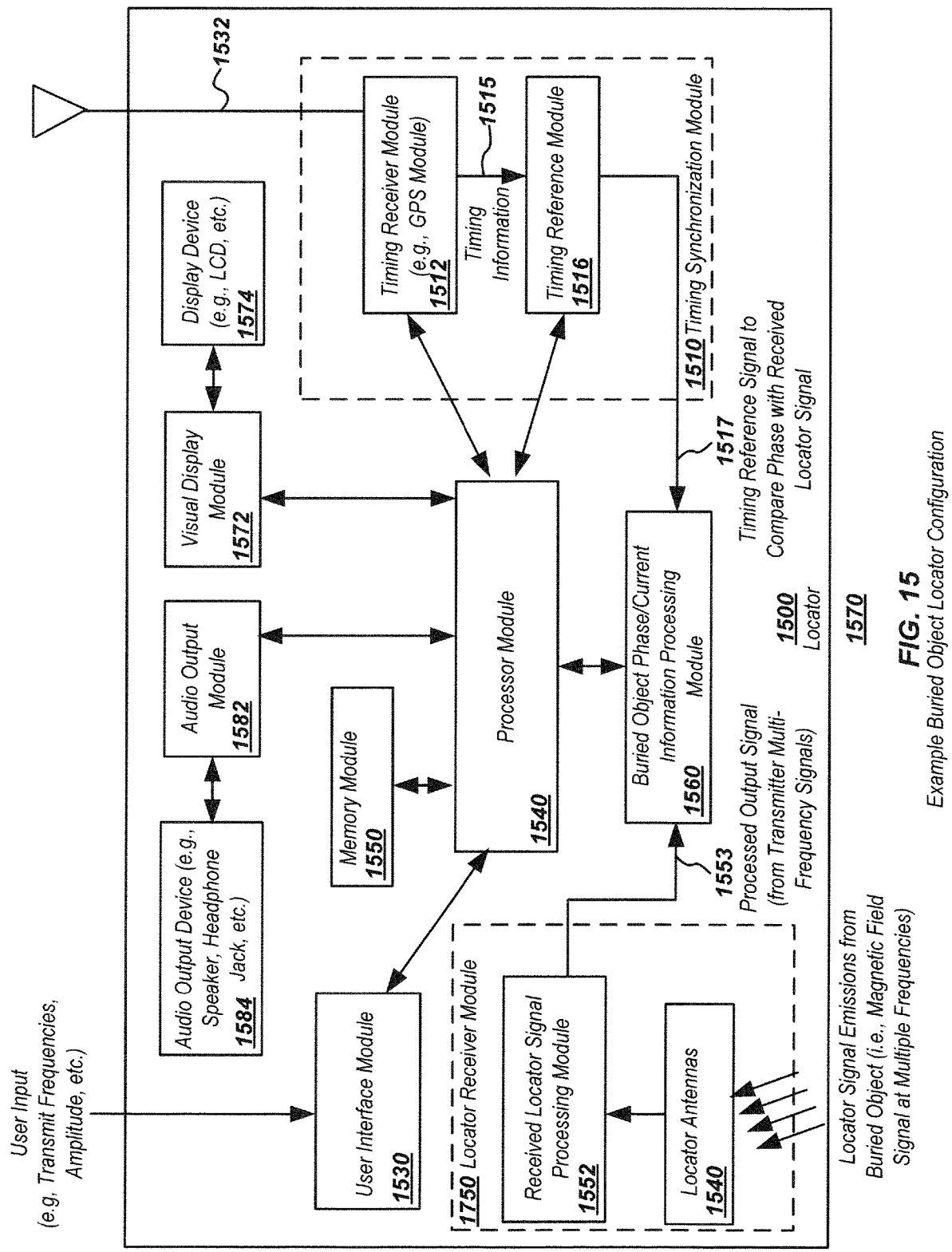
FIG. 15 illustrates details of an embodiment of a buried object locator circuit module configuration.

FIG. 15 illustrates details of circuitry of an embodiment of a buried object locator 1500, which may be used in conjunction with a transmitter, such as the multi-frequency transmitter embodiments described previously herein, to locate buried objects and provide associated information through use of phase-synchronized output signals. Buried object locator 1500 may correspond with locator 1400 of FIG. 14, and the illustrated modules of FIG. 15 may implement functionality based on received multi-frequency signals provided from antenna node 1410 to processing and display element 1450.

Locator 1500 may include a user interface module 1530, which may be configured to receive user input information, such as information on locator configuration, frequency settings, transmitter parameters, such as frequencies assigned to various connection types at the transmitter, and/or other user provided information. Locator 1520 may include a timing synchronization module 1510 configured to receive a signal including timing information and generate a timing reference signal, which may be used to determine a phase offset or difference in a received signal as described in, for example, the '211 application. Timing module 1510 may include a timing receiver module 1512, such as a GPS, cellular, or other wired or wireless receiver module, and a timing reference module 1516 for generating a timing reference from timing information 1515 provided from the timing receiver module 1512. Timing information 1515 may be a standardized signal such as a 1 PPS signal.

An antenna 1532 or other wired or wireless connection (not shown) may be used to couple incoming signals with timing information from a corresponding transmitter to module 1512 as described in the '211 application. An output 1517, such as an analog or digital timing reference signal generated to be used to compare phase information with a signal 1553 provided from the locator receiver module, as described in the '211 application, may be provided from timing reference module 1516.

A phase/current processing module 1560 may be included to receive information from other modules, such as shown in FIG. 15, including a processed output signal from a plurality of buried object current signals at different frequencies, as received by a locator antenna, and generate phase offset or difference information, as well as information related to the current flow in the buried object, such as current direction relative to the locator orientation, estimated position of the buried object and/or adjacent objects and/or other information derived from the received multi-frequency signals.

Locator receiver module 1550 may be configured with one or more locator antennas 1540, which may correspond with antenna node 1410 as shown in FIG. 14, as well as associated signal processing circuitry 1552, which may be used to filter and/or otherwise process the received multi-frequency locator signals to generate output signals 1553 corresponding to the currents in the buried object at the multiple frequencies.

Module 1560 may process the output signal and timing reference signal to generate phase difference information and/or other information associated with the buried object current, such as information on buried object currents at different frequencies of the set of multi-frequencies, and provide this information to a display section of the locator, where it may be further processed in module 1572 for rendering on a display device 1574, such as an LCD or other display device. The current information associated with the multiple received frequencies may be displayed on a graphic user interface (GUI) of the display device, and/or may be otherwise output, such as in the form of vibrational outputs, audio signals, and/or in the form of other sensory outputs. Information provided on the display device 1574 may include, for example, estimates of the location and direction of the buried object relative to the locator orientation as estimated based on the different received frequency signals.

Locator 1500 may include an audio section including an audio output controller module 1582 and an audio output device 1574 or output device connector, such as an audio jack or other analog or digital audio output device. Locator 1500 may also include a haptic signal section (not illustrated) to provide haptic user feedback information, such as through haptic signal devices and processing as described in co-assigned U.S. Utility patent application Ser. No. 13/570,084, entitled HAPTIC DIRECTIONAL FEEDBACK HANDLES FOR LOCATION DEVICES, which is incorporated by reference herein, based on multi-frequency received signals and/or quad gradient received signals.

One or more processing modules 1580 along with one or more memories 1590 may be included in locator 1520 to control locator operations, process multi-frequency signals to perform the various processing and display functions described herein, store data and processor instructions, and/or perform other locator functions described herein. In various embodiments these modules may be combined, in whole or part, to implement similar or equivalent functionality.

Simultaneous multi-frequency signal processing may be advantageously used in buried object locators to provide more information than can be provided by a single frequency due to different propagation and coupling characteristics of signals in buried objects at different frequencies. For example, in environments where underground pipes are well insulate and pipe segments are well coupled electrically (i.e., having a low resistance connection) signals at lower frequencies can travel long distances, such as for hundreds or miles or further. Examples of this are metallic pipelines or cables running through desert environments where the ground is dry and is a poor conductor. As an example, coupling multi-frequency signals to a long pipeline in such an environment may leave only low frequency (e.g., 32 Hz) signals present after 100 miles. Likewise, buried tracer wires, which are sometimes placed within or alongside buried pipes, will only allow low frequency transmission if not grounded at the distant end. In these environments higher frequencies typically bleed off by capacitive coupling to the ground—for example, signals at 400 kHz may be substantially bled off at 100 yard distances, 80 kHz signals may travel further to around 1000 yards, whereas 8 kHz signals may travel several miles, 800 Hz signals may travel 10s of miles, and lower frequencies such as 32 Hz may travel hundreds of miles or further. However, low frequency locating can create problems in environments were 50 or 60 Hz power wiring is present as these can be induced or otherwise coupled onto the pipe, thereby causing equipment failure if not properly filtered at transmitter coupling connections. Capacitive coupling can alleviate this problem, but it prevents good coupling of lower frequency signals to the buried objects.

In another ground environment such as may be found where soil is more moist (e.g., on the Southeast Coast of the United States), metal pipe segments may be electrically isolated by rubber boots or other insulators, in which case lower frequencies cannot propagate as well as higher frequencies (which may capacitively couple across the insulators between pipe segments). In this case, the high frequency signals will tend to dominate as distance from the transmitter increases.

Ground and propagation conditions can vary based on a variety of factors, such as soil type, rainfall (or lack of rain), other utilities or conductive objects below or above the ground, and the like. However, comparison of the relative amplitude and/or phase of the signals received at the locator at multiple frequencies can be used to determine buried object location and depth information as well as ground/environmental conditions and presence and orientation of other below ground buried utilities or other conductors. By comparing the relative received amplitudes and/or phases of signals at a locator and comparing these to a known amplitude and/or phase reference at the transmitter, various additional information about both buried object location and the surrounding environment can be determined.

For example, as noted previously relative amplitude change information can be used to indicate various conditions. For example, if the low frequencies drop faster than high frequencies it indicates you are in a capacitively coupled scenario where what is limiting the current flow is the fact that there is not a hard resistive connection (e.g., on a reactive circuit). If the high frequencies go farther or if, for example, you are walking along a line such as a gas line (with an isolation coupling underground) where you have lots of low frequency flow to the coupler and then the low frequencies do not make it across the coupler (therefore the frequency drop-off can be used to show underground coupling changes, etc (for example, detecting an isolation joint).

Figure 16:
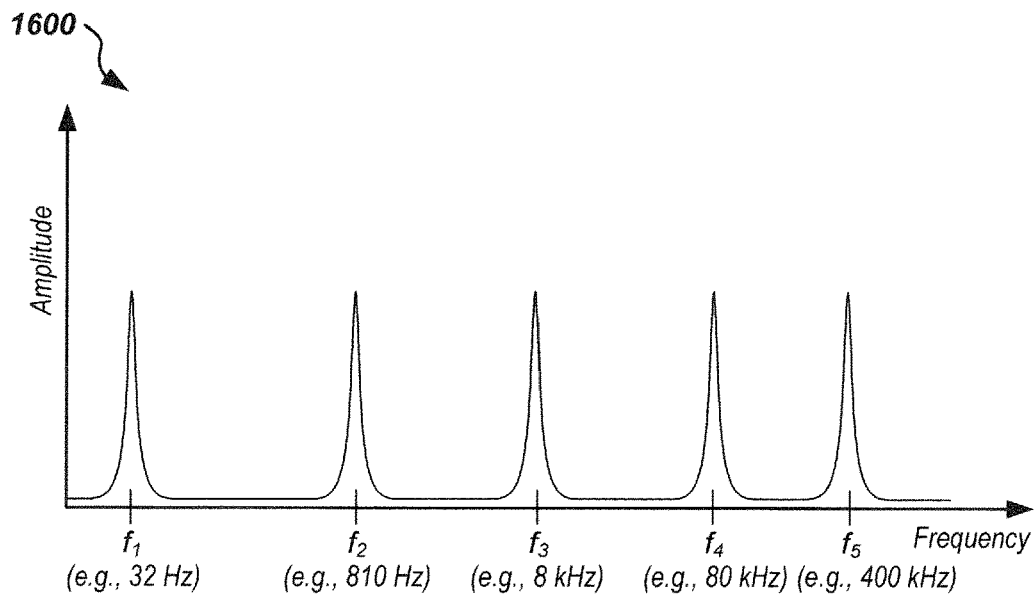
FIG. 16 illustrates an example transmitter output signal spectrum for use in multi-frequency locating applications.

FIG. 16 illustrates an example set of frequencies $f_1$-$f_5$ that can be applied in a multi-frequency signaling application. These frequencies are representative of frequencies that may be used for direct coupling to a buried object, however, other frequencies may be used in various applications depending on the coupling connection used, environment, and/or other factors.

As shown in FIG. 16, the frequencies may all be applied at a known or reference amplitude, which in this example is shown as being the same amplitude for purposes of clarity. Amplitude information may be determined at the transmitter output and/or from sensors coupled to the transmitter, and the amplitude level may be set to be a constant or known relative values or may be communicated to the locator if the amplitudes are different.

Figure 17A:
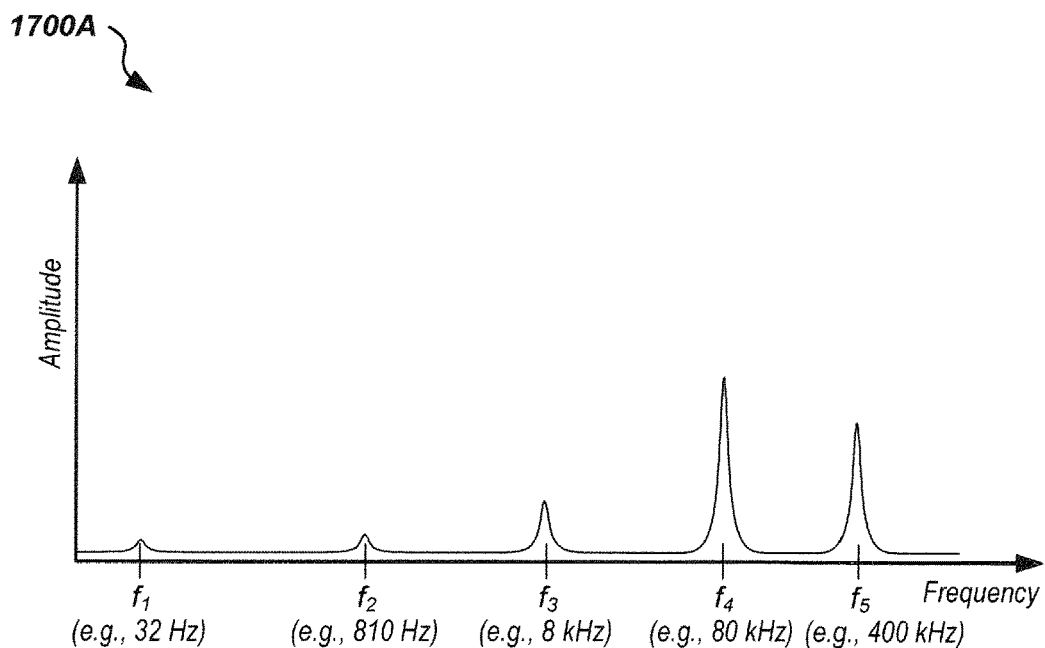
FIGS. 17A-17C illustrates an example signal spectra in multi-frequency locate applications.

FIG. 17A illustrates one example received signal spectrum in an environment where the signal is primarily capacitively coupled (e.g., lower frequencies are filtered out by insulators between pipe segments, breaks, etc.). In this case the relative amplitude of the higher frequencies dominates. However, since higher frequencies tend to cross-couple better to adjacent underground or above-ground conductors, the lower or lowest received signal at a sufficient amplitude may be used as a primary signal to determine buried object location. Higher frequency components can then be used to determine a relative amount of distortion, such as in the form of cross-coupling distortion as described subsequently herein.

Figure 17B:
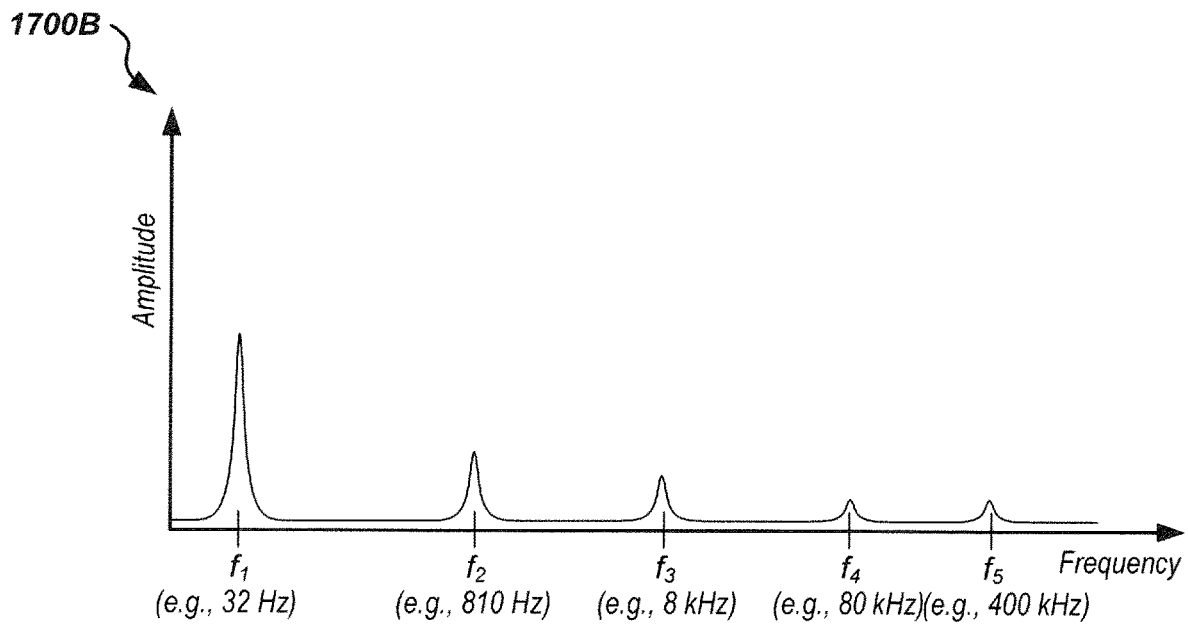

FIG. 17B illustrates another example received signal spectrum in an environment where lower frequency propagation dominates. This may be representative of an environment where the buried object provides a strong electrically resistive path, such as with a good conductor placed in a dry, low conductivity ground, such as in a desert area. In this case, the lower frequency signals dominate and, since they tend to cross-couple to other conductors less than high frequency signals, can be used for position and depth location, with higher frequency components used for determining distortion or presence of other buried conductors and the like.

Figure 17C:
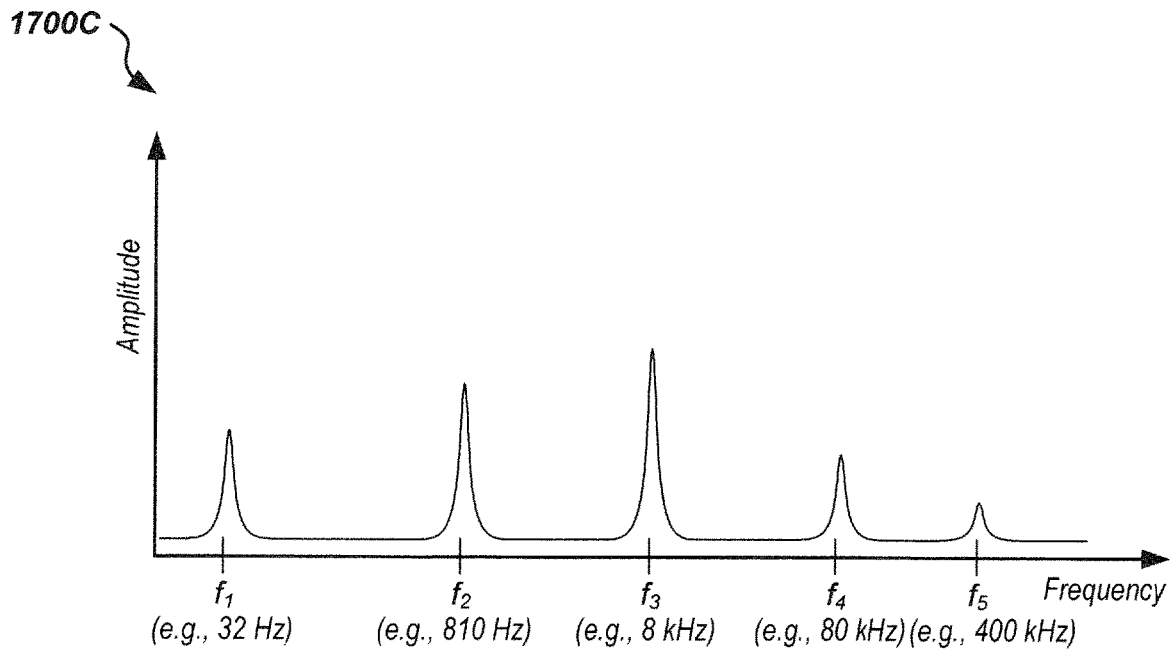

FIG. 17C illustrates yet another example environment where mid-frequency signals are dominant. This spectrum may represent an environment having a combination of resistive and capacitive losses, where propagation at middle frequencies dominates at the particular location of measurement.

While environmental conditions and underground (and aboveground) object placement will vary in a wide variety of ways, comparison of simultaneously received relative amplitude and/or phase of the received signals at the locator can provide a wide variety of information which can be presented to a locator user in a number of visual, audible, and/or tactile/haptic ways.

Figure 18A:
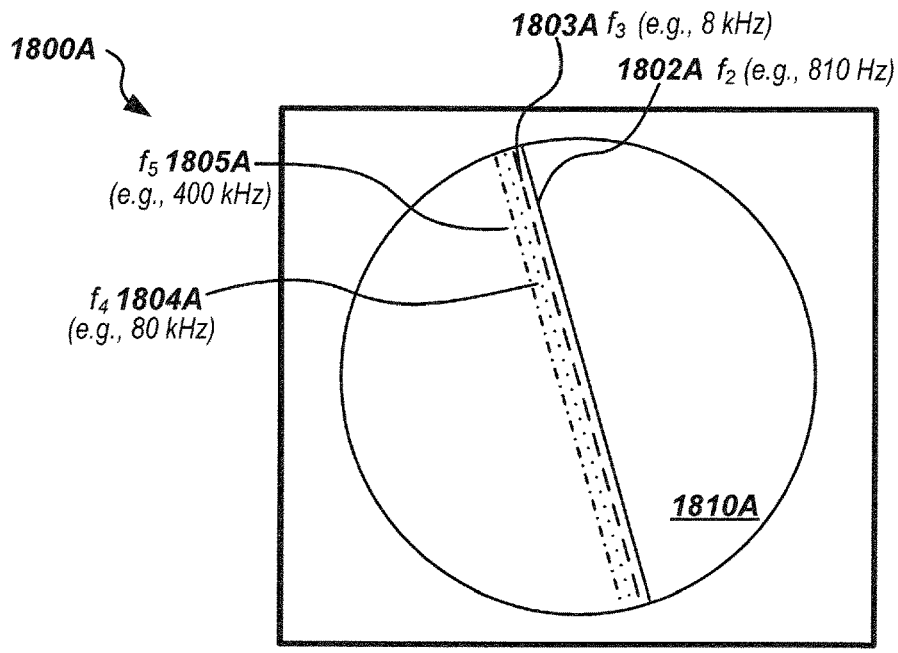
FIG. 18A-18F illustrate example embodiments of buried object locator displays for multi-frequency locators.
Figure 18B:
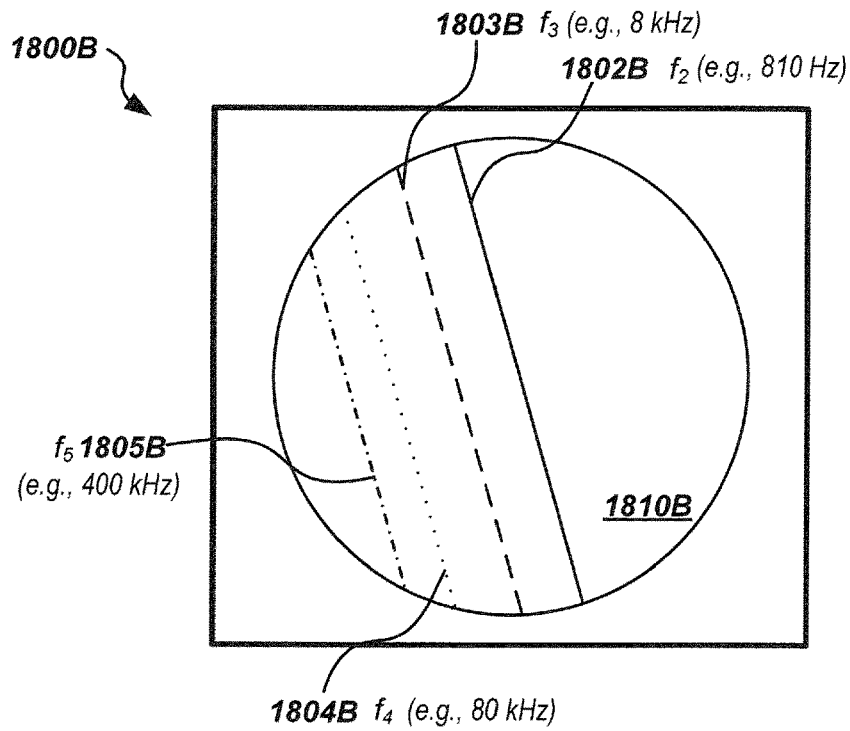

Turning to FIG. 18A, one example method of an embodiment of visual presentation of received multi-frequency information at a locator is illustrated. Locator screen 1800A illustrates a presentation 1810A of a buried object current estimates taken at four frequencies, 1802A, 1803A, 1804A, and 1805A. In this case the lines each represent a current flow estimate or position estimate at the corresponding frequency, and the angle indicates a measured phase or directional offset. As shown in FIG. 18A, the lines are close together, indicating a minimum of cross-coupling to adjacent conductors (such as other buried utilities or other conductive objects).

In a perfect environment with no other conductors and no cross-coupling, the lines would overlay directly and be indicated as a single line or trace on the display. However, there are often other conductors subject to cross-coupling. In this case, currents may cross-couple from the driven buried object to adjacent conductors, which can affect both the position and angle of the estimated current (and corresponding of the estimated buried object location) as presented on the locator display. An example of this is shown in locator display embodiment 1800B of FIG. 18B, where an adjacent underground conductor running approximately parallel to the buried object being located is present. As a result, higher frequency signals will tend to cross-couple more readily to the adjacent conductor, thereby resulting in offset estimates of the current flow and buried object location. In this case there are four estimates of the current flow (or object location) presented on the locator display for signals 1802B, 1803B, 1804B, and 1805B at increasing frequencies. This is indicative of more cross-coupling at higher frequencies and/or associated distortion. In determining buried object location, it is generally better to use the lowest strong frequency signal for the primary estimate, however, presence of higher frequency signals can be used to provide further information, such as the degree of uncertainty or potential distortion, possible location of other conductors, possible underground configuration of other conductors, environmental conditions, and the like.

Figure 18C:
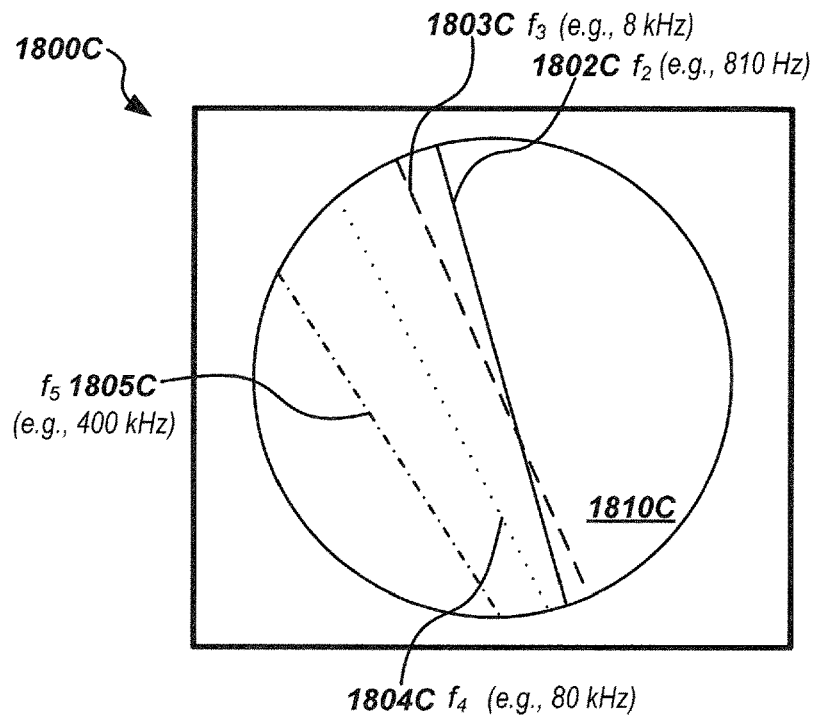

FIG. 18C illustrates another example locator display embodiment 1800C illustrating presented buried object information based on multi-frequency signaling. In this example, the different estimates 1802C, 1803C, 1804C, and 1805C are both offset and at different angles, indicating the possible presence of other conductors and different underground directions of these other conductors relative to the conductor under test.

Figure 18D:
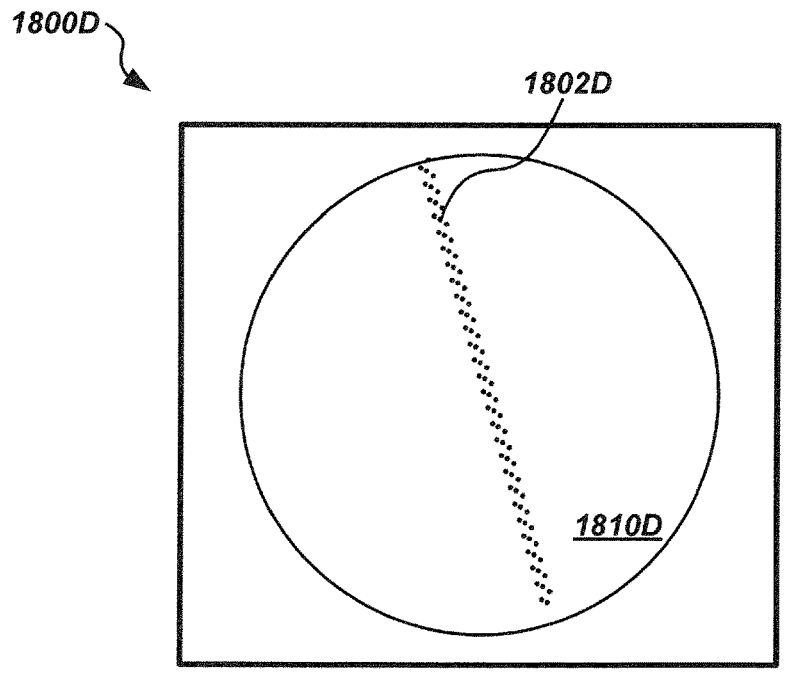
Figure 18E:
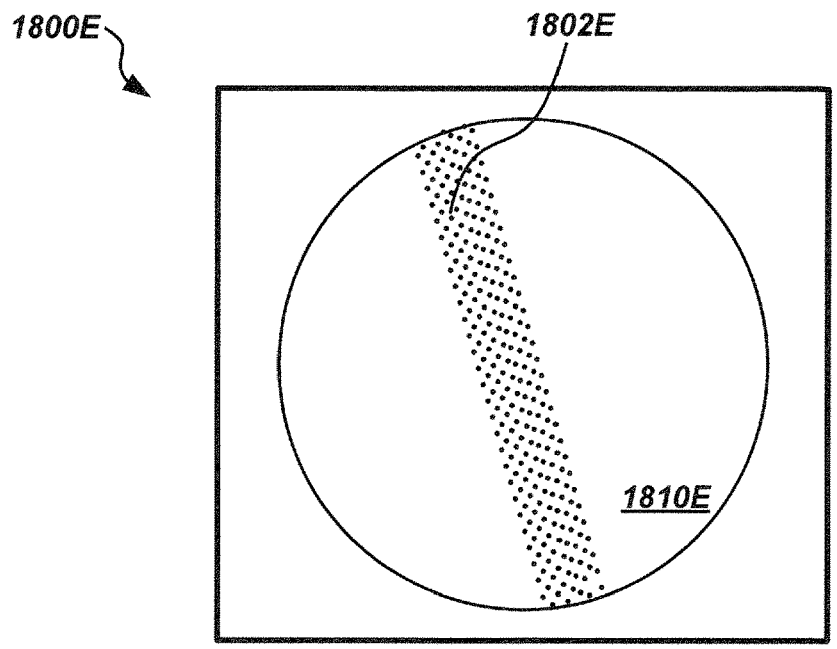
Figure 18F:
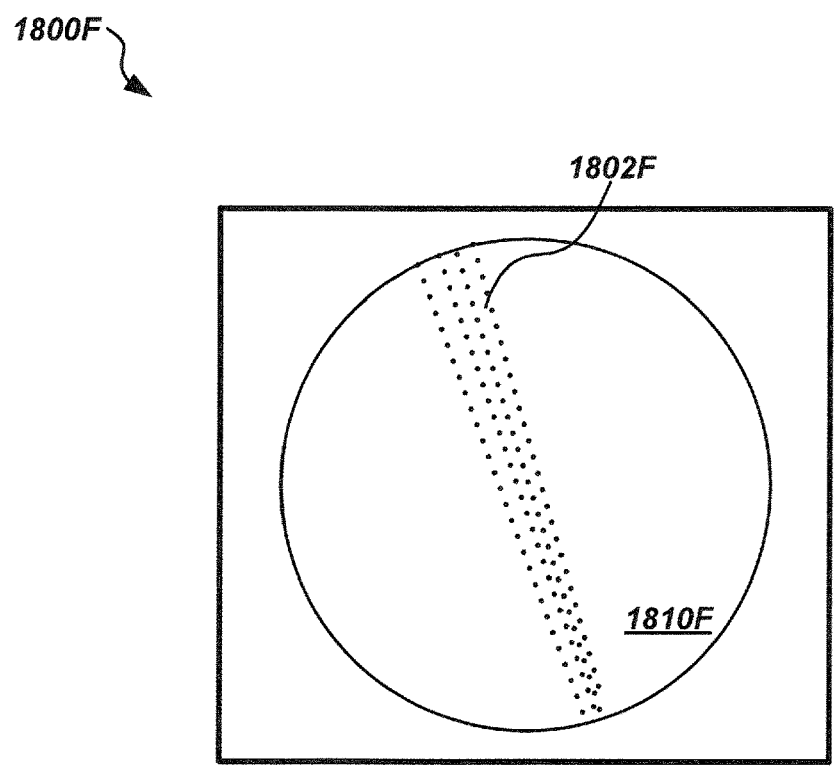

Information from the simultaneously received and processed multi-frequency signals can be presented to users in a variety of ways. For example, individual position estimates for the buried objects can be presented for each frequency, such as by using different line styles, shapes, colors, flashing or blinking, and the like. Alternately, the display may present a relative degree or distortion based on differences in the received signals and position estimates at different frequencies. Examples of this are shown in FIG. 18D, FIG. 18E, and FIG. 18F. In FIG. 18D, the relative degree of distortion of the received signal, which may correspond with the multiple lines display of FIG. 18A, is shown as a degree of "fuzziness" or blurring of the line in graphic 1802D as a function of the separation of the lines at different frequencies. In an environment where no other conductors are present, the blurriness would be minimal, with the locate presented as a strong solid line. As the amount of distortion increases (e.g., with presence of other conductors, etc.) the fuzziness of the display can be increased, such as shown in FIG. 18E in graphic 1802E, which may correspond with the multiline display of FIG. 18B. In addition, fuzziness can be modulated directionally as well, as shown in FIG. 19F in graphic 1802F, to indicate distortion in angular estimates of the buried object phase or position. Phase shifts can be caused by cross-coupling, particularly at stub-outs or other branches. These can be indicated by an audible or visual indication, such as a question mark presented on the display, a zoom-in icon directing the user to examine the area more closely for phase-shift type distortions, and the like.

Various other visual display presentation methods can also be used to illustrate the multifrequency object position estimation and distortion estimation in various embodiments. In addition, the multifrequency information may be presented audibly, as described subsequently herein, and/or haptically, such as is described in co-assigned U.S. Utility patent application Ser. No. 13/570,084, entitled HAPTIC DIRECTIONAL FEEDBACK HANDLES FOR LOCATION DEVICES, incorporated by reference herein.

In another aspect, position and/or depth information may be determined at multiple frequencies using a sheet current flow model as described in co-assigned U.S. Utility patent application Ser. No. 13/605,960 ("'960 application"), entitled SYSTEMS & METHODS FOR LOCATING BURIED OR HIDDEN OBJECTS USING SHEET CURRENT MODELS, the content of which is incorporated by reference herein. The '960 application described determining depth of a buried object using sheet current flow models. This approach can be extended to the multi-frequency case by estimated depth based on multiple received frequency signals and using these multiple estimates to determine additional information about the buried object. For example, high frequencies tend to return on ground and low frequencies tend to be bulk flow return thereby generating different depth estimates as a function of frequency. In addition, location information determined in this fashion may be used to determine and indicate distortion effects, such as presence of other conductors, stub-outs (e.g., other lines going off from main lines, such as gas line feeds to individual homes from a primary line under a public street, water lines branching off, etc.).

In another aspect, multi-frequency signal information can be processed and presented at the locator as an audio output, such as on speakers or through headphones, etc. The information can be presented audibly in a variety of ways, but in each way signals at multiple frequencies received at a locator can be processed and output presented as a function of two or more of the frequencies.

In another aspect, the output audio may be presented as a composition of audible elements where each element corresponds with one of the frequencies received. For example, the output audio can be merely a sum of unique tones or audible elements associated with each of the received frequencies. These can be individual single frequency tones or other more complex sound elements, such as tones including harmonics or other distinct sound elements. If only a single frequency signal is received, the audio output can be at the single corresponding tone or sound element. If two or more frequencies are received, the output can be a summation of the corresponding tones or sound elements. These can also be weighted by amplitude and/or phase. For example, the sum can be a sum of tones or sound elements associated with each received frequency signal that is weighted by the relative amplitude of each received signal. In this way, when primarily high frequency signals are received the output tone may be of primarily higher frequency sounds, whereas, if lower frequencies are primarily received the tone will be of lower frequency sound. Various other linear or nonlinear combinations of tones or sound elements may also be used, such as squaring tones, extracting beat frequencies, tone or amplitude-specific modulation, and the like. Tones may be modulated by the relative degree of distortion detected, such as by the amount of separation in lines or fuzziness as shown in FIGS. 18A-18F.

In another aspect, distortion may be applied to a generated sound, which may be in combination with the tone modulation above and/or separate. Example distortions that may be applied may be tremolo or warble effects, conversion to square waves (to, for example, increase high frequencies as a function of degree of distortion), etc. Increasing harmonic distortion to make the sound increasingly unpleasant as estimated distortion increases may be used in one embodiment.

In another aspect, the output audio signal may be distorted to increase a noise or static-like component as a function of parameters such as received signal amplitude, received signal distortion, phase differences, position differences (in signals across received frequencies), and the like. If some of the received signals are weak while others are strong, application of noise or distortion signal processing may be thresholded by the strongest received signal so that if there is one strong signal while others are weak the indicated distortion is based only on the stronger signal.

In another aspect, sound directionality may also be modulated as a function of the received multi-frequency signals. In this case, unique tones or sound elements may be presented to indicate directional movement or offsets, such as the angular offsets shown in FIG. 18C. This may be done by, for example, providing unique left and right sound elements, such as unique click patterns, tones, enunciated words such as spoken phrases (e.g., "left," "right") and the like.

In another aspect, audio output provided may be generated as a function of a "mix" or combination of the relative strengths of frequencies as received by the locator. For example, in some locate environments higher frequencies will be the only ones to couple or propate well through the buried object and correspondingly received at the locator, whereas, in other cases lower frequencies will predominate. Various intermediate combinations may occur in various environments. Various functional relationships between the relative strengths/amplitudes of received signals at various frequencies may be used to generate the audio output.

The presented audio information as described above may be further controlled or modulated by information provided by gradient antenna elements, such as quad gradient antenna array elements as described in commonly filed United States Utility Patent Application Ser. No. 13/676,989, entitled QUAD-GRADIENT COILS FOR USE IN LOCATING SYSTEMS, incorporated by reference herein.

Gradient information may also be combined with multi-frequency information in visual display outputs such as described in FIGS. 18A-19F. For example, performing a centering locate operation a locator with a quad gradient antenna array configuration as described in commonly filed U.S. Utility patent application Ser. No. 13/676,989, entitled QUAD-GRADIENT COILS FOR USE IN LOCATING SYSTEMS, and applying this at multiple frequencies can provide additional information. For example, if you center using a single frequency using only a gradient centering approach it is possible that the positions are actually offset if another utility is cross-coupled. However, since the cross-coupling will vary with frequency, the centering indication will be different at different frequencies if there is cross-coupling. Multi-frequency processing can be used to determine if this is the case (e.g., if centering using the gradient approach varies as a function of frequency) and a user warning or distortion information may be presented. GUI display information, such as is described in commonly filed U.S. Utility patent application Ser. No. 13/676,989, entitled QUAD-GRADIENT COILS FOR USE IN LOCATING SYSTEMS, may also be overlaid with multi-frequency display or both may be integrated into a single display or audible output.

FIG. 19 illustrates details of an embodiment of a process 1900 for generating signals at a transmitter for coupling to a buried object. At stage 1910, two or more frequencies for provision to the buried object may be selected. The frequencies may be selected based on a particular connection type for the signal being applied (e.g., direct or inductively coupled). At stage 1920, signals may be generated and may be phase-synchronized. At stage 1930, the generated signals may be provided to one or more coupling circuits for coupling to the buried object, and at stage 1940 the signals may be coupled to the buried object to generate magnetic field signals for reception by a multi-frequency locator.

Figure 20:
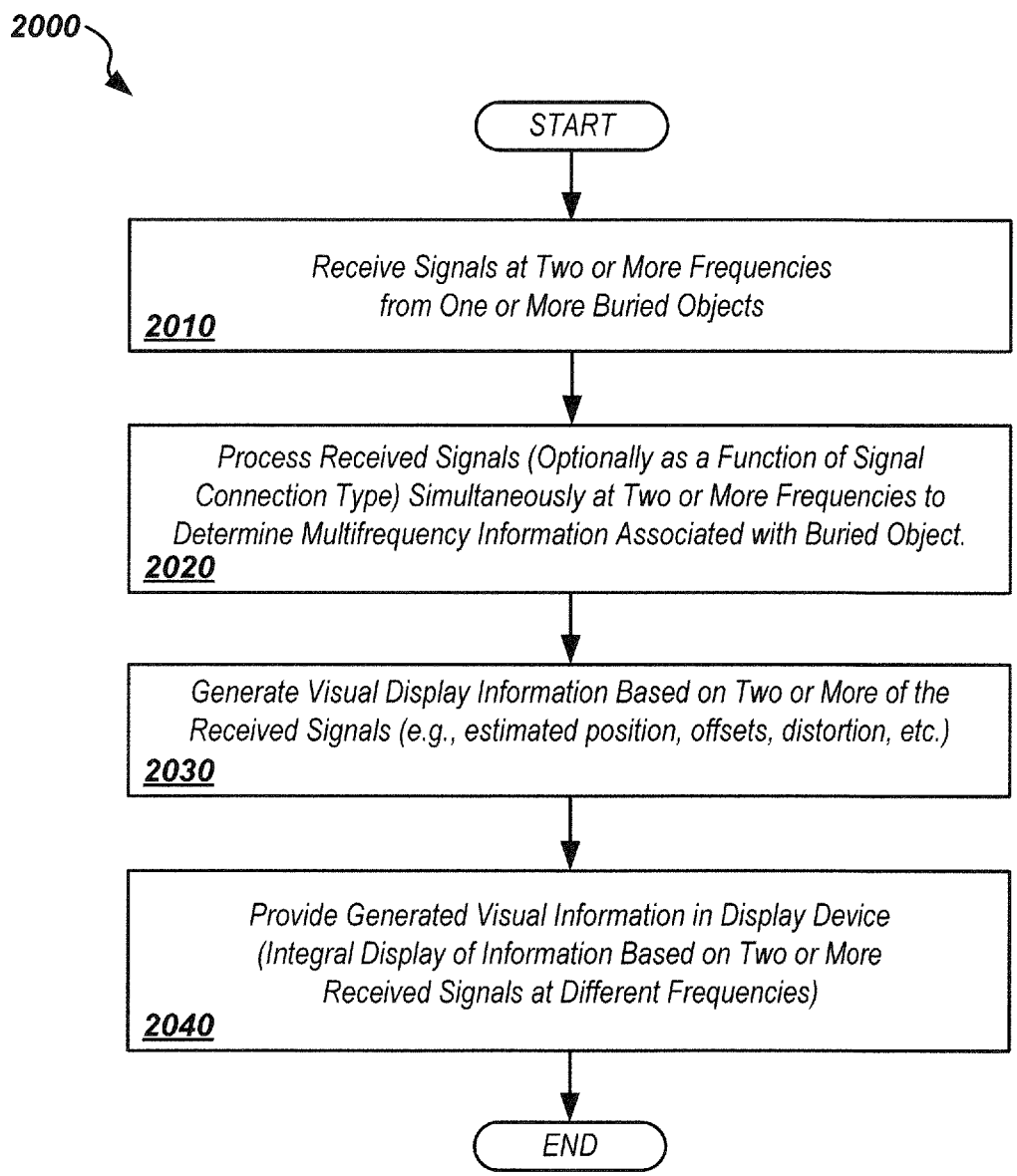
FIG. 20 illustrates an embodiment of a process for simultaneously receiving and processing multi-frequency signaling from buried objects to provide a multi-frequency visual display.

FIG. 20 illustrates details of an embodiment of a process 2000 for simultaneously receiving and processing signals at multiple frequencies, such as may be provided from a transmitter using a process such as process 1900 of FIG. 19, and generating output information based on two or more of the received signals. At stage 2010, signals at two or more frequencies may be received at the locator. The signals may include gradient magnetic field signals as described in, for example, commonly filed U.S. Utility patent application Ser. No. 13/676,989, entitled QUAD-GRADIENT COILS FOR USE IN LOCATING SYSTEMS. At stage 2020, the signals at two or more frequencies may be simultaneously processed in the locator to determine buried object information, such as estimated current flow, phase, object location, depth, and the like, at each frequency. At stage 2030, visual display information may be generated based on two or more of the simultaneously received and processed signals. This information may be, for example, current information, position information, phase information, distortion information, and/or other information associated with the buried object as determined at two or more frequencies processed simultaneously. At stage 2040, the generated information may be provided in an integrated visual display of the locator, such as in the form or one or more lines or other objects which may be of different line types, shapes, colors, shading, blurring, fuzziness, etc. The information may include position and/or distortion information regarding the buried object as determined based on two or more of the simultaneously received and processed signal.

Figure 21:
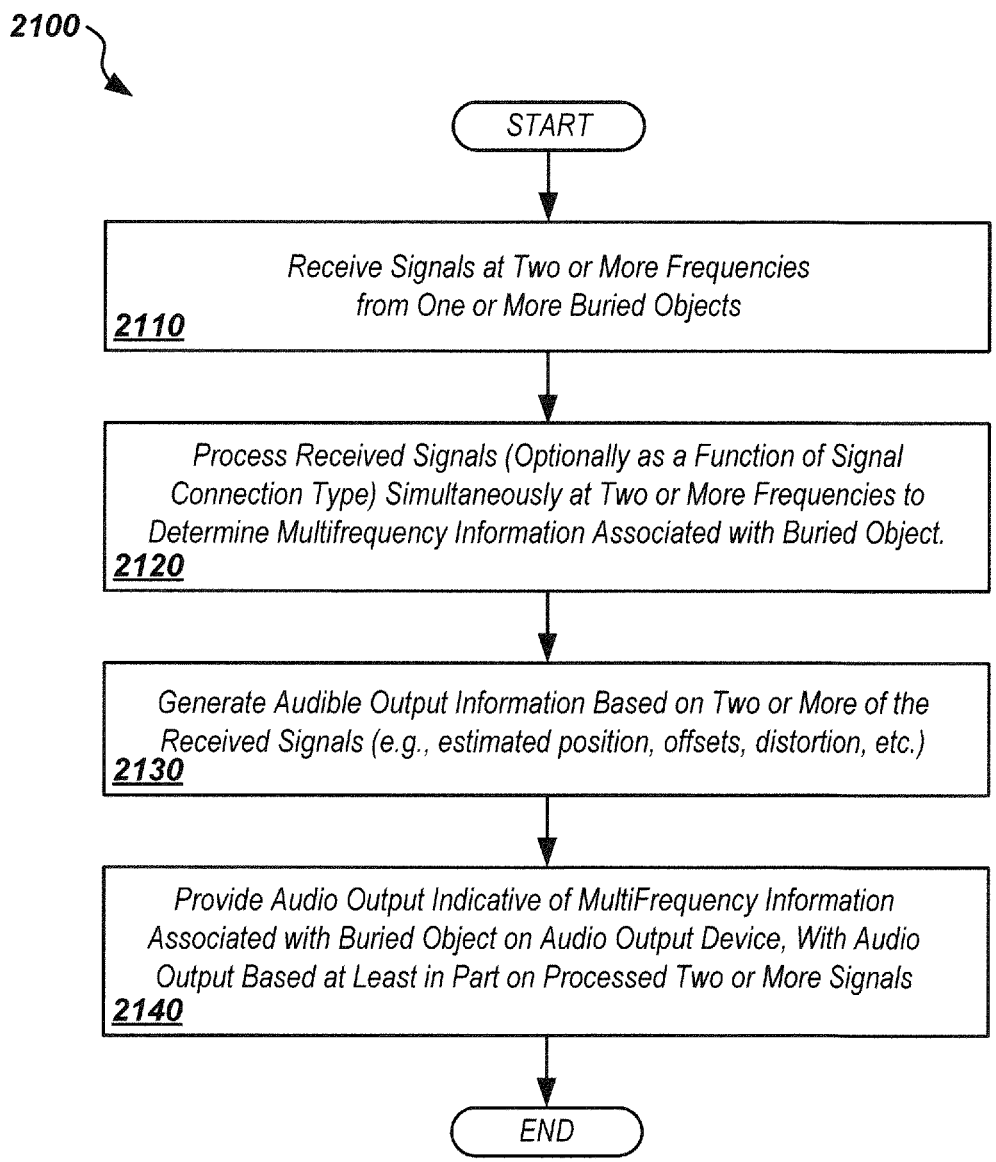
FIG. 21 illustrates an embodiment of a process for simultaneously receiving and processing multi-frequency signaling from buried objects to provide a multi-frequency audible output.

FIG. 21 illustrates details of an embodiment 2100 of a process for generating audible output information as a function of two or more simultaneously received and processed signals at different frequencies. At stage 2110, signals at two or more frequencies may be received at the locator. The signals may include gradient signals as described in, for example, commonly filed U.S. Utility patent application Ser. No. 13/676,989, entitled QUAD-GRADIENT COILS FOR USE IN LOCATING SYSTEMS. At stage 2120, the signals at two or more frequencies may be simultaneously processed in the locator to determine buried object information, such as estimated current flow, phase, object location, depth, and the like, at each frequency. At stage 2130, audible output information may be generated based on two or more of the simultaneously received and processed signals. This information may be, for example, current information, position information, phase information, distortion information, and/or other information associated with the buried object as determined at two or more frequencies processed simultaneously. At stage 2140, the generated audible output information, such as in the form or one or more combination, distortion, noise or static added, and/or directional elements may be provided on an audio output device such as a speaker or headphones.

In various embodiments, information associated with buried objects can be generated based on both multi-frequency data and quad-gradient antenna array data (e.g., antenna arrays including quad gradient element along with omnidirectional antenna array elements). In these embodiments, the output information that is displayed and/or provided as audible output may be based on combinations of multi-frequency data and omnidirectional antenna array and/or quad gradient antenna array received signals and data. Details of quad-gradient aspects and implementation are further described below with respect to FIGS. 22-40.

Figure 38:
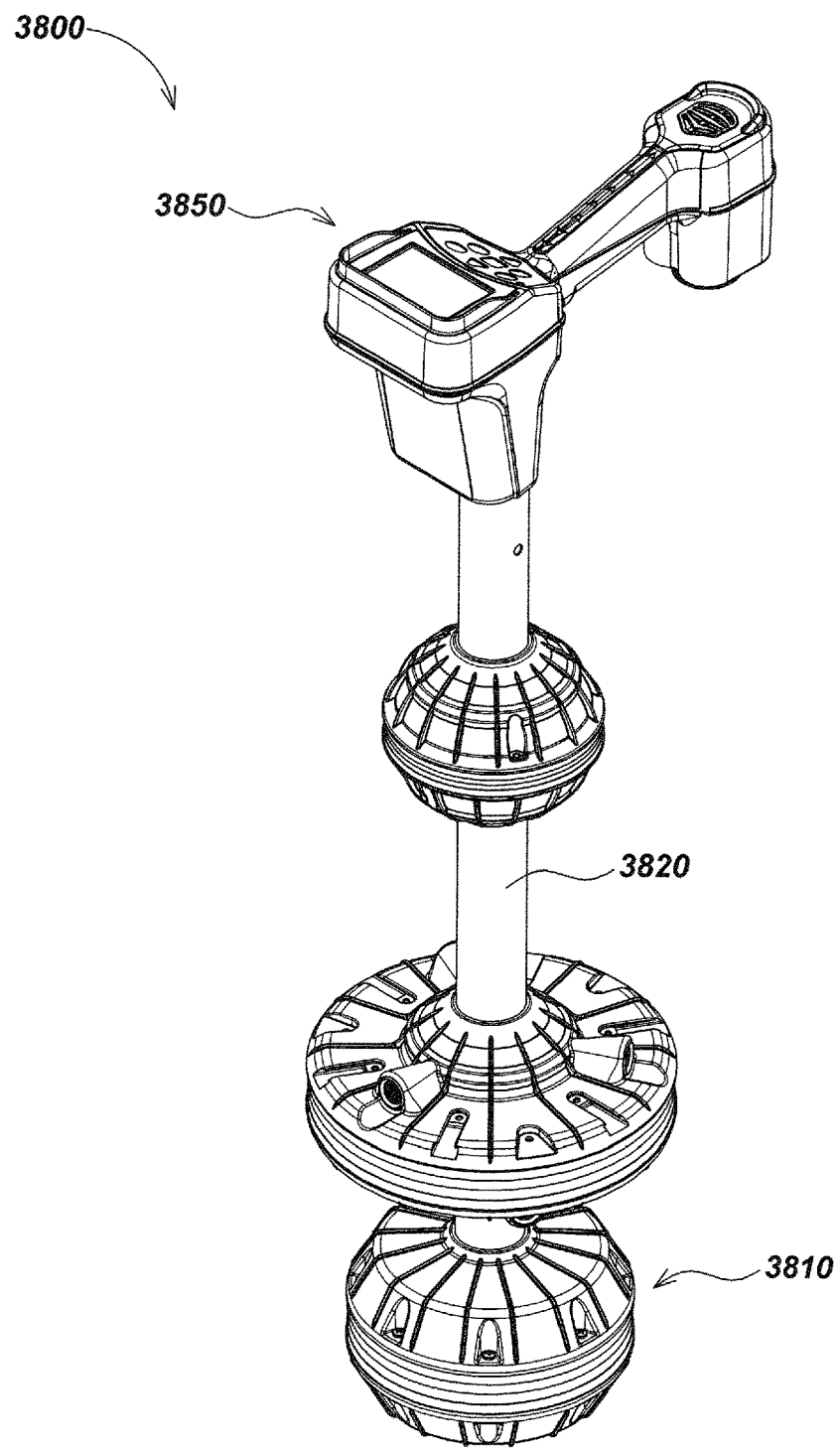
FIG. 38 illustrates details of an embodiment of a buried object locator with a quad-gradient coil antenna node.

For example, FIG. 38 illustrates details of an embodiment 3800 of a buried object locator that may include a quad-gradient antenna node 3810 in accordance with certain aspects. Locator 3800 may correspond with locator 103 of FIG. 1. The antenna node 3810, which may correspond with node 107 of locator 103, may include multiple antenna components including a housing and a plurality of antennas within the housing comprising an antenna assembly, which may comprise multiple antenna arrays including an omnidirectional antenna array and a gradient antenna array. Antenna node 3810 may be mounted or coupled at or near a distal end of a locator mast 3820 as shown, or, in some embodiments, may be positioned elsewhere on a locator or similar system. In an exemplary embodiment, the gradient antenna array includes four antenna coils, and the omnidirectional antenna array may include a plurality of antenna coils, which may be nested in a spheroid shape. The axes of the gradient coils may be positioned substantially in a plane that intersects the center of the omnidirectional antenna array. In an exemplary embodiment, the gradient coils may be positioned within approximately one half antenna diameter or ferrite core length of the center of the orthogonal antenna coil array center.

A proximal end of the antenna mast may be coupled to a locator processing and display module 3850 which may include a case or housing and one or more elements configured to receive and process signals from the antenna node 3810 and/or other inputs, such as sensor elements such as position sensors (e.g., GPS, ground tracking optical or acoustic sensors, cellular or other terrestrial wireless positioning elements, and the like), inertial sensors (e.g., accelerometers, gyroscopic sensors, compass sensors, etc.) as well as other sensors or related devices.

Module 3850 may further include user interface elements such as switches, pushbuttons, touch display panels, mice or trackball devices, or other input elements, as well as output elements such as one or more visual display elements such as one or more LCD panels, lights or other visual outputs, as well as audio output elements such as audio speakers, buzzers, haptic feedback elements, and the like. Module 3850 may further include one or more processing elements for receiving and processing antenna signals, sensor signals, user inputs, and/or other input signals and generating outputs to be provided on the display elements and/or for storage in memory or on storage devices such as USB flash devices, disks, or other computer storage devices or systems. Processing of signals from the antenna node 3810 may be performed by one or more processing elements in the node and/or by processing elements in the processor and display module 3850 or in other modules (not shown) located elsewhere in the locator 3800.

Figure 22:
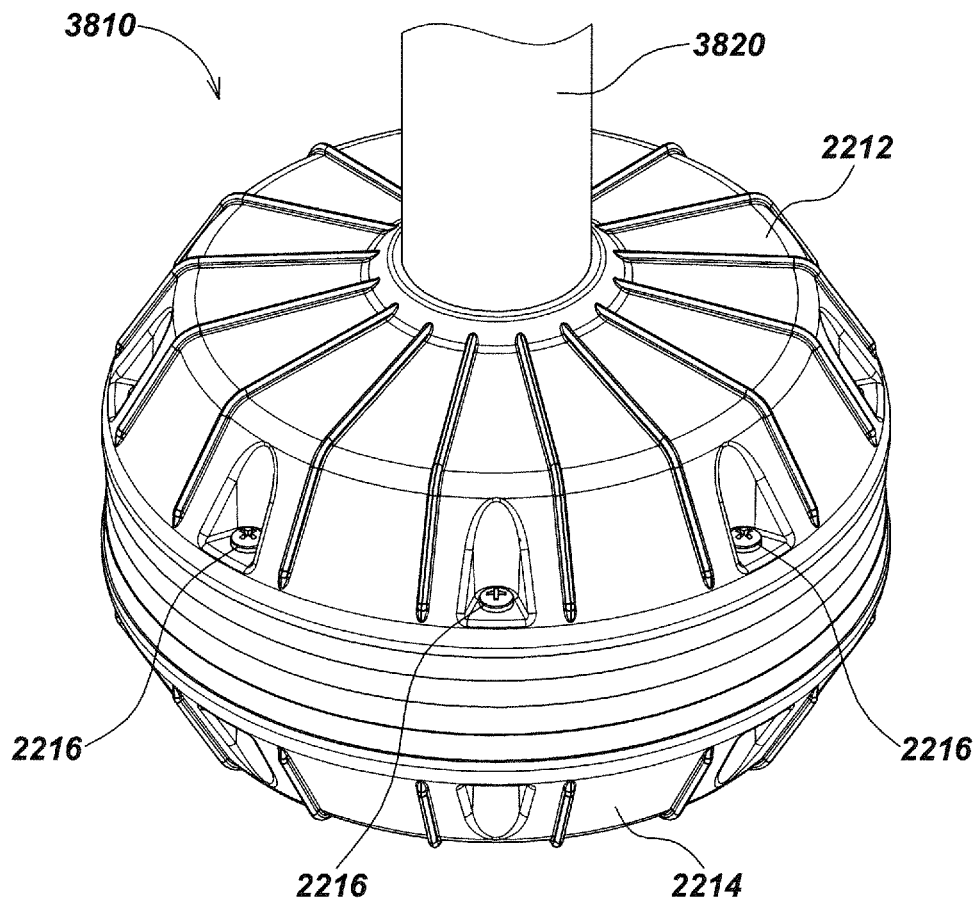
FIG. 22 is an isometric view of an embodiment of a quad-gradient coil antenna node and a section of a locator mast.

FIG. 22 illustrates additional details of a housing and an external surface of the housing of quad-gradient antenna node embodiment 3810 coupled at a distal end of locator mast 3820. External components of the quad-gradient antenna node 3810 may include a housing, which may include components such as top shell half 2212 that may be coupled to a bottom shell half 2214 by, for example, a series of screws 2216 or other attachment mechanisms. In some embodiments, the housing may be made from other shell components and configurations, such as additional shell components beyond the top and bottom shell halves shown in FIG. 22. In addition, in some embodiments, other external components such as sensors, accessories, or other components (not shown) may also be located on or in proximity to antenna node 3810.

Figure 23:
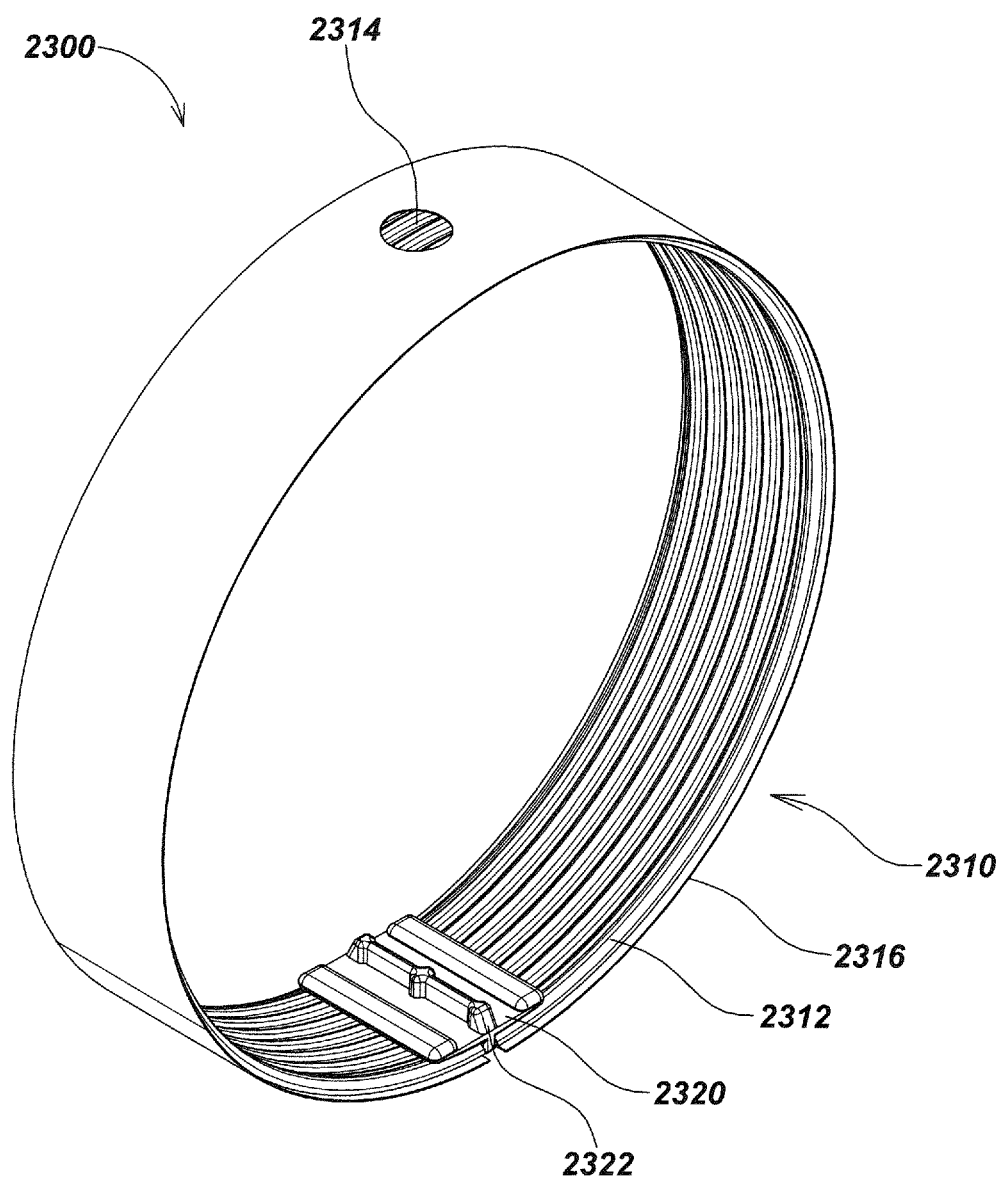
FIG. 23 is an exploded isometric view of an antenna coil from the quad-gradient coil antenna node embodiment of FIG. 22.

Internally, quad-gradient antenna node 3810 may include one or more individual antenna elements or coils, such as the antenna coil 2300 as illustrated in FIG. 23. The antenna elements may be mounted on or coupled to or disposed in an antenna array support structure configured to house the antenna coils and other components.

In some embodiments, additional coils (not shown), denoted as "dummy coils" may be used, such as in a front-to-back configuration, to balance the mutual inductance on the central omnidirectional antenna array coils ("triad"). This may be configured to provide better rotational accuracy and symmetry.

FIG. 23 illustrates details of one embodiment of a coil that may be used in antenna node such as node 3810. As shown in FIG. 23, a thin metal core 2310 maybe formed with a plurality of ridges 2312 defining a series of U-shaped grooves which are substantially equally spaced apart axially. The grooves on the outer surface of the metal core 2310 may be wound with multiple strands of an insulated wire 2314 resting on an insulating layer 2316 that may comprise a low dielectric material such as Teflon@ tape or other dielectric materials. In some embodiments, the two ends of the core may be spaced a short distance from each other and secured by a plastic connector 2320 that may be formed with a central riser 2322. Details of example embodiments of individual antenna coil elements as may be used in embodiments of the present invention are described in, for example, U.S. patent application Ser. No. 12/367,254, filed Feb. 6, 2009, entitled LOCATOR ANTENNA WITH CONDUCTIVE BOBBIN, the content of which is incorporated by reference herein in its entirety.

Figure 24:
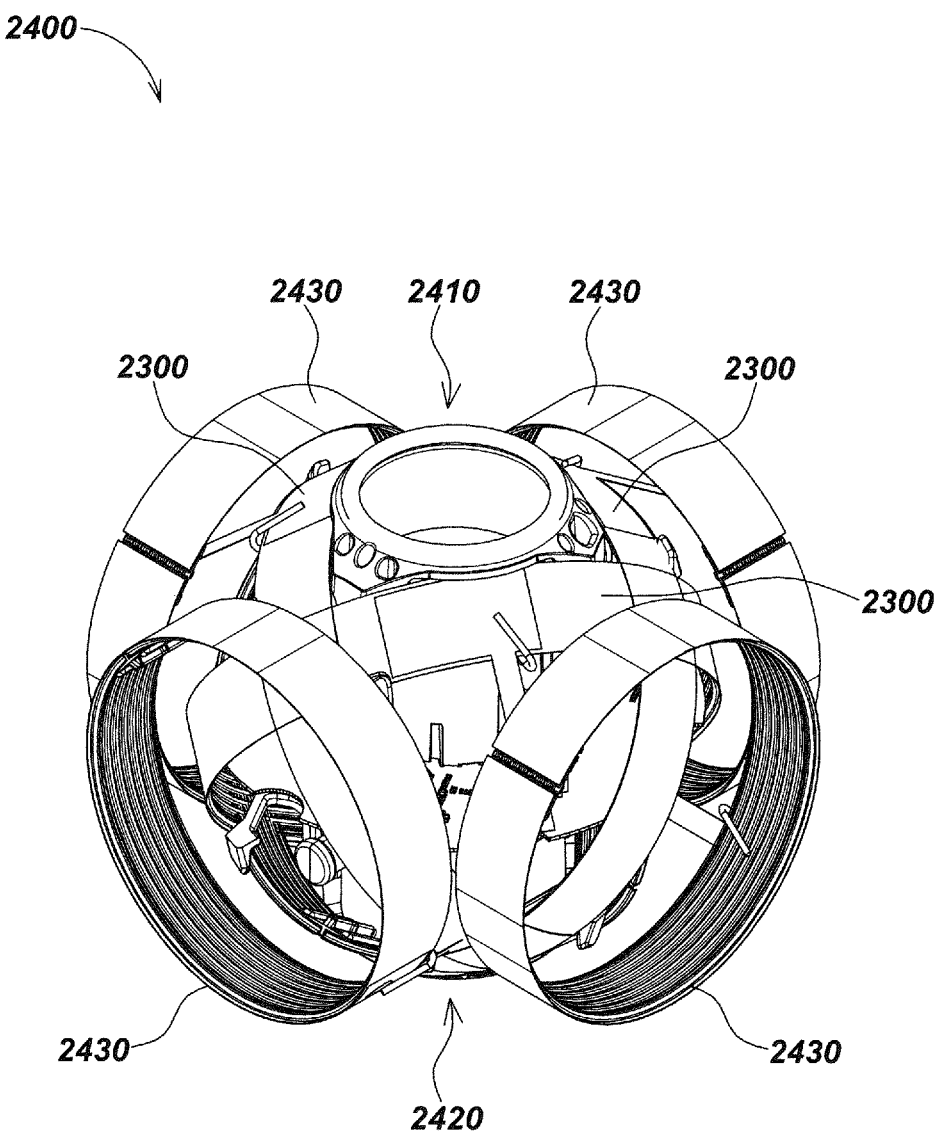
FIG. 24 is an isometric view of a quad-gradient antenna array embodiment.

Turning to FIG. 24, in an exemplary embodiment, a quad-gradient antenna array, such as the quad-gradient antenna array 2400 within quad-gradient antenna node 3810, may include seven antenna coils, which may be coils 2300 and coils 2430 or other antenna elements of different sizes, shapes, and/or configurations. In this example embodiment, a first subset of the coils may be orthogonally oriented antenna coils in an omnidirectional antenna array and a second subset of the coils may be diametrically opposed antenna coils in a gradient antenna array. Other configurations and/or number of antenna elements may be configured in different array arrangements that include omnidirectional elements and gradient elements in alternate embodiments.

For example, the antenna coils 2300 may be secured on or within an antenna array support structure, such as central support assembly 2410, such that the three antenna coils 2300 are orthogonal to one another to form an omnidirectional antenna array, such as the omnidirectional antenna ball assembly 2420. Further details of embodiments of omnidirectional antennas and related support structures as may be used in various embodiments are described in, for example, co-assigned U.S. Pat. No. 7,009,399, issued Oct. 9, 2002, the content of which is incorporated herein in its entirety.

The antenna coils 2430 may be positioned circumferentially about the omnidirectional antenna ball assembly 2420 such that each antenna coil 2430 may be diametrically located from a paired antenna coil 2430 to form a gradient coil antenna array assembly. In some embodiments, fewer than or more than four antenna coils may be alternately be used in the gradient coil antenna array. Additional coils may also be attached to the bottom and top of the omnidirectional antenna ball assembly to form a third, vertical gradient coil pair. Similarly, in some embodiments, fewer than or more than three antenna coils may be used in the omnidirectional antenna array. In some embodiments, different coil types, shapes, sizes, or configurations may be used for the omnidirectional and/or gradient antenna arrays.

In an exemplary embodiment, such as shown in FIG. 24, a center of the gradient coil arrays may be substantially co-planar with the centers of the omnidirectional antenna array elements. In this configuration, axes through the centerlines of the two pairs of gradient coils 430 (e.g, if the two coils were wheels the centerlines would correspond to an axle through their centers) intersect at a common point, which also intersects the centerpoint of the omnidirectional array coils 2300. The combination of omnidirectional antenna array coils and gradient array coils may be housed in a single enclosure to form an integral combination omnidirectional and gradient antenna node.

In some embodiments, an antenna array may be implemented similar to array 400 of FIG. 4, but include an eight, larger diameter equatorial coil (not shown) which may be configured similarly to antenna coil 300, surrounding the four coils 430 and having a vertical central axis aligned with antenna support 120. The centerline plane of symmetry of this additional coil may be positioned to approximately intersect the center of the central omnidirectional array 410. This additional coil may be used to sense vertical fields and/or may be configured as an active coil to energize and excite radio frequency identification device (RFID) markers or other devices. This additional coil may be entirely enclosed inside the quad gradient antenna node enclosure 410 or, in some embodiments, may be positioned external to the enclosure. An example of a similar configuration is illustrated in FIG. 9 of co-assigned U.S. patent application Ser. No. 13/469,024, entitled BURIED OBJECT LOCATOR APPARATUS AND SYSTEMS, filed May 10, 2012, the content of which is incorporated by reference herein. In some embodiments, the equatorial coil may be positioned inside the gradient coils (e.g., as shown in FIG. 9 of the '024 application), however, in other embodiments it may be positioned outside to sense vertical fields and/or excite RFID devices or other electromagnetic devices.

Figure 25:
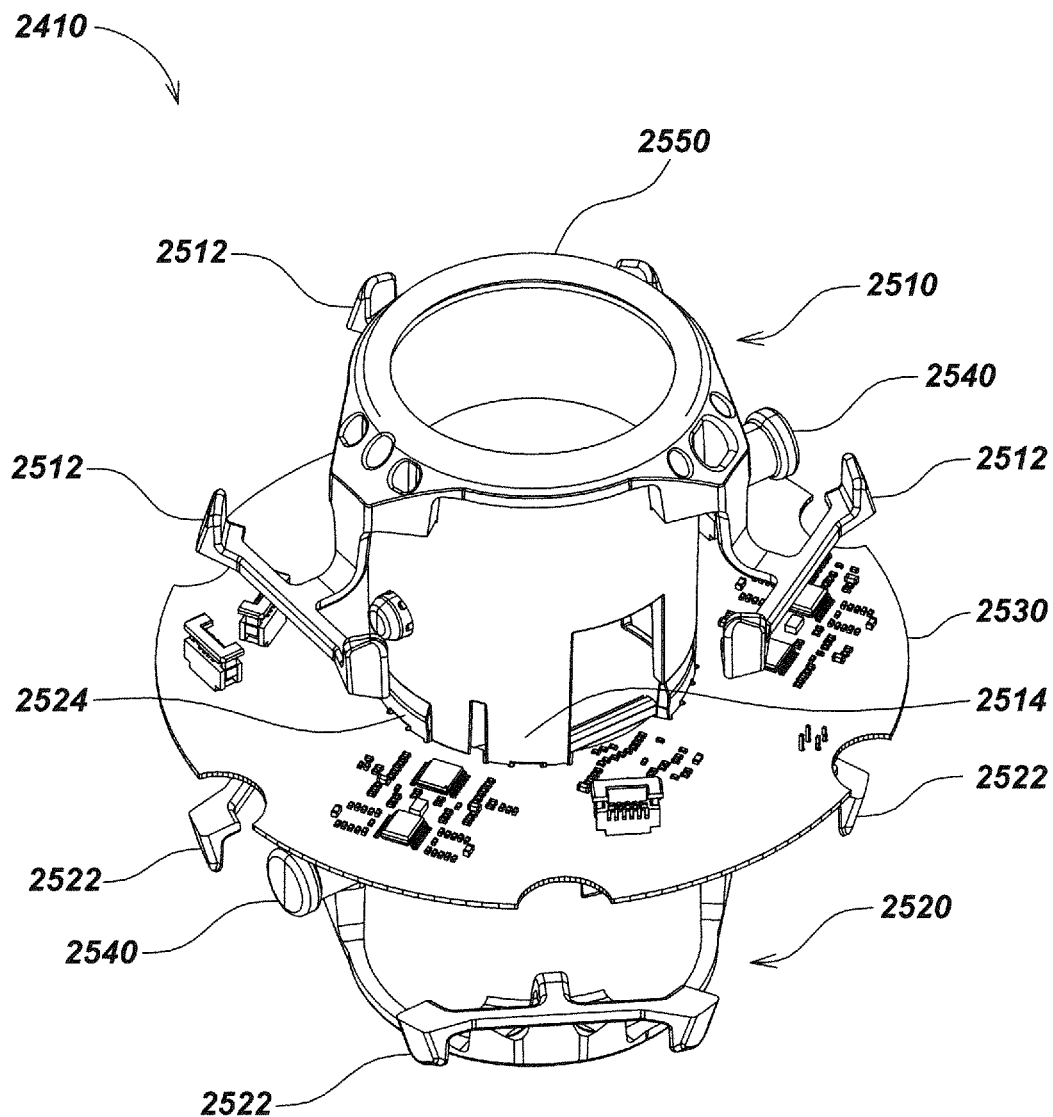
FIG. 25 is an isometric view of a central support structure embodiment from a quad-gradient antenna array.
Figure 26:
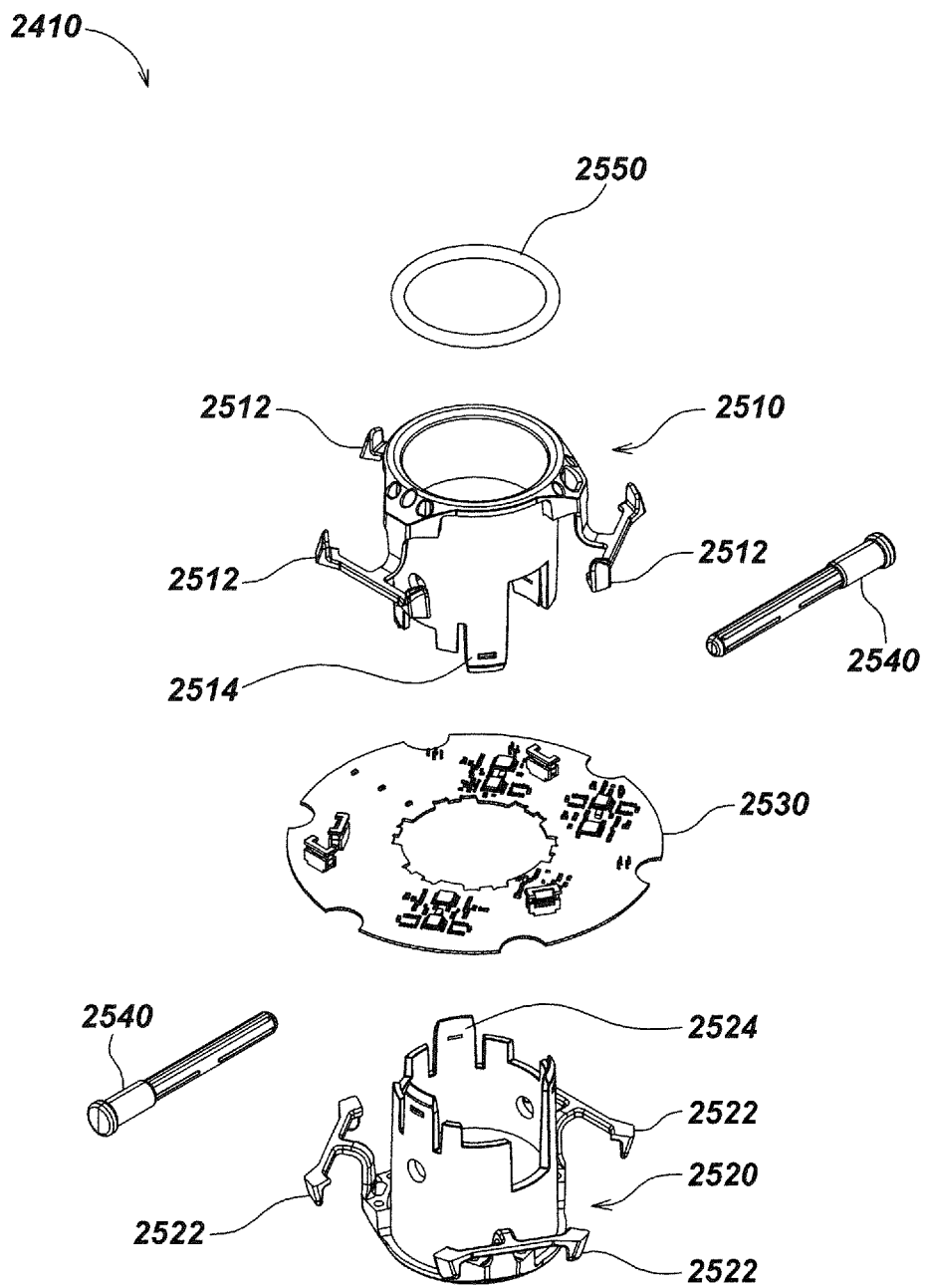
FIG. 26 is an exploded isometric view of a central support structure embodiment from a quad-gradient antenna array.

Turning to FIGS. 25 and 26, details of an embodiment of a central support assembly 2410 are illustrated. As shown, the assembly 2410 may include a central support top half 2510 with top coil support arms 2512, a central support bottom half 2520 with bottom coil support arms 2522, a printed circuit board (PCB) 2530, which may be disk-shaped, and/or a series of pins 2540.

In an exemplary embodiment, the central support top half 2510 and the central support bottom half 2520 may be configured to be substantially cylindrical in shape as shown so that the locator mast 3820 may be allowed to pass through the center of both when assembled. In other embodiments, different shapes and/or orientations may be used depending on the node or mast configuration and/or on other locator system requirements or constraints. Similarly, PCB 2530 may be formed in a disk shape as shown to mount within a spherical or rounded housing of the antenna node 3810.

The top coil support arms 2512 and the bottom coil support arms 2522 may be designed to hold the three antenna coils 2300 in place to form the omnidirectional ball assembly 2420. PCB 2530 may be configured to receive and process sensor signals from the antenna coils 2300, antenna coils 2430, and/or from other inputs such as additional sensors such as inertial and magnetic sensors. The signals may be processed in a processing element or elements disposed on PCB 2530 and/or elsewhere in the locator or other device.

PCB 2530 may be configured such that it sits centrally within the omnidirectional ball assembly 2420, thereby allowing the assembled central support top half 2510 and the central support bottom half 2520 to fit through the center the disk-shaped PCB 2530.

The central support top half 2510 maybe formed with atop fastener formation 2514 and the central support bottom half 2520 with a bottom fastener formation 2524 that may allow the central support top half 2510 and the central support bottom half 2520 to each independently be secured to the PCB 2530. In assembly, two of the pins 2540 may pass through holes formed on the central support top half 2510, the central support bottom half 2520, and the locator mast 2120, thereby securing the quad-gradient antenna node 3810 to the locator mast 2120. An O-ring 2550 located at the top of the central support top half 2510 may be used to provide a protective seal to the quad-gradient antenna node 2110.

Figure 27:
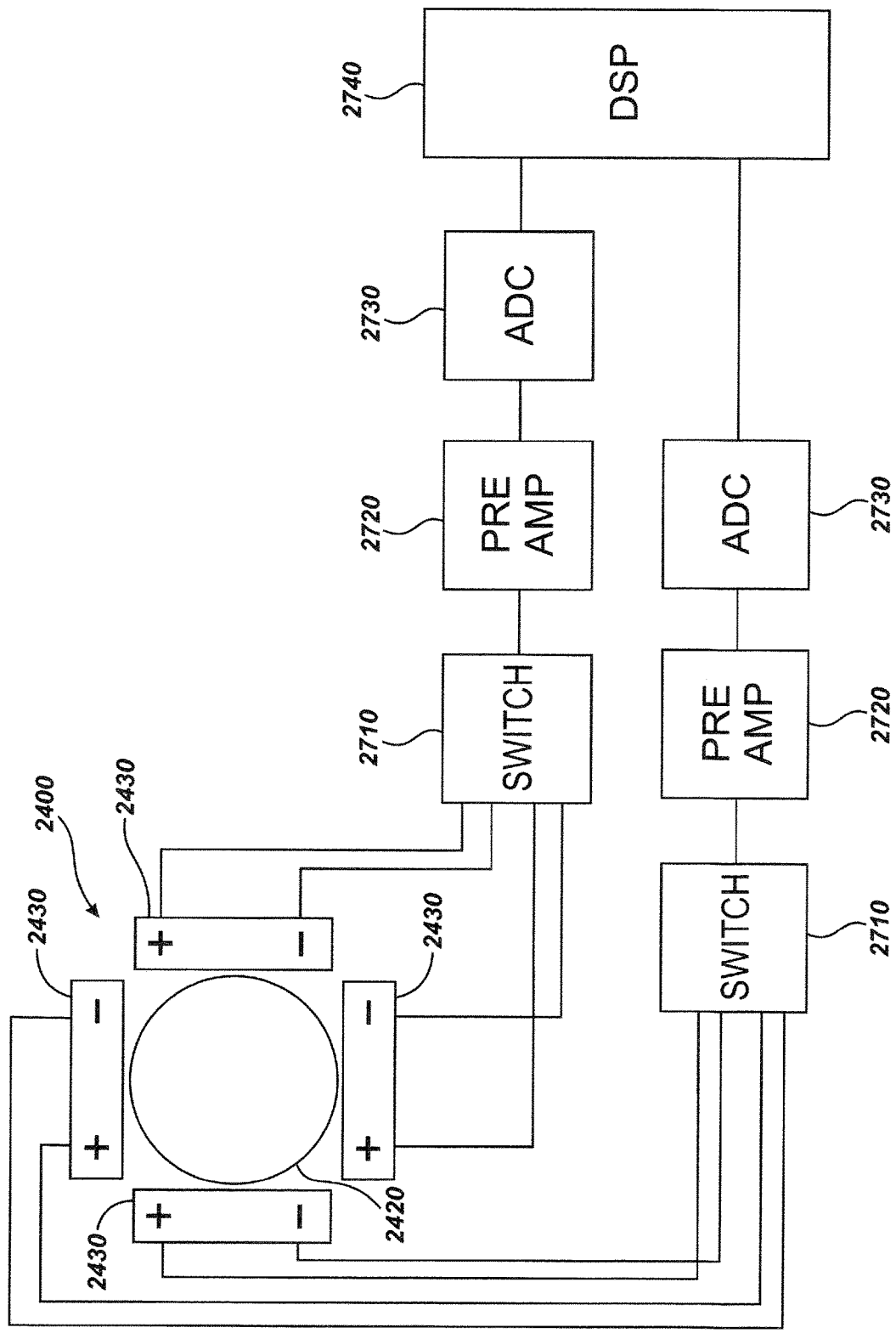
FIG. 27 is a diagram illustrating using a switch embodiment for switch between diametric pairs of gradient antenna coils.

FIG. 27 illustrates details of an embodiment of an antenna array switching module which may be implemented using antenna coils as described previously herein, in conjunction with a processing element and related components, such as pre-amp 2720, switches 2710, and analog-to-digital converters 2730. The processing element may include a digital signal processing device or DSP 2740 and/or may be implemented on other processing elements, such as general or special purpose microprocessors or microcontrollers, ASICs, FPGAs, or other programmable devices, as well as other devices such as memories, I/O devices, A/D converters, or other electronic components. The switching between paired gradient antenna coils may be controlled by DSP 2740 or some other system control element, such as switching circuit, processor with associated firmware or software, or other devices. In operation, various antenna elements may be switched in or out of the circuit to facilitate signal processing and output functions such as are described subsequently herein.

For example, in the switching module configuration of FIG. 27, one antenna coil 2430 from each diametric pair of antenna coils 2430 positioned circumferentially about the omnidirectional antenna ball assembly 2420 in the gradient array may be wired to the same switch 2710 such that a gradient signal may be generated from one of the two diametric pairs of antenna coils 2430 at a particular point or period in time. This configuration allows for time-division multiplexing of gradient signals, which may be done in multiple orthogonal directions. From the switch 2710, a switched output signal may be sent to a preamp 2720 for amplification before being sent as an input signal to an analog-to-digital (ADC) converter 2730. From the ADC 2730, a digital output signal may then be communicated to a digital signal processor (DSP) 2740 or other processing component. In embodiments with greater than four antenna coils 2430 positioned about antenna ball assembly 2420, more than two channels may be used. In such embodiments, differencing of the signals may be done in software or hardware.

Figure 28:
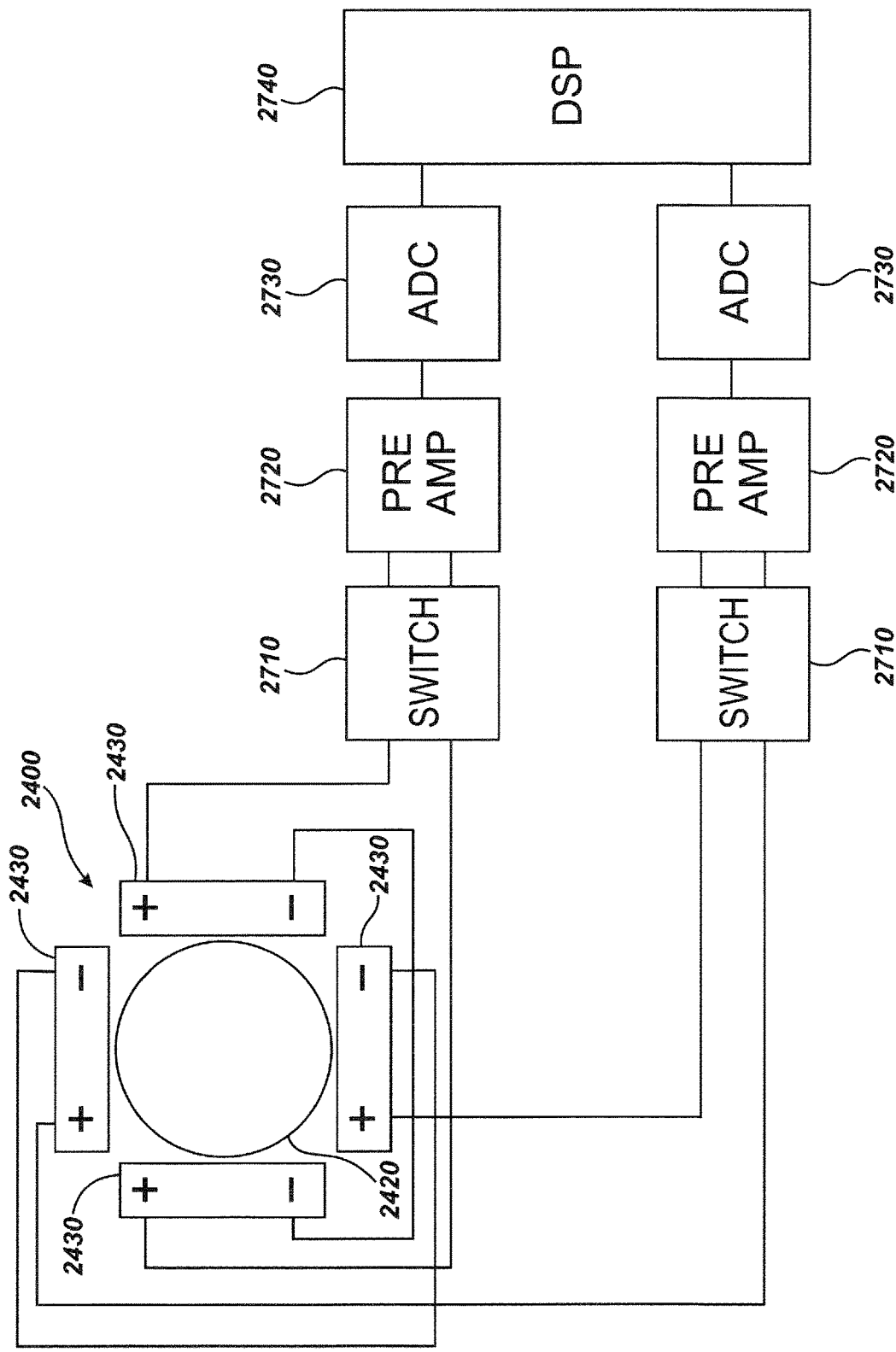
FIG. 28 is a diagram illustrating an embodiment of gradient antenna coils wired in an anti-series configuration.

In the switching module configuration of FIG. 28, the four antenna coils 2430 positioned circumferentially about the omnidirectional antenna ball assembly 2420 may be wired in anti-series such that the negative terminals on the diametric pairs of antenna coils 2430 are connected together and while their positive terminals are connected to the same preamp 2720. Similar to the configuration shown in FIG. 27, switched signals may then be communicated to an ADC 2730 and then a DSP 2740.

In such embodiments, wiring negative to negative on diametric pairs of antenna coils 2300 may allow for a canceling or differencing of signals in the gradient array. Additional details of differencing signal processing apparatus and methods are described in, for example, co-assigned U.S. Provisional Patent Application Ser. No. 61/485,078, filed May 11, 2011, entitled LOCATOR ANTENNA CONFIGURATION, and U.S. Utility patent application Ser. No. 13/469,024, entitled BURIED OBJECT LOCATOR APPARATUS AND SYSTEMS, filed May 10, 2012, the content of which are incorporated by reference herein.

In some embodiments, the four antenna coils 2430 positioned circumferentially about the omnidirectional antenna ball assembly 2420 may also be wired in anti-series with opposite polarities such that the positive terminals on the diametric pairs of antenna coils 2430 are connected together and while their negative terminals are connected to the same preamp 2720. Other configurations of switchable interconnections between antenna elements, such as when more or fewer antenna elements are used, may also be implemented in various embodiments.

Figure 29:
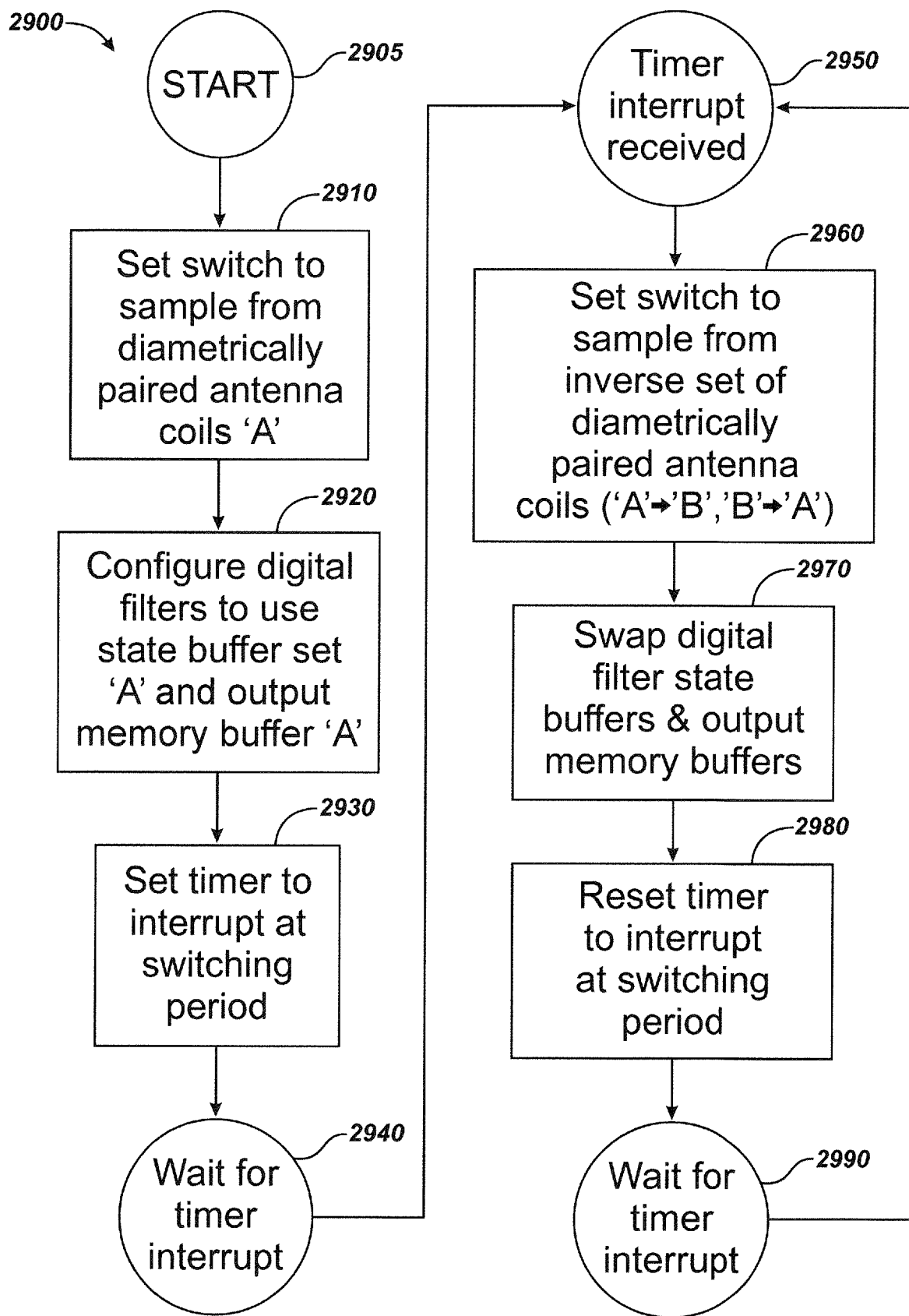
FIG. 29 is an embodiment of a process illustrating a time multiplexing method for interpreting signals between switching diametric pairs of gradient antenna coils.

Turning to FIG. 29, details of an embodiment 2900 of time multiplexing signal processing are illustrated. This method may be used with the signals generated from diametrically paired ones of the four antenna coils 2430 as described with FIG. 27.

At stage 2905, switch 2710 may be set to sample from one diametric pair of antenna coils 2430 in block 2910. At stage 2920, digital filters may be configured to use state buffers and/or output memory buffers corresponding to the chosen diametric pair of antenna coils 2430. At stage 2930, a timer may be set to generate an interrupt at the given switching period. At stage 2940, a wait period for the timer interrupt may be performed. Once the timer interrupt is received at stage 2950, switch 2710 made be set to sample from the inverse diametric pair of antenna coils 2430 at stage 2960. At stage 2970, the digital filter state buffers and output memory buffers may be switched to coincide with that of the selected diametric pair of antenna coils 2430 from stage 2960. The timer may then be reset to interrupt at the switching period at stage 2980. At stage 2990, an action to wait for the timer interrupt may be performed. Processing may then return to stage 2950 once the timer interrupt is received.

Figure 30:
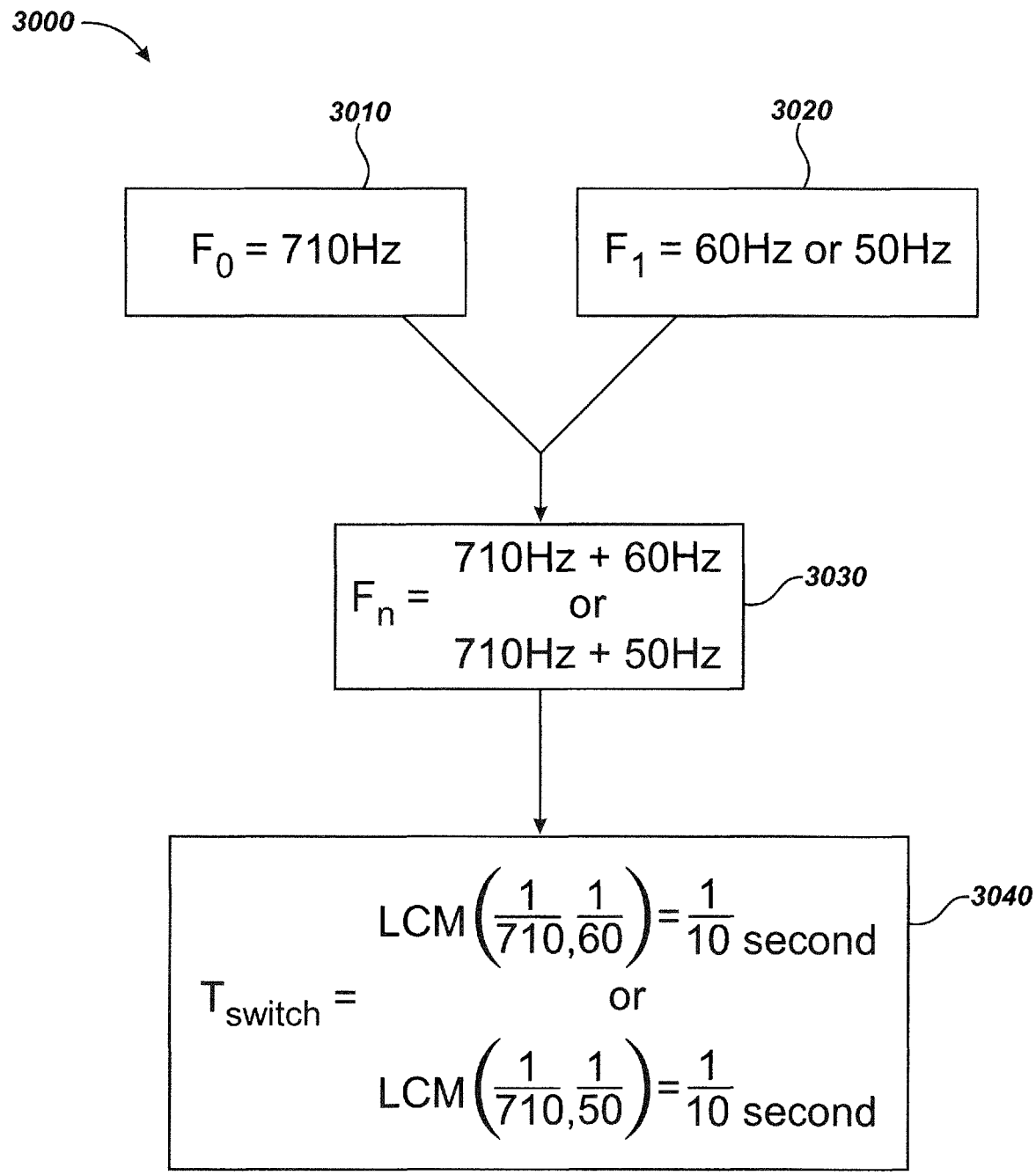
FIG. 30 illustrates an embodiment of a least common multiplier method for determining the length of time by which switching occurs between diametric pairs of gradient antenna coils.

Turning to FIG. 30, details of an embodiment 3000 of a least common multiple method for signal processing are illustrated. This method may be used to determine timing of switching of the antenna coils 2430 when using the time multiplexing method of FIG. 29 to determine a least common multiple of the periods of the sensed signals. To avoid introducing transients into a digital filter, an integer number representing the least common multiple of periods of all sensed signals may be used to determine the frequency at which the antenna coils 2430 should be switched. For example, a 710 Hz signal in block 3010 and a 50 or 60 Hz signal in block 3020 may both be sensed as shown in block 3030. At stage 3040, a calculation may be made whereby the least common multiple results in the appropriate run length of the digital filter, for the example frequencies shown, is 1/10 of a second. In such embodiments, Fourier analysis of the continually sensed antenna coils 2300 in the onmidirectional antenna ball assembly 2420 may be used to determine the frequencies of the sensed signals.

Figure 31:
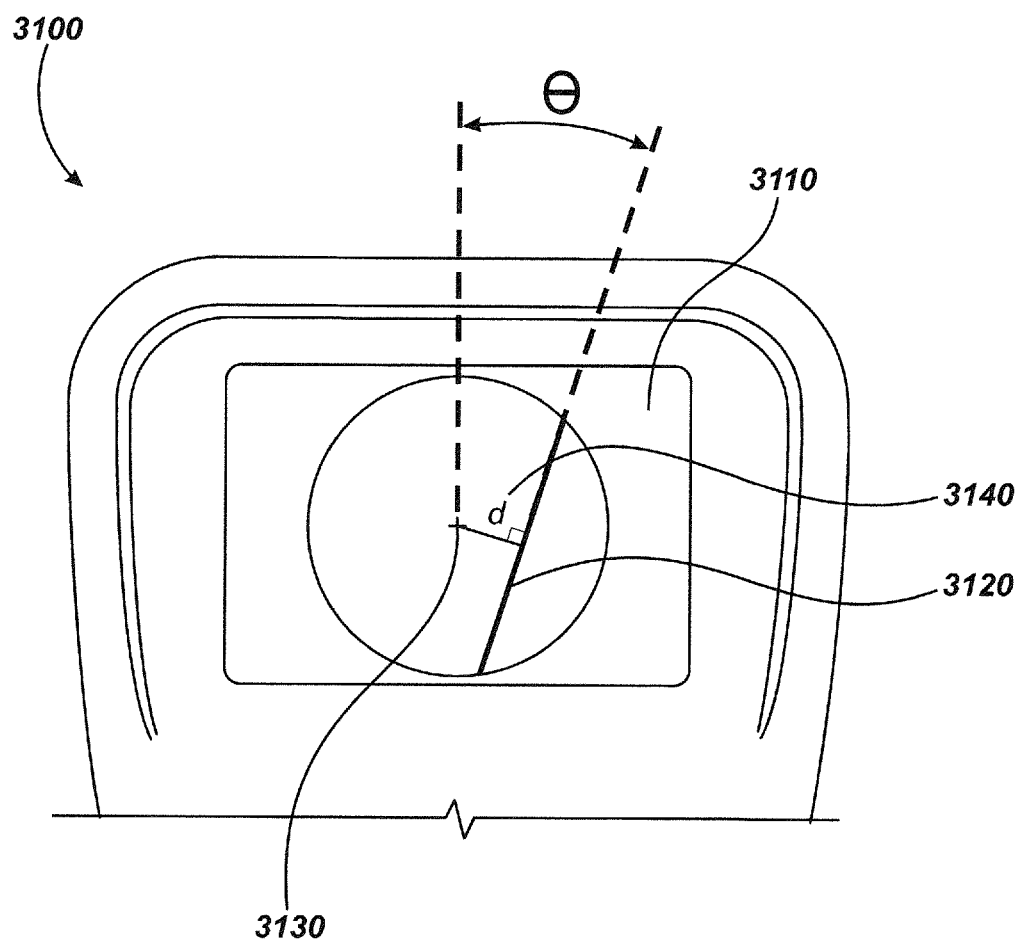
FIG. 31 is a top view of an embodiment of a graphical user interface that may be used in a locator or other device.
Figure 32:
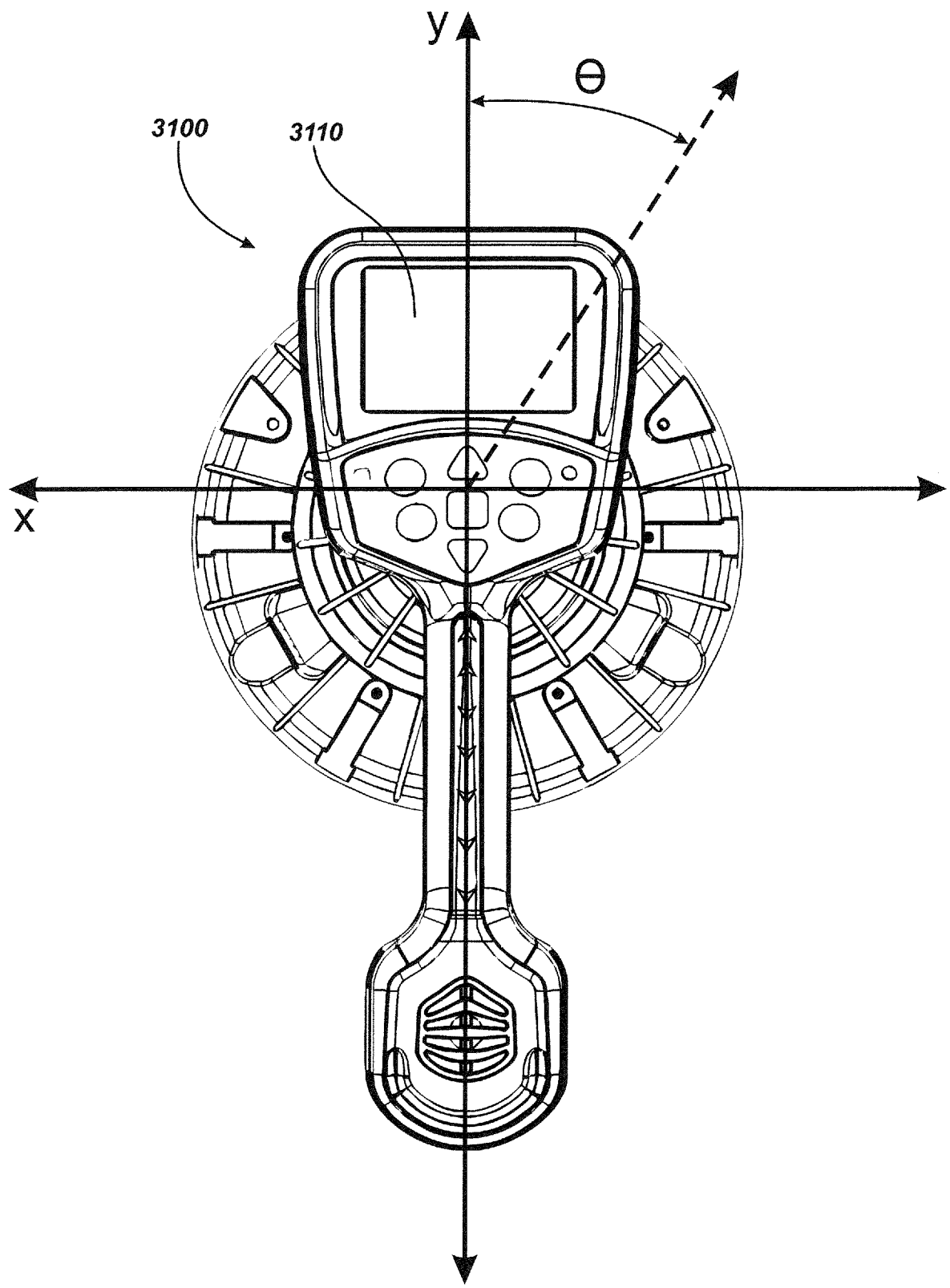
FIG. 32 is top view of a locator device embodiment illustrating am xy plane and azimuthal angle.
Figure 33:
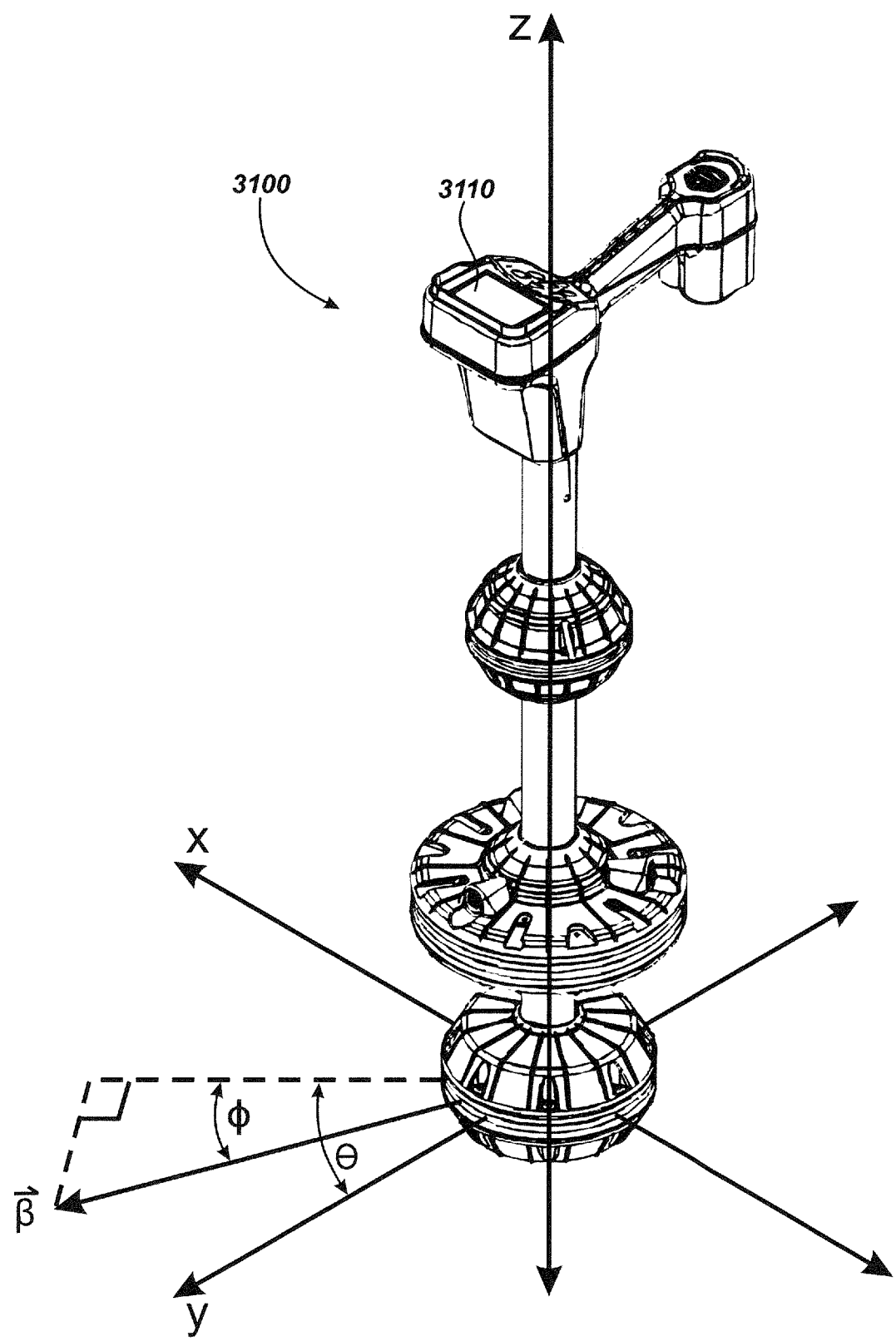
FIG. 33 is an isometric view of a locator device embodiment illustrating an angle of altitude.

Turning to FIGS. 31-33, a locating device embodiment 3100 in accordance with aspects shown in part in FIG. 31 may include a graphical user interface (GUI) 3110 for visually presenting information to a user on a display, such as an LCD panel or other display device. The locating device 3100 may correspond with the locator of FIG. 38 and may be part of display module embodiment 150 in some embodiments. In the GUI display, a line associated with a buried utility or other target, such as a guidance line 3120, may be rendered on the screen to indicate the orientation and/or location and/or position of and to guide a user to the utility. The line may be provided in a common display color (e.g., a solid black line on a black and white display) and/or may be displayed using a distinct color, shading, highlighting, dashing, fuzziness or distortion, dashing, etc. in various embodiments. In calculating the placement and orientation of the guidance line 3120, a distance 'd', 3140, may be determined from the screen centerpoint 3130 to the guidance line 3120. The distance d may be determined orthogonally to the guidance line 3120, and a scaled representation of the physical distanced between the location of the locating device 3100 to the sensed utility may be determined and presented to a user. The distance d may be presented textually (e.g, X meters or feet) and/or graphically (e.g., on the display device as a symbol, color or shading, etc.), and/or may be presented audibly, such as on speakers or a headphone (not shown) coupled to the locator. The distance value of d may also be stored, such as in a memory or other data storage device of the locator, and may be transmitted to other devices or systems, such as by using a wired or wireless communications link, for further display, storage, processing, mapping, etc. In some embodiments, multi-frequency signal processing, as described previously herein, may also be used to generate the GUI. For example, signals may be processed as described above at multiple frequencies, with the resulting lines or other representation of the buried utility provided as outputs at multiple frequencies, such as in the form of frequency-specific lines or fuzziness or blurring used to show distortion as described previously herein. The buried object information may also be displayed through an audible output as described previously herein, which may be done based on a combination of multi-frequency and quad gradient-based data.

To calculated, the locating device may use the equation:

$$d = \{(\cos \phi)^2 \ast [(\sin \theta)^2 \ast C_1 \ast G_h^2 + (\cos \theta)^2 \ast C_2 \ast G_v^2] + (\sin \phi)^2 \ast C_3\}^{1/2}$$

In the aforementioned equation, the angle θ, as best illustrated in FIGS. 32 and 33, may be defined as the azimuthal angle of the sensed utility line in the xy plane. The angle φ, as illustrated in FIG. 33, may be the altitudinal angle of the vector $\vec{B}$ from the xy plane. The variable $G_h$ may be calculated as being equal to the measurements of the right side gradient coil minus the measurement of the left side gradient coil and the variable $G_v$ may be calculated as being equal to the measurements of the front gradient coil minus the measurement of the rear gradient coil. The constants $C_1$, $C_2$, and $C_3$, may be predetermined, such as by a device programmer during a calibration or testing procedure, and then stored in a memory of the locator for use in scaling the distance d to the graphical user interface 3110. In some embodiments, the constants may be dynamically determined by the device, such as during a calibration or operational process, and/or may be entered by a user.

In some embodiments, such as a locating device in which the graphical user interface screen is square in shape, the scaling constants of $C_1$ and $C_2$ may be equal. The equation for calculating the distance d also has the effect that when the locator device 3100 is close to the sensed utility, data gathered from the antenna coils of the gradient antenna array may be given greater weight than data gathered by the omnidirectional antenna array. When the locator device 3100 is further from the sensed utility, data gathered from the omnidirectional antenna array may be given greater weight within the aforementioned equation to find d and less weight may be given to data gathered by the antenna coils of the gradient antenna array. In doing so, the locating device 3100 may take advantage of greater accuracy of the gradient antenna array when close to the sensed utility and greater accuracy of the omnidirectional antenna array when further from the sensed utility. In the graphical user interface 3110, the orientation of the guidance line 3120 may also be determined by e.

In the preceding paragraphs associated with FIGS. 31-33, one particular method of combining information from the sensed signals of the gradient antenna array and omnidirectional antenna array is presented. It may occur to one skilled in the art to combine these signals in other ways as are known or developed in the art including, but not limited to, graphical methods and/or other equation or numeric methods. Such information may also be communicated to the user in various ways, such as the blurred guidance line 3420 of FIG. 34. For example, one potentially advantageous way in which the information from the signal sensed by the gradient and omnidirectional antenna arrays may be communicated to a user is by combining this information into a single indication of the buried utility. By providing the user with a single indication of the utility, rather than separate indications from the gradient and omnidirectional antenna arrays (e.g., such as separate directional arrows and lines), overall ease of use of the locating device may be increased.

Figure 34:
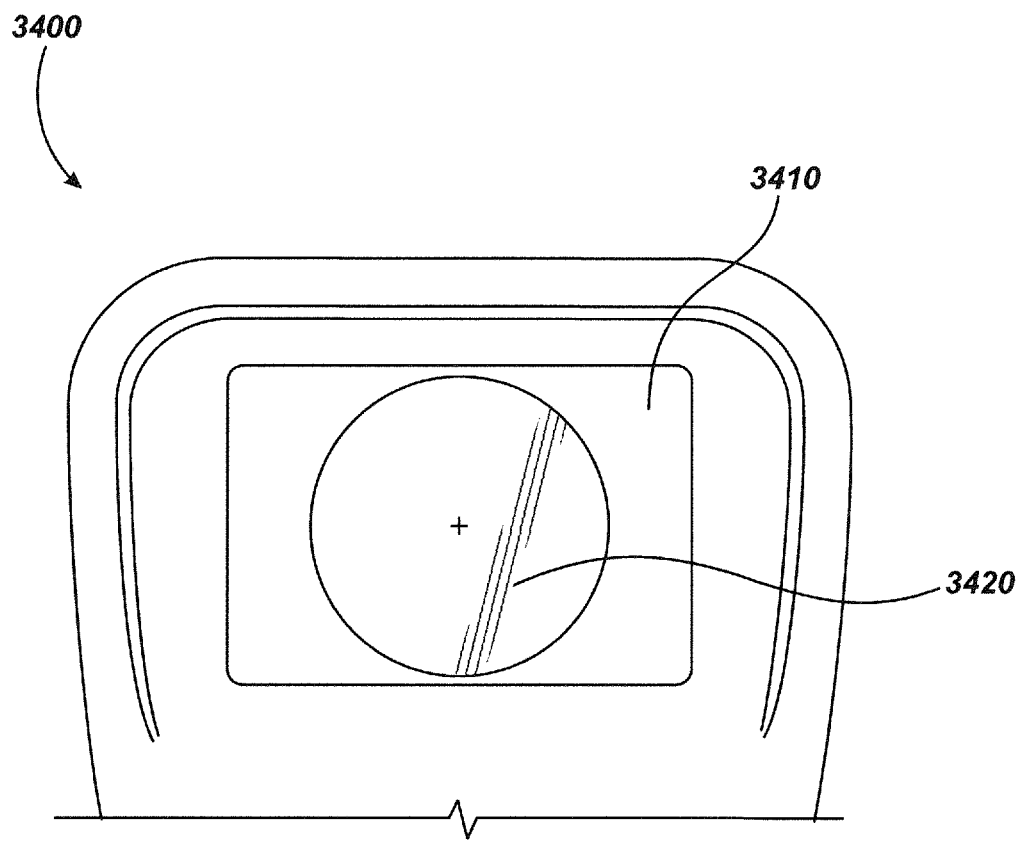
FIG. 34 is a top down view of another graphical user interface embodiment.

In FIG. 34, a locating device embodiment 3400 is illustrated in part which may include a graphical user interface 3410. This GUI may be part of a display module, such as module 3850 of locator 3800 as shown in FIG. 38. Some embodiments, such as in locating device 3400, may utilize the gradient antenna array and omnidirectional antenna array to continually measure signals, regardless of distance to the utility. In such embodiments, the difference between location and orientation of the utility as sensed by the gradient antenna array versus that sensed by the omnidirectional antenna array may be communicated to the user and/or stored and/or displayed as a metric of uncertainty. For example, in FIG. 34, a blurred guidance line 3420 may be used to graphically illustrate the uncertainty of the sensed location of the utility based on the differences. Other mechanisms for varying the displayed information to provide an indication of uncertainty may also be used in alternate embodiments, such as by using dashed lines, crawling ant lines or other line distortions, line thickness, line coloring or shading, fuzziness, and the like.

Uncertainty may also be caused by distortion of the signal and expressed on the locating device 3400 in a similar manner, either separately or in conjunction with the displayed information associated with differences between antenna arrays as described above. In some embodiments, sensed uncertainty of utility location and/or orientation may include, but is not limited to, widening or narrowing of the guidance line, changing the color and/or shading of the guidance line if used on a color graphical interface, having the line's position vacillate, blurring or fuzzing of the line, dashing or otherwise breaking the displayed line, changing the shape of line segments (e.g., by using small circles, triangles, squares, etc. to illustrate line segments), using a dedicated icon to indicate the uncertainty in degree and/or direction, as well as various other ways in which this information may be effectively communicated to the user as are known or developed in the art.

Figure 35:
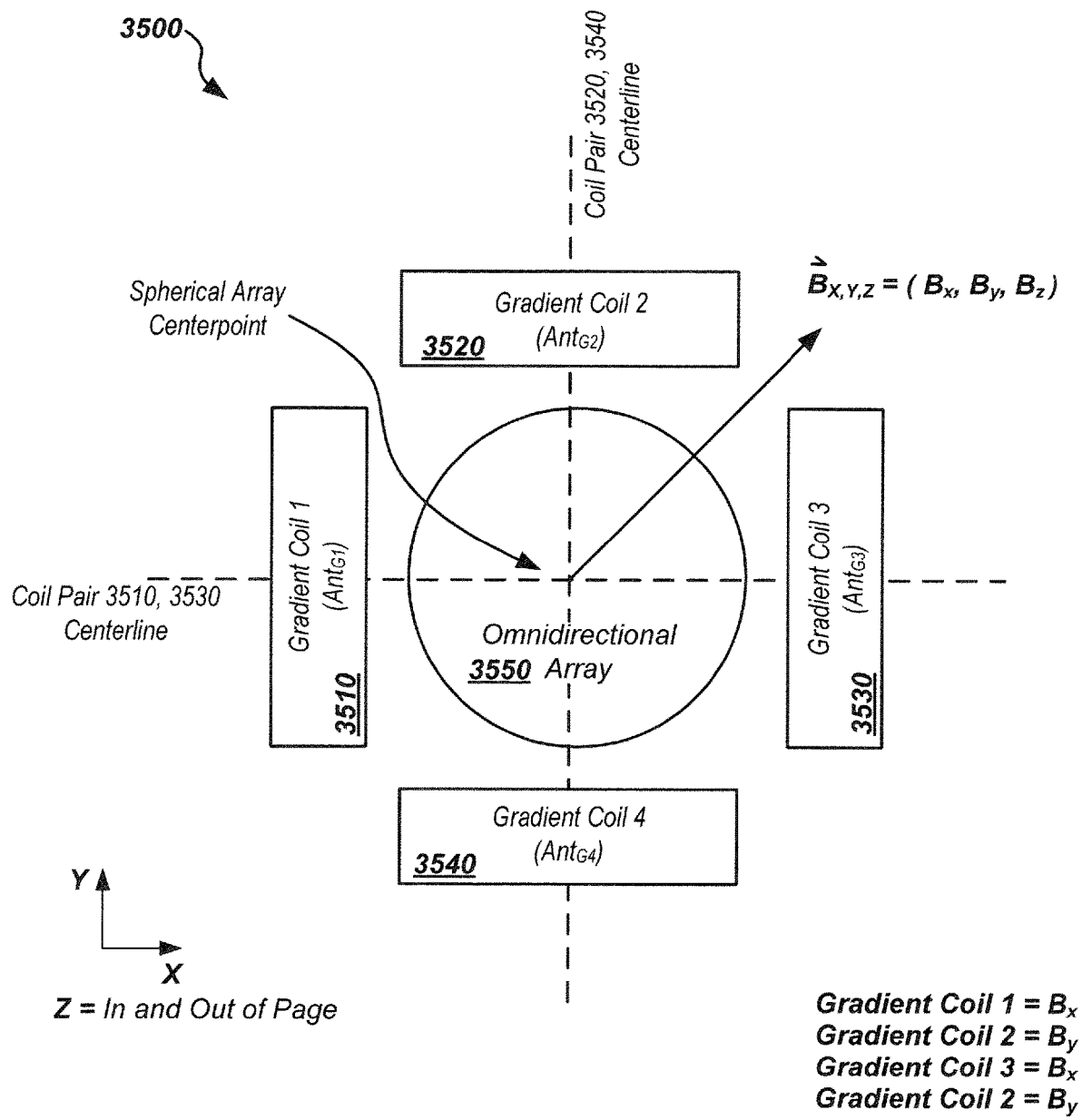
FIG. 35 illustrates details of an embodiment of a locator antenna assembly including an omnidirectional antenna array and a quad gradient antenna array.

FIG. 35 illustrates details of an embodiment of a locator antenna section 3500 including an omnidirectional array element 3550 along with a quad gradient antenna array element including gradient coil pairs 3510, 3530 and 3520, 3540. In an exemplary embodiment, the omnidirectional array 3550 centerpoint may intersect the centerlines of the gradient coil pairs 3510, 3530 and 3520, 3540 as shown. The measured magnetic field vector from omnidirectional array 3550 may be transformed to X, Y, and Z coordinates based on known positions of the three orthogonal coils relative to the gradient coil X and Y dimensions. The resulting magnetic field vector, $B_{X,Y,Z}$ may be generated by applying a transformation on the known but arbitrary orientation of the three omnidirectional antenna coil outputs.

In some embodiments, gradients may be determined between each coil and the measured value of the omnidirectional antenna array may be formed. This may be done by continuously converting the three signals from the omnidirectional antenna array in three A/D converters and switching gradient coils sequentially through another A/D converter, while using the B-field vector from the omnidirectional array as an anchor to reference each switched gradient coil to. The omnidirectional array B-field vector may also be used to refine prediction for subsequent digital filter processing.

Figure 36:
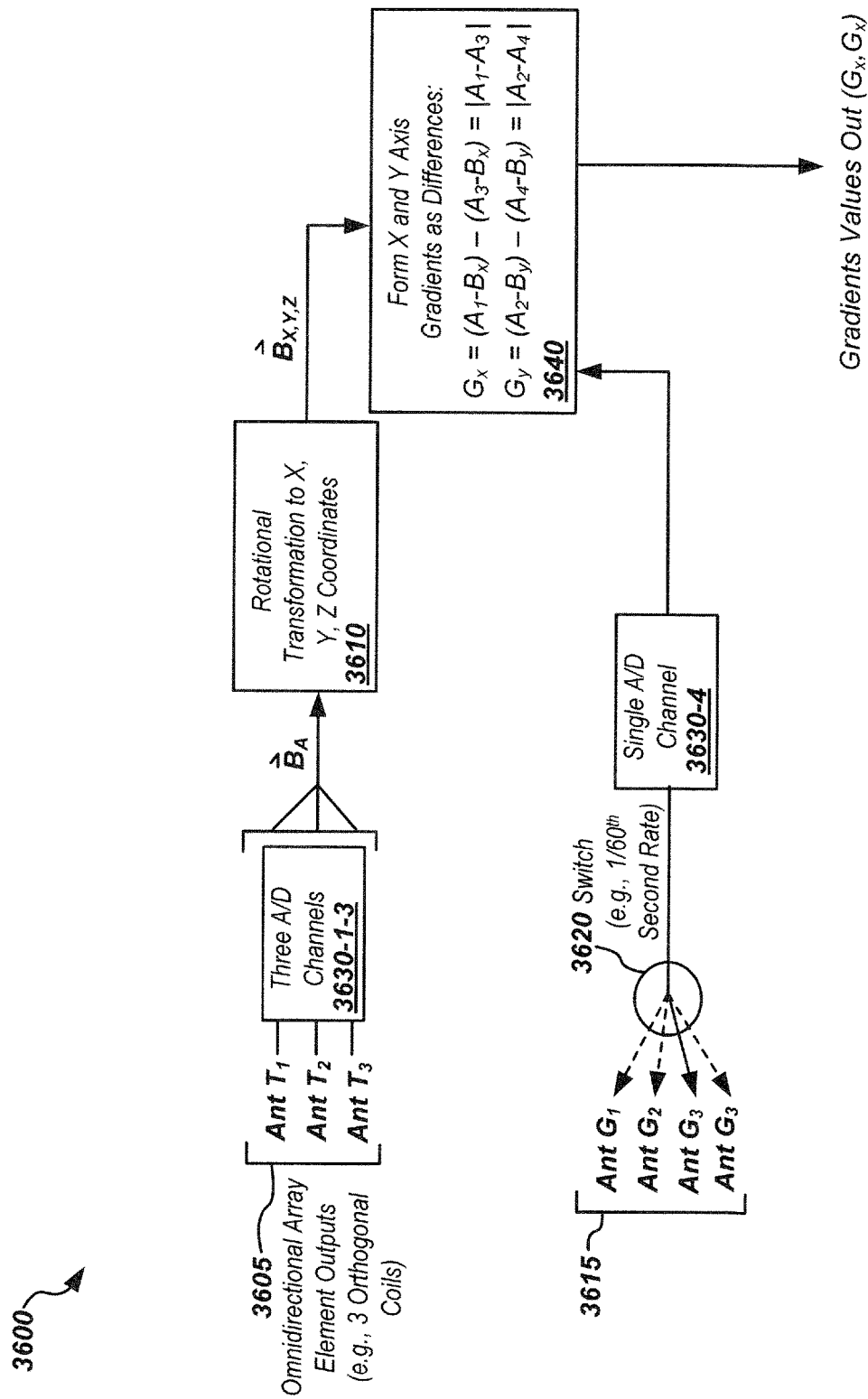
FIG. 36 illustrates details of an embodiment of a switching process for providing antenna signals from an omnidirectional antenna array and a quad gradient antenna array using a quad analog-to-digital converter device.

FIG. 36 illustrates details of an embodiment 3600 of circuitry for processing omnidirectional antenna array signals and gradient pair signals using a quad analog-to-digital (A/D) converter. Omnidirectional array 3605 may generate three orthogonal outputs from antennas $T_1$, $T_2$, and $T_3$ (e.g., three orthogonal coils corresponding to three coils of array 3550 of FIG. 35), with the coil outputs provided to three A/D channel 3630-1, 3630-2, and 3630-3 of a quad A/D converter 3630, resulting in a digital magnetic field vector, BA, in the coordinates of the omnidirectional array. The vector $B_A$, may be applied to a rotational transformation module 3610, where it may be translated into a vector $B_{X,Y,Z}$ in X, Y, and Z coordinates, with X and Y coordinates corresponding to the plane of the gradient coil pairs.

The remaining quad A/D converter channel 3630-4 may be used to digitize outputs from the four gradient coils (e.g., outputs from antennas $G_1$, $G_2$, $G_3$, $G_4$ of FIG. 35. A switch 3620 may sequentially switch through the four gradient antenna coils at a predefined time interval, such as at a $\frac{1}{60}$th second or other periodic rate. The rate may be selected based on parameters such as the processing capability of the locator, movement sensitivity of the locator, and/or other locator or operational parameters. The output of A/D converter channel 3630-4 may then be provided to a gradient processing module 3640, which may periodically generate X and Y gradient values based on summation of the rotated omnidirectional signals and switched gradient signals to generate output X and Y gradient values Gx and Gy.

Figure 37:
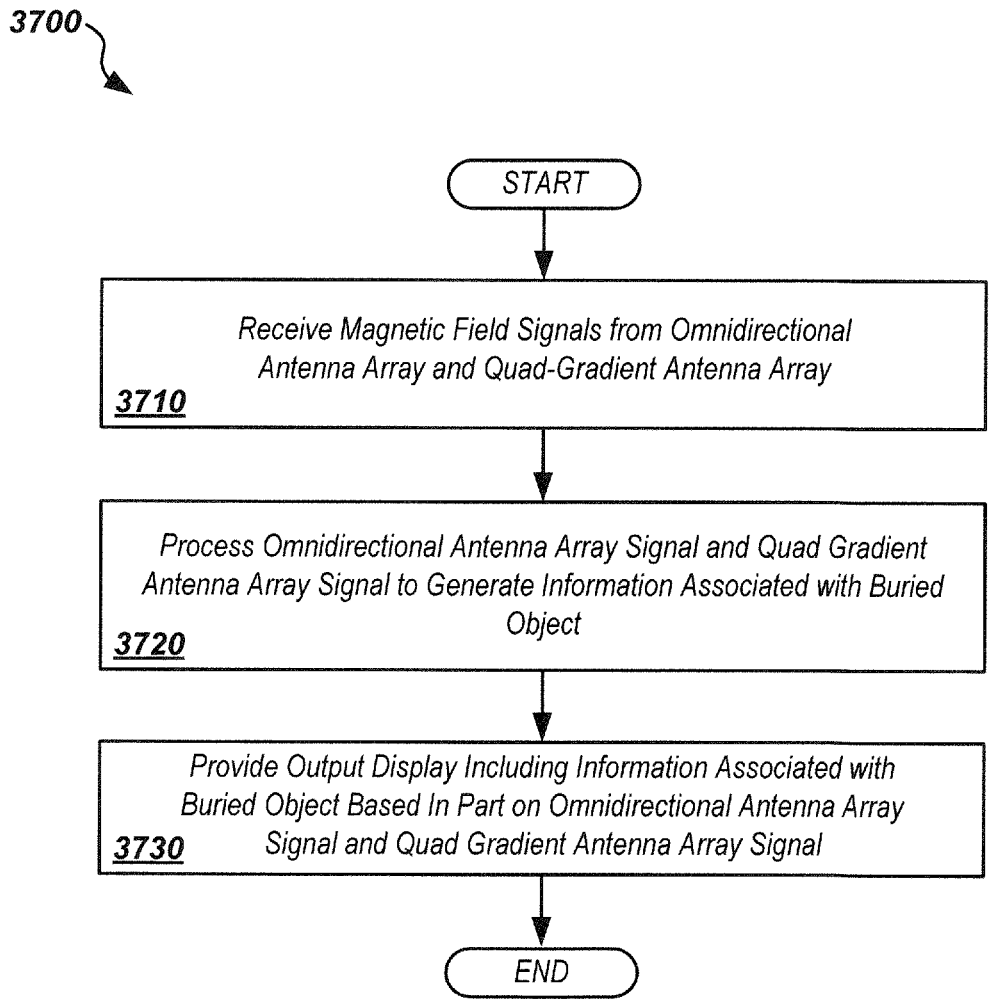
FIG. 37 illustrates details of an embodiment of a process for providing locator display information based in part on signals received from an omnidirectional antenna array and in part from signals received from a quad gradient antenna array.

FIG. 37 illustrates details of an embodiment of a process 3700 for providing a locator display based on information determined from an omnidirectional array and a quad gradient antenna array. At stage 3710, magnetic field signals may be received at a buried object locator at both an omnidirectional antenna array and a quad gradient antenna array. At stage 3720, the received magnetic field signals may be processed, such as in a processing element of the locator, to generate information associated with the buried object. At stage 3730, an output display may be provided on a locator display. The output display may be based in part on the omnidirectional array signal and in part on the quad gradient antenna array signal. For example, in an exemplary embodiment, buried object information may be presented on the display based primarily on the quad gradient antenna array when the locator is positioned far from or significantly offset from being above the buried object. Conversely, the buried object information may be presented on the display based primarily on the omnidirectional antenna array when the locator is position close to or directly over the buried object.

Figure 39:
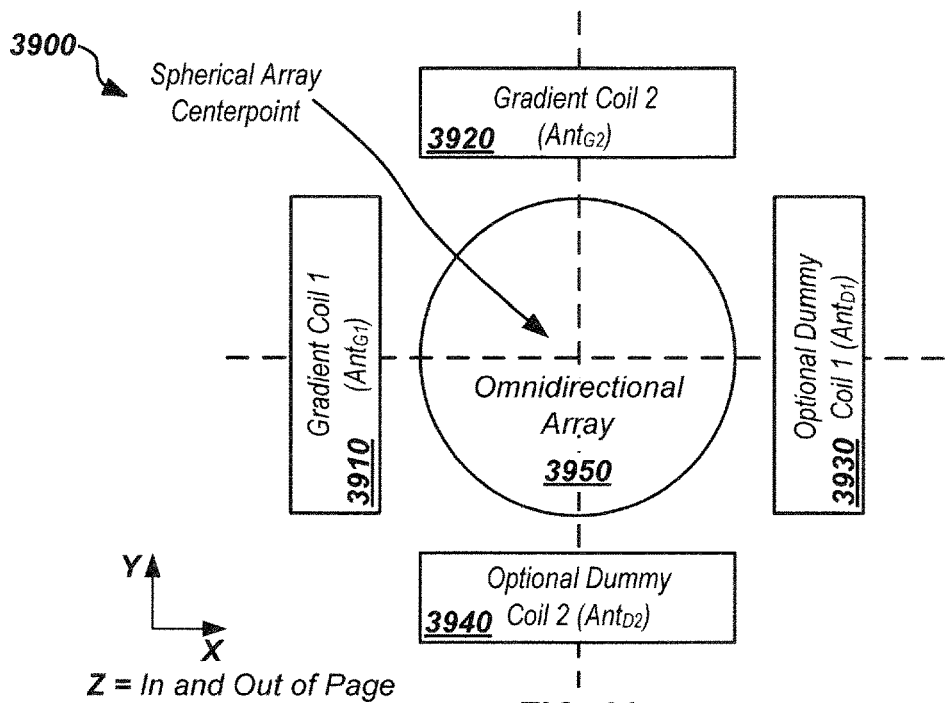
FIG. 39 illustrates details of an embodiment of an antenna node including an omnidirectional antenna array, gradient antenna array coils, and optional dummy coils.
Figure 40:
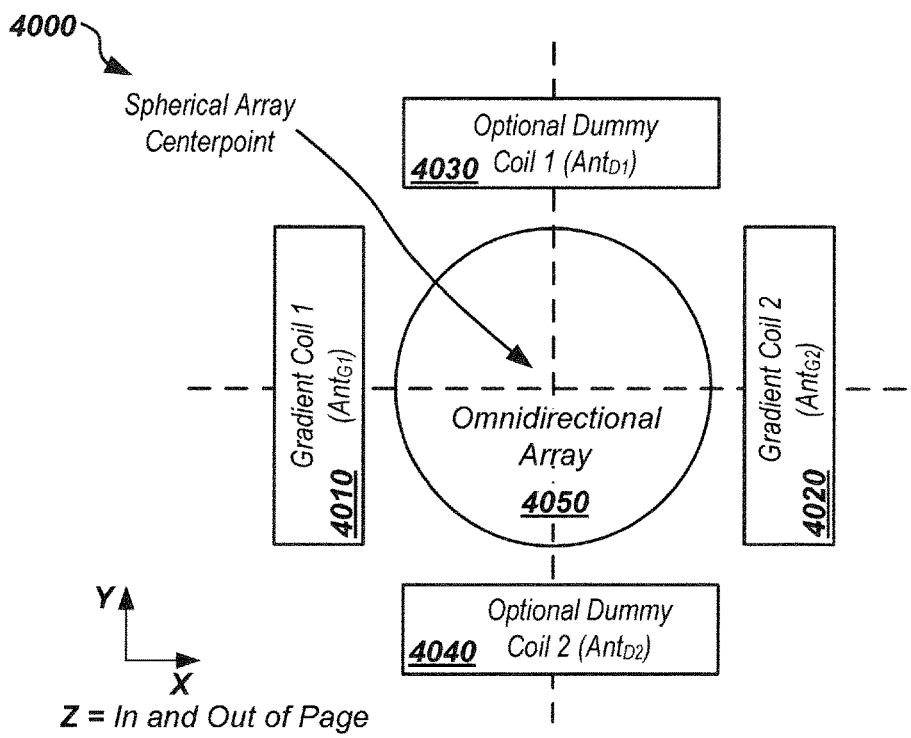
FIG. 40 illustrates details of an alternate embodiment of an antenna node including an omnidirectional antenna array, gradient antenna array coils, and optional dummy coils.

In some embodiments, alternate gradient coil configurations may be used, along with optional dummy coils. For example, the antenna assembly may include three coils configured orthogonally in an omnidirectional ball assembly and two additional coils (of four gradient coil positions) disposed around the enclosure. Example of this configuration are shown in FIGS. 39 and 40. The two coils may be opposed pairs (FIG. 40) or may be orthogonal single antennas (FIG. 39). Specifically, FIG. 39 illustrates details of an embodiment of an antenna node 3900 including an omnidirectional array element 3950 (e.g., three spheroidal-shaped orthogonal coils) with a gradient array including two orthogonal gradient coils 3910, 3920, and two optional dummy coils 3930 and 3940. FIG. 40 illustrates an alternate embodiment with an omnidirectional array 4050 and paired gradient coils 4010, 4020, along with optional dummy coils 4030 and 4040.

In this configuration, the field strength in the direction of any of the four (or more) coils may be determined from the centrally determined magnetic field vector, and then gradients can be calculated from the center point of the array to any coil placed around the perimeter. This may be done to reduce the total number of processing channels (e.g., in common implementations where analog-to-digital converters are packaged in fours, a pair of four channel A/Ds (e.g., 8 channels) can be configured so that 3 channels are used for an upper orthogonal antenna array, three channels for a lower orthogonal antenna array, and two more channels may be used for gradient antenna coil processing (assuming that no antenna coil switching is done) or other purposes.

Optional dummy coils may also be added to this configuration to balance mutual inductance (i.e., current induced in one coil creates a magnetic field that can be measured in the other coil, and vice-versa). In antenna coil configurations such as illustrated herein, coils tend to interact with each other. A single pair of opposed coils may cause more distortion of measured magnetic field as the locator is rotated at a particular location. If other coil positions are populated with dummy coils to load the magnetic field in the same way the active coils do (e.g., connected to preamps and A/Ds), a more accurate measurement may be determined. The gradient coils and dummy coils may have co-planar axes substantially intersecting the center of the omnidirectional array as described previously herein (e.g., the two coils whose axes are coaxial may intersect the center of the inner triad of the omnidirectional array).

In some configurations, the apparatus, circuit, modules, or systems described herein may include means for implementing features or providing functions described herein. In one aspect, the aforementioned means may be a module including a processor or processors, associated memory and/or other electronics in which embodiments of the invention reside, such as to implement signal processing, switching, transmission, or other functions to process and/or condition transmitter outputs, locator inputs, and/or provide other electronic functions described herein. These may be, for example, modules or apparatus residing in buried object transmitters, locators, coupling apparatus, and/or other related equipment or devices.

In one or more exemplary embodiments, the electronic functions, methods and processes described herein and associated with transmitters and locators may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, computer program products comprising computer-readable media including all forms of computer-readable medium except, to the extent that such media is deemed to be non-statutory, transitory propagating signals.

It is understood that the specific order or hierarchy of steps or stages in the processes and methods disclosed herein are examples of exemplary approaches. Based upon design preferences, it is understood that the specific order or hierarchy of steps in the processes may be rearranged while remaining within the scope of the present disclosure unless noted otherwise.

Those of skill in the art would understand that information and signals, such as video and/or audio signals or data, control signals, or other signals or data may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, electromechanical components, or combinations thereof. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative functions and circuits described in connection with the embodiments disclosed herein with respect to transmitters and locators may be implemented or performed in one or more processing elements including a general purpose processor, a digital signal processor (DSP), an application specific integrated circuit (ASIC), a field programmable gate array (FPGA) or other programmable logic device, discrete gate or transistor logic, discrete hardware components, memory devices, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, memory devices, or any other such configuration.

The steps or stages of a method, process or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use embodiments of present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The disclosure is not intended to be limited to the aspects shown herein, but is to be accorded the full scope consistent with the specification and drawings, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure. Thus, the presently claimed invention is not intended to be limited to the aspects shown herein but is to be accorded the widest scope consistent with the appended Claims and their equivalents.

We claim:

1. A buried object locator, comprising:
a mast;

an antenna node coupled to the mast, wherein the antenna node includes a node housing and an antenna assembly, the antenna assembly comprising a magnetic field antenna array;

an antenna array support structure;

an interior omnidirectional antenna array disposed on the antenna array support structure, and a gradient antenna array disposed about the omnidirectional antenna array;

a housing coupled to the mast;

a display element disposed on or within the housing;

a receiver circuit having an input operatively coupled to the antenna output to receive electrical signals from one or more of the antenna arrays corresponding to current signals flowing in the buried object at a plurality of different frequencies that are generated and phase locked via a multi-input phase lock loop and provide corresponding receiver output signals;

a processing element operatively coupled to an output of the receiver circuit including electronics to simultaneously process the receiver output signals at two or more of the different frequencies; and a non-transitory memory for storing information associated with the buried object determined from the plurality of receiver output signals.

2. The locator of claim 1, further comprising a visual display for rendering information associated with the buried object determined from the plurality of current signals at different frequencies.

3. The locator of claim 2, wherein the display information includes a plurality of lines representing positions of a utility determined based on the plurality of magnetic field signals emitted from the buried object at different frequencies.

4. The locator of claim 2, wherein the display information includes distortion information associated with estimates of the position of the buried object based on two or more of a plurality of magnetic field signals.

5. The method locator of claim 1, wherein the plurality of different frequencies comprise at least two unique and distinct frequency sets.

6. The locator of claim 5, wherein the frequency sets comprise a first frequency set and a second frequency set, wherein each of the first and second frequency sets is allocated to a different type of connection from the transmitter.

7. A method of providing an output display on a buried object locator, comprising:

simultaneously receiving, at the buried object locator, a plurality of magnetic field signals at different frequencies, wherein the different frequencies are generated and phase locked via a multi-input phase lock loop;

simultaneously processing the received plurality of magnetic field signals to generate information associated with the buried object, wherein the information is generated based on two or more of the plurality of magnetic field signals; and storing the information associated with the buried object in a non-transitory memory in the locator.

8. The method of claim 7, wherein the magnetic field signals correspond to current signals flowing in a buried object at different frequencies.

9. The method of claim 8, further comprising rendering on a visual display information associated with the buried object determined from the plurality of current signals at different frequencies.

10. The method of claim 7, further comprising providing the information associated with the buried object via at least one of a visual display device, an audible output, or a tactile device.

* * * * *